(12) United States Patent
Nishikawa

(10) Patent No.: US 11,194,242 B2
(45) Date of Patent: Dec. 7, 2021

(54) IMAGE DISPLAY DEVICE AND PROJECTION OPTICAL SYSTEM

(71) Applicant: SONY CORPORATION, Tokyo (JP)

(72) Inventor: Jun Nishikawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/628,167

(22) PCT Filed: May 11, 2018

(86) PCT No.: PCT/JP2018/018330
§ 371 (c)(1),
(2) Date: Jan. 2, 2020

(87) PCT Pub. No.: WO2019/012795
PCT Pub. Date: Jan. 17, 2019

(65) Prior Publication Data
US 2020/0142291 A1    May 7, 2020

(30) Foreign Application Priority Data
Jul. 10, 2017 (JP) .............................. JP2017-134692

(51) Int. Cl.
*G03B 21/28* (2006.01)
*G02B 17/08* (2006.01)

(52) U.S. Cl.
CPC ......... *G03B 21/28* (2013.01); *G02B 17/0832* (2013.01)

(58) Field of Classification Search
CPC ..... G03B 21/14; G03B 21/28; G02B 17/0832
(Continued)

(56) References Cited

U.S. PATENT DOCUMENTS 5,477,394 A * 12/1995 Shibazaki .......... G02B 17/0816
359/858
5,495,306 A    2/1996 Shibazaki
(Continued)

FOREIGN PATENT DOCUMENTS

CN    103782222 A    5/2014
CN    104834094 A    8/2015
(Continued)

OTHER PUBLICATIONS

International Search Report dated Aug. 14, 2018 in PCT/JP2018/018330 filed on May 11, 2018, 2 pages.
(Continued)

*Primary Examiner* — William C. Dowling
(74) *Attorney, Agent, or Firm* — Oblon, McClelland, Maier & Neustadt, L.L.P.

(57) ABSTRACT

An image display device according to an embodiment of the present technology includes a light source, an image generator, and a projection optical system. The image generator modulates a light beam emitted by the light source and generates image light. The projection optical system includes a first lens system, a first reflection optical system, a second lens system, and a second reflection optical system. The first lens system has a positive refractive power as a whole, and refracts the generated image light. The first reflection optical system includes two or more reflection surfaces, each reflection surface being a surface off which the image light refracted by the first lens system is reflected. The second lens system has a positive refractive power as a whole, and refracts the image light reflected off the first reflection optical system. The second reflection optical system includes a concave reflection surface off which the image light refracted by the second lens system is reflected
(Continued)

to be directed to a projected-onto object onto which projection is performed.

20 Claims, 47 Drawing Sheets

(58) Field of Classification Search
USPC .................................................... 353/98, 99
See application file for complete search history.

(56) References Cited

U.S. PATENT DOCUMENTS

| | | | |
|---|---|---|---|
| 5,499,067 A * | 3/1996 | Shibazaki | G02B 17/0816 353/99 |
| 6,989,936 B2 | 1/2006 | Hatakeyama | |
| 7,068,444 B2 | 6/2006 | Nishi | |
| 7,957,078 B2 | 6/2011 | Minefuji | |
| 8,164,838 B2 | 4/2012 | Minefuji | |
| 8,210,693 B2 | 7/2012 | Nishikawa | |
| 8,657,450 B2 | 2/2014 | Abe et al. | |
| 9,201,227 B2 | 12/2015 | Kim et al. | |
| 10,048,476 B2 * | 8/2018 | Amano | G02B 13/22 |
| 10,890,742 B2 * | 1/2021 | Amano | G02B 17/008 |
| 2005/0046952 A1 | 3/2005 | Nagata et al. | |
| 2011/0267687 A1 | 11/2011 | Kim et al. | |
| 2014/0002802 A1 | 1/2014 | Hsu et al. | |
| 2016/0077316 A1 * | 3/2016 | Yamamoto | G02B 15/173 359/557 |
| 2016/0077319 A1 * | 3/2016 | Yatsu | G02B 13/18 353/98 |
| 2016/0246037 A1 * | 8/2016 | Amano | G02B 13/06 |
| 2017/0285451 A1 * | 10/2017 | Uchida | G03B 21/28 |
| 2017/0332057 A1 | 11/2017 | Matsuo | |
| 2019/0239118 A1 * | 8/2019 | Baghel | H04L 69/08 |
| 2019/0302601 A1 * | 10/2019 | Nagatoshi | G02B 9/64 |
| 2020/0019051 A1 * | 1/2020 | Uchida | G02B 13/18 |
| 2021/0003913 A1 * | 1/2021 | Masui | G03B 21/28 |

FOREIGN PATENT DOCUMENTS

| | | |
|---|---|---|
| EP | 0 633 491 A1 | 1/1995 |
| JP | 7-13157 A | 1/1995 |
| JP | 2004-295107 A | 10/2004 |
| JP | 2010-186120 A | 8/2010 |
| JP | 2010-237356 A | 10/2010 |
| JP | 2012-27113 A | 2/2012 |
| JP | 5365155 B2 | 12/2013 |
| JP | 2014-59579 A | 4/2014 |
| JP | 2015127755 A | 7/2015 |
| JP | 2015-200829 A | 11/2015 |
| WO | WO 2004/029693 A1 | 4/2004 |
| WO | WO 2016/068269 A1 | 5/2016 |

OTHER PUBLICATIONS

Extended European Search Report dated Jun. 8, 2020 in corresponding European Patent Application No. 18831657.4, 8 pages.

* cited by examiner

| | |
|---|---|
| NA | 0.167 |
| Image modulating element(H×VSp) | 13.4 × 7.5 |
| Center position for image modulating element(Chp) | 5.5 |
| Image circle on first-image-surface side(imc) | 22.9 |
| Screen size(H×VSs) | 1771 × 996 |
| Center position for screen size(Chs) | 722 |

FIG.6

| | | | Curvature radius | thickness | nd | νd | sa | memo |
|---|---|---|---|---|---|---|---|---|
| | | P | ∞ | 8.3 | | | | |
| | | s1 | ∞ | 8.5 | 1.517 | 64 | | |
| | | s2 | ∞ | 44.0 | 1.841 | 25 | | |
| | | s3 | ∞ | 4.0 | | | | |
| L1 | L11 | s4 | 35.3 | 7.4 | 1.808 | 23 | | |
| | | s5 | -106.8 | 0.3 | | | | |
| | | s6 | 63.1 | 7.4 | 1.620 | 60 | | |
| | | s7 | -30.4 | 1.5 | 1.805 | 25 | | |
| | | s8 | 26.8 | 4.9 | | | | |
| | | s9 | 81.5 | 6.5 | 1.487 | 70 | | |
| | | s10 | -17.8 | 1.2 | 1.805 | 25 | | |
| | | s11 | -29.3 | 17.6 | | | | |
| | | s12 | 74.4 | 2.5 | 1.808 | 23 | | |
| | | s13 | -346.1 | 67.0 | | | | |
| | | s14 * | 7.9 | 6.5 | 1.509 | 57 | | |
| | | s15 * | 4.0 | 53.3 | | | 18.4 | SA1max |
| | Mr1 | s16 * | -45.4 | -48.3 | refl | | | |
| | Mr2 | s17 * | -31.9 | 53.3 | refl | | | |
| L2 | TR | s18 | 27.8 | 1.2 | 1.847 | 24 | 7.4 | SA2max |
| | | s19 | 15.3 | 2.7 | | | | |
| | | s20 | 25.9 | 5.8 | 1.487 | 70 | | |
| | | s21 | -17.1 | 69.1 | | | | |
| | Mr3 | s22 * | -14.7 | -477.8 | refl | | | |
| | | S | ∞ | | | | | |

\* — Aspherical surface
\*\* — Free shaped surface
$ — Decenter and tilt surface

| K: | -1.00E+01 | A2: | -1.40E-01 | A3: | 1.22E-02 |
|---|---|---|---|---|---|
| A4: | -4.16E-04 | A5: | -2.85E-05 | A6: | 3.22E-06 |
| A7: | -1.85E-08 | A8: | -2.40E-09 | A9: | -3.83E-10 |
| A10: | 7.30E-12 | A11: | 1.47E-12 | A12: | -4.79E-14 |

S15

| K: | -2.37E+00 | A2: | -1.79E-01 | A3: | 2.68E-02 |
|---|---|---|---|---|---|
| A4: | -3.02E-03 | A5: | 1.57E-04 | A6: | -9.08E-07 |
| A7: | -1.68E-07 | A8: | -1.10E-09 | A9: | 2.30E-10 |
| A10: | 7.53E-12 | A11: | -4.57E-13 | A12: | 3.39E-15 |

S16

| K: | -3.15E-01 | A2: | -1.83E-03 | A3: | -2.41E-04 |
|---|---|---|---|---|---|
| A4: | 1.76E-05 | A5: | -4.79E-07 | A6: | -1.37E-09 |
| A7: | -6.09E-11 | A8: | 1.97E-11 | A10: | -1.61E-14 |
| A12: | 5.78E-18 | | | | |

S17

| K: | -4.92E+00 | A2: | 3.21E-02 | A3: | -6.41E-05 |
|---|---|---|---|---|---|
| A4: | -2.19E-05 | A5: | 8.43E-07 | A6: | 1.45E-09 |
| A7: | -7.86E-10 | A8: | 1.62E-11 | A10: | -1.27E-15 |
| A12: | -4.05E-19 | | | | |

S22

| K: | -8.71E-01 | A2: | 8.53E-03 | A3: | 2.29E-03 |
|---|---|---|---|---|---|
| A4: | -1.20E-04 | A5: | 9.27E-07 | A6: | 7.90E-08 |
| A7: | -1.05E-09 | A8: | -2.13E-11 | A10: | 1.02E-14 |
| A12: | -6.79E-19 | | | | |

FIG.8

| | |
|---|---|
| T | 260 |
| T2 | 137 |
| TWD2 | 234 |
| TRL | 9.7 |
| SA1max | 18.4 |
| SA2max | 7.4 |
| ry1 | 50.7 |
| ry2 | 27.1 |
| | |
| T2/T | 0.53 |
| T2/TWD2 | 0.59 |
| T/TRL | 26.8 |
| SA1max/SA2max | 2.48 |
| \|ry1-ry2\|/ry2 | 0.87 |
| (Chs/VSs)/(Chp/VSp) | 1.0 |
FIG.9
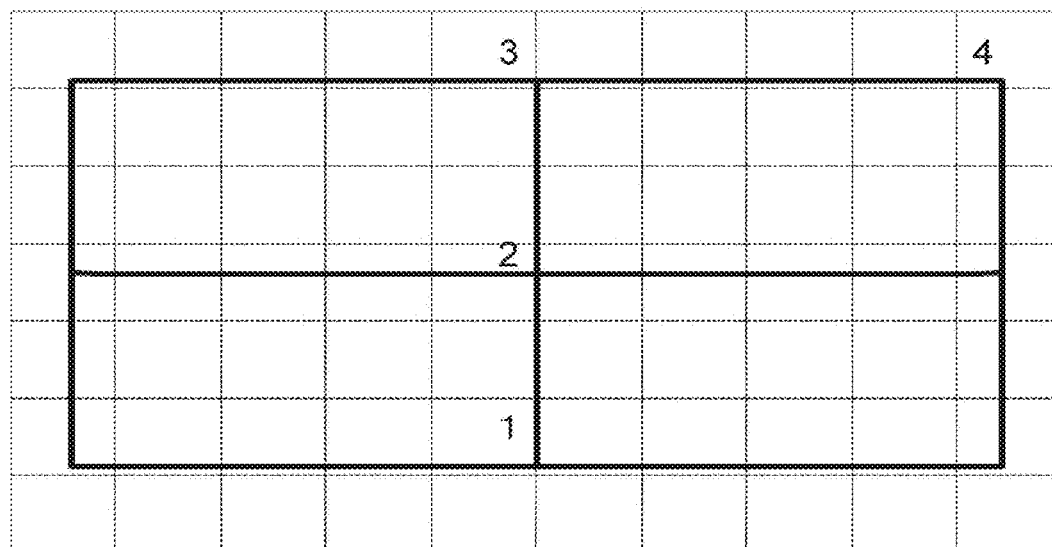
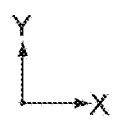
FIG.10

| | |
|---|---|
| NA | 0.167 |
| Image modulating element(H×VSp) | 13.4 × 7.5 |
| Center position for image modulating element(Chp) | 5.5 |
| Image circle on first-image-surface side(imc) | 22.9 |
| Screen size(H×VSs) | 1771 × 996 |
| Center position for screen size(Chs) | 722 |

FIG.15

|  |  | Curvature radius | thickness | nd | νd | sa | memo |
|---|---|---|---|---|---|---|---|
|  | P | ∞ | 8.2 |  |  |  |  |
|  | s1 | ∞ | 8.5 | 1.517 | 64 |  |  |
|  | s2 | ∞ | 44.0 | 1.841 | 25 |  |  |
|  | s3 | ∞ | 4.0 |  |  |  |  |
| L11 | s4 | 62.6 | 6.1 | 1.773 | 50 |  |  |
| L11 | s5 | -55.2 | 0.3 |  |  |  |  |
|  | s6 | 32.8 | 11.4 | 1.697 | 55 |  |  |
|  | s7 | -24.7 | 3.0 | 1.741 | 28 |  |  |
|  | s8 | 23.6 | 2.4 |  |  |  |  |
|  | s9 | 21.2 | 4.9 | 1.487 | 70 |  |  |
|  | s10 | -21.7 | 3.0 | 1.834 | 37 |  |  |
|  | s11 | 36.3 | 9.9 |  |  |  |  |
|  | P1 | ∞ |  |  |  |  |  |
|  | s12 | 32.7 | 3.0 | 1.847 | 24 |  |  |
|  | s13 | -43.6 | 0.6 |  |  |  |  |
|  | s14 | 24.4 | 3.0 | 1.847 | 24 |  |  |
|  | s15 | 53.3 | 4.4 |  |  |  |  |
|  | s16 | -28.7 | 3.0 | 1.847 | 24 |  |  |
|  | s17 | 18.1 | 7.3 |  |  |  |  |
|  | s18 | 24.7 | 7.7 | 1.487 | 70 |  |  |
|  | s19 | -24.8 | 4.9 |  |  |  |  |
|  | s20 * | -11.2 | 2.5 | 1.815 | 37 |  |  |
|  | s21 * | 55.6 | 0.3 |  |  |  |  |
|  | s22 | 42.0 | 9.9 | 1.487 | 70 |  |  |
|  | s23 | -30.7 | 0.2 |  |  |  |  |
|  | s24 * | 22.2 | 3.6 | 1.509 | 57 |  |  |
|  | s25 * | 19.5 | 0.6 |  |  |  |  |
|  | s26 | 34.2 | 3.7 | 1.697 | 55 |  |  |
|  | s27 | 46.3 | 42.1 |  |  | 16.8 | SA1max |
| Mr1 | s28 **$ | -12.7 | -33.5 | refl |  |  |  |
| Mr2 | s29 **$ | 29.6 | 42.0 | refl |  |  |  |
| TR | s30 | 25.6 | 9.0 | 1.487 | 70 |  |  |
| TR | s31 | -18.5 | 0.2 |  |  |  |  |
| TR | s32 | 43.4 | 4.4 | 1.487 | 70 |  |  |
| TR | s33 | -14.4 | 0.7 |  |  |  |  |
| TR | s34 * | -17.2 | 4.6 | 1.815 | 37 |  |  |
| TR | s35 * | -9.5 | 50.0 |  |  | 8.92 | SA2max |
| Mr3 | s36 **$ | -29.1 | -428.1 | refl |  |  |  |
|  | S | ∞ |  |  |  |  |  |

\* — Aspherical surface
\*\* — Free shaped surface
$ — Decenter and tilt surface

| K | -3.14E+00 | | | |
|---|---|---|---|---|
| A4: | -3.64E-05 | A6: | 1.90E-08 | |

S21

| K: | 0.00E+00 | | | |
|---|---|---|---|---|
| A4: | -9.54E-06 | A6: | -1.03E-08 | |

S24

| A3: | -2.14E-03 | A4: | -2.48E-05 | A5: | -4.98E-06 |
|---|---|---|---|---|---|
| A6: | 6.57E-07 | A7: | 1.10E-08 | A8: | -1.21E-09 |
| A9: | -5.13E-11 | A10: | 1.70E-12 | | |

S25

| A3: | -2.57E-03 | A4: | -9.00E-05 | A5: | 1.07E-05 |
|---|---|---|---|---|---|
| A6: | -2.70E-07 | A7: | -1.26E-08 | A8: | 7.54E-10 |
| A9: | 4.20E-11 | A10: | -2.98E-12 | | |

S28

| XDE: | 0.00E+00 | YDE: | 5.96E+00 | ZDE: | 0.00E+00 | DAR |
|---|---|---|---|---|---|---|
| ADE: | 2.36E+01 | BDE: | 0.00E+00 | CDE: | 0.00E+00 | |
| K: | -2.39E+00 | X2: | 1.59E-02 | Y2: | 9.40E-04 | |
| X2Y: | 1.45E-03 | X4: | -5.08E-05 | X2Y2: | -3.29E-05 | |
| Y4: | -5.41E-05 | X4Y: | -5.15E-06 | X2Y3: | -1.49E-06 | |
| X6: | 3.51E-08 | X4Y2: | -2.37E-07 | X2Y4: | -1.54E-10 | |
| Y6: | 6.67E-08 | X6Y: | 5.67E-09 | X4Y3: | -9.16E-09 | |
| X2Y5: | -4.09E-09 | X8: | 1.99E-11 | X6Y2: | 7.77E-12 | |
| X4Y4: | -2.18E-10 | X2Y6: | -1.71E-10 | Y8: | -1.03E-10 | |
| X8Y: | -2.67E-12 | X6Y3: | -4.63E-12 | X4Y5: | 3.73E-11 | |
| X2Y7: | 2.00E-11 | X10: | -3.91E-14 | X8Y2: | -1.92E-14 | |
| X6Y4: | 2.36E-13 | X4Y6: | 1.48E-12 | X2Y8: | 5.86E-13 | |
| Y10: | 8.52E-15 | | | | | |

| | | | | | | |
|---|---|---|---|---|---|---|
| XDE: | 0.00E+00 | YDE: | 1.67E+01 | ZDE: | 0.00E+00 | DAR |
| ADE: | -2.94E+01 | BDE: | 0.00E+00 | CDE: | 0.00E+00 | |
| K: | -1.14E+00 | X2: | -2.16E-03 | Y2: | -1.25E-03 | |
| X2Y: | 4.56E-05 | X4: | 4.33E-06 | X2Y2: | 5.57E-06 | |
| Y4: | 1.07E-06 | X4Y: | -7.06E-08 | X2Y3: | -1.45E-07 | |
| X6: | 1.56E-09 | X4Y2: | 3.61E-09 | X2Y4: | 9.19E-09 | |
| Y6: | 2.47E-09 | X6Y: | -2.46E-12 | X4Y3: | 1.59E-10 | |
| X2Y5: | -4.57E-11 | X8: | -7.56E-13 | X6Y2: | -5.83E-13 | |
| X4Y4: | -1.03E-11 | X2Y6: | -1.28E-11 | Y8: | -5.38E-12 | |
| X8Y: | -3.92E-14 | X6Y3: | -2.97E-13 | X4Y5: | -2.22E-13 | |
| X2Y7: | 3.10E-13 | X10: | 1.43E-15 | X8Y2: | 6.49E-15 | |
| X6Y4: | 1.79E-14 | X4Y6: | 1.97E-14 | X2Y8: | 3.17E-15 | |
| Y10: | 5.56E-15 | | | | | |

S34

| | | | | | |
|---|---|---|---|---|---|
| K: | 1.17E+00 | A3: | 5.30E-03 | A4: | -3.93E-04 |
| A5: | 1.78E-05 | A6: | -1.11E-06 | A7: | -2.09E-07 |
| A8: | -7.64E-09 | A9: | 4.35E-09 | A10: | -2.47E-10 |

S35

| | | | | | |
|---|---|---|---|---|---|
| K: | -8.95E+00 | A3: | 3.11E-03 | A4: | 2.38E-04 |
| A5: | -2.66E-05 | A6: | -3.46E-06 | A7: | 9.68E-08 |
| A8: | 2.17E-08 | A9: | -3.91E-10 | A10: | -4.06E-11 |

S36

| | | | | | | |
|---|---|---|---|---|---|---|
| XDE: | 0.00E+00 | YDE: | -1.98E+00 | ZDE: | 0.00E+00 | DAR |
| ADE: | -3.80E+00 | BDE: | 0.00E+00 | CDE: | 0.00E+00 | |
| K: | -7.97E-01 | X2: | -1.44E-03 | Y2: | -1.22E-03 | |
| X2Y: | -1.89E-05 | X4: | -1.69E-07 | X2Y2: | 4.61E-06 | |
| Y4: | 1.93E-06 | X4Y: | 8.11E-11 | X2Y3: | 5.14E-07 | |
| X6: | 1.45E-09 | X4Y2: | 2.61E-09 | X2Y4: | 3.03E-08 | |
| Y6: | -1.80E-09 | X6Y: | 9.81E-11 | X4Y3: | -1.84E-10 | |
| X2Y5: | 6.86E-10 | X8: | -2.79E-12 | X6Y2: | -8.67E-12 | |
| X4Y4: | -4.88E-11 | X2Y6: | -1.50E-11 | Y8: | 4.63E-13 | |
| X8Y: | -1.57E-13 | X6Y3: | -7.41E-13 | X4Y5: | -2.00E-12 | |
| X2Y7: | -8.38E-13 | X10: | 7.13E-16 | X8Y2: | -4.90E-15 | |
| X6Y4: | -1.40E-14 | X4Y6: | -2.61E-14 | X2Y8: | -9.86E-15 | |
| Y10: | -1.50E-16 | | | | | |

FIG.18

| | |
|---|---|
| T | 215 |
| T2 | 119 |
| TWD2 | 200 |
| TRL | 18.8 |
| SA1max | 13.8 |
| SA2max | 8.9 |
| ry1 | 78.6 |
| ry2 | 45.0 |
| | |
| T2/T | 0.56 |
| T2/TWD2 | 0.60 |
| T/TRL | 11.4 |
| SA1max/SA2max | 1.54 |
| |ry1-ry2|/ry2 | 0.75 |
FIG.19
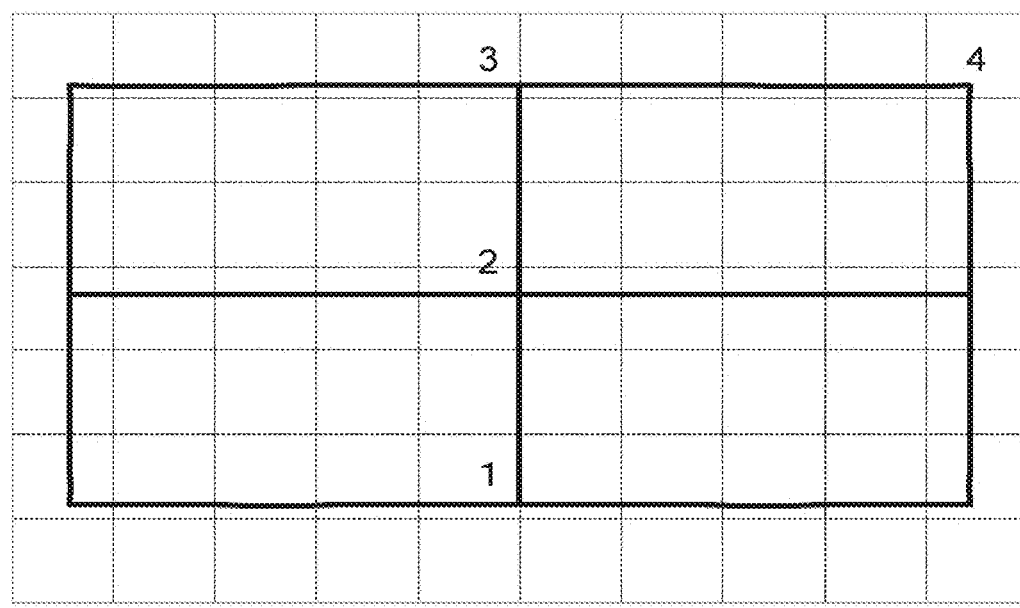
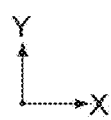
FIG.20

| | |
|---|---|
| NA | 0.127 |
| Image modulating element(H×VSp) | 8.2 × 4.6 |
| Center position for image modulating element(Chp) | 3.7 |
| Image circle on first-image-surface side(imc) | 14.6 |
| Screen size(H×VSs) | 553 × 311 |
| Center position for screen size(Chs) | 252.0 |

FIG.25

| | | | Curvature radius | thickness | nd | νd | sa | memo |
|---|---|---|---|---|---|---|---|---|
| | | P | ∞ | 0.5 | | | | |
| | | s1 | ∞ | 2.1 | 1.458 | 68 | | |
| | | s2 | ∞ | 8.6 | 1.805 | 25 | | |
| | | s3 | ∞ | 3.3 | | | | |
| L1 | L11 | s4 | 16.4 | 3.7 | 1.808 | 23 | 8.1 | SA1max |
| | | s5 | -929.1 | 0.2 | | | | |
| | | s6 | 11.0 | 6.8 | 1.487 | 70 | | |
| | | s7 | -12.6 | 0.8 | 1.805 | 25 | | |
| | | s8 | 6.4 | 1.7 | | | | |
| | | s9 | 56.4 | 3.1 | 1.487 | 70 | | |
| | | s10 | -9.6 | 0.2 | | | | |
| | | s11 | 13.5 | 2.9 | 1.620 | 60 | | |
| | | s12 | -9.7 | 1.0 | | | | |
| | | s13 | -15.9 | 0.5 | 1.532 | 49 | | |
| | | s14 | 6.7 | 2.2 | | | | |
| | | s15 | 12.2 | 2.9 | 1.773 | 50 | | |
| | | s16 | -23.0 | 12.2 | | | | |
| | | s17 * | 7.6 | 4.1 | 1.509 | 57 | | |
| | | s18 * | 0.5 | 29.0 | | | | |
| L2 | Mr1 | s19 * | -19.8 | -23.9 | REFL | | | |
| | Mr2 | s20 * | -36.9 | 26.4 | REFL | | | |
| | TR | s21 | 20.2 | 1.3 | 1.847 | 24 | 4.2 | SA2max |
| | | s22 | 12.6 | 1.0 | | | | |
| | | s23 | 9.0 | 3.0 | 1.487 | 70 | | |
| | | s24 | -81.1 | 30.9 | | | | |
| | Mr3 | s25 * | -17.0 | -107.0 | REFL | | | |
| | | S | ∞ | | | | | |

\* — Aspherical surface
\*\* — Free shaped surface
$ — Decenter and tilt surface

FIG.26

| S17 | | | | | |
|---|---|---|---|---|---|
| K: | 2.36E-01 | A2: | -2.57E-01 | A3: | 3.05E-02 |
| A4: | 2.27E-03 | A5: | -1.22E-03 | A6: | 3.56E-05 |
| A7: | 1.72E-05 | A8: | -2.31E-07 | A9: | -1.39E-07 |
| A10: | -1.49E-08 | A11: | -9.37E-11 | A12: | 1.73E-10 |

8.1

| S18 | | | | | |
|---|---|---|---|---|---|
| K: | -1.08E+00 | A2: | -1.20E+00 | A3: | 2.03E-01 |
| A4: | -1.38E-02 | A5: | -7.04E-04 | A6: | 2.94E-05 |
| A7: | 1.14E-05 | A8: | 1.01E-06 | A9: | -3.49E-08 |
| A10: | -1.97E-08 | A11: | -1.91E-09 | A12: | 2.85E-10 |

| S19 | | | | | |
|---|---|---|---|---|---|
| K: | 5.46E-02 | A2: | -1.91E-03 | A3: | 3.24E-04 |
| A4: | -4.30E-05 | A5: | 1.54E-06 | A6: | 1.46E-07 |
| A7: | -6.87E-09 | A8: | -1.65E-10 | A10: | 9.94E-13 |
| A12: | -6.36E-16 | | | | |

| S20 | | | | | |
|---|---|---|---|---|---|
| K: | 3.38E+00 | A2: | 4.76E-02 | A3: | -1.06E-03 |
| A4: | 1.11E-04 | A5: | -3.22E-06 | A6: | -8.76E-08 |
| A7: | 8.02E-09 | A8: | 9.11E-10 | A10: | -4.78E-12 |

4.2
| A12: | 9.59E-15 | | | | |

| S25 | | | | | |
|---|---|---|---|---|---|
| K: | -6.12E-01 | A2: | 2.04E-02 | A3: | -5.61E-03 |
| A4: | -3.60E-05 | A5: | 2.65E-05 | A6: | 4.47E-07 |
| A7: | -5.64E-08 | A8: | -4.88E-09 | A10: | 2.12E-11 |
| A12: | -2.50E-14 | | | | |

FIG.27

| | |
|---|---|
| T | 110 |
| T2 | 68 |
| TWD2 | 116 |
| TRL | 5.3 |
| SA1max | 8.1 |
| SA2max | 4.2 |
| ry1 | 56.1 |
| ry2 | 25.8 |
| | |
| T2/T | 0.62 |
| T2/TWD2 | 0.58 |
| T/TRL | 20.7 |
| SA1max/SA2max | 1.92 |
| \|ry1-ry2\|/ry2 | 1.17 |
FIG.28
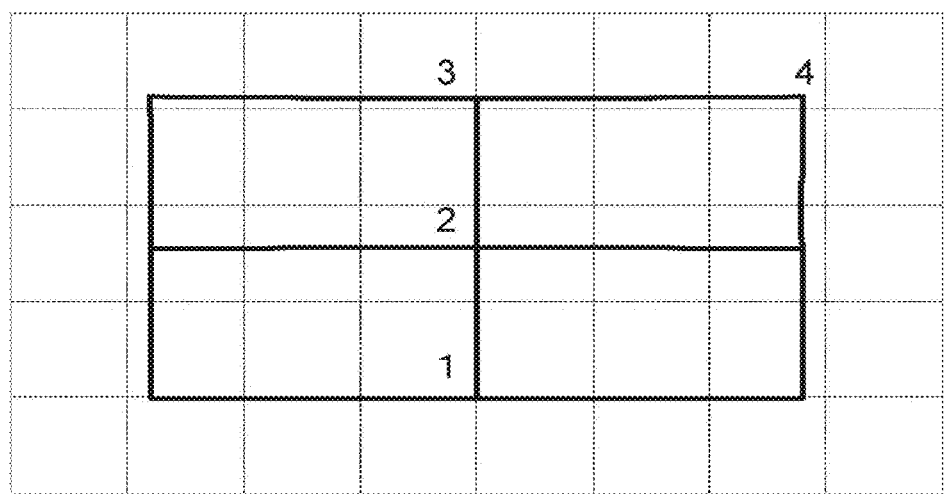
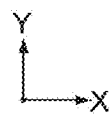
FIG.29

| | |
|---|---|
| NA | 0.127 |
| Image modulating element(H×VSp) | 8.2 × 4.6 |
| Center position for image modulating element(Chp) | 3.7 |
| Image circle on first-image-surface side(imc) | 14.6 |
| Screen size(H×VSs) | 553 × 311 |
| Center position for screen size(Chs) | 252.0 |

FIG.34

| | | | Curvature radius | thickness | nd | νd | sa | memo |
|---|---|---|---|---|---|---|---|---|
| | | P | ∞ | 0.5 | | | | |
| | | s1 | ∞ | 2.1 | 1.458 | 68 | | |
| | | s2 | ∞ | 8.6 | 1.805 | 25 | | |
| | | s3 | ∞ | 3.3 | | | | |
| L1 | L11 | s4 | 18.4 | 3.8 | 1.808 | 23 | 8.0 | SA1max |
| | | s5 | -71.5 | 0.2 | | | | |
| | | s6 | 11.0 | 7.6 | 1.487 | 70 | | |
| | | s7 | -8.8 | 0.9 | 1.755 | 28 | | |
| | | s8 | 6.7 | 2.1 | | | | |
| | | s9 | 17.0 | 2.1 | 1.620 | 60 | | |
| | | s10 | -7.9 | 6.5 | | | | |
| | | s11 | 12.2 | 3.5 | 1.639 | 55 | | |
| | | s12 | -157.9 | 9.4 | | | | |
| | | s13 * | 0.8 | 3.2 | 1.509 | 57 | | |
| | | s14 * | 0.2 | 24.2 | | | | |
| L2 | Mr1 | s15 * | -20.2 | -21.7 | REFL | | | |
| | Mr2 | s16 * | -42.9 | 26.1 | REFL | | | |
| | TR | s17 | 17.1 | 0.6 | 1.847 | 24 | 3.8 | SA2max |
| | | s18 | 9.8 | 2.1 | | | | |
| | | s19 | 15.9 | 3.3 | 1.487 | 70 | | |
| | | s20 | -12.2 | 33.6 | | | | |
| | Mr3 | s21 * | -9.1 | -127.5 | REFL | | | |
| | | S | ∞ | | | | | |

\* — Aspherical surface
\*\* — Free shaped surface
$ — Decenter and tilt surface

FIG.35

|     | S13  |           |      |           |      |           |
| --- | ---- | --------- | ---- | --------- | ---- | --------- |
|     | K:   | 2.36E-01  | A2:  | -2.57E-01 | A3:  | 3.05E-02  |
|     | A4:  | 2.27E-03  | A5:  | -1.22E-03 | A6:  | 3.56E-05  |
|     | A7:  | 1.72E-05  | A8:  | -2.31E-07 | A9:  | -1.39E-07 |
|     | A10: | -1.49E-08 | A11: | -9.37E-11 | A12: | 1.73E-10  |
| 8.1 | S14  |           |      |           |      |           |
|     | K:   | -1.08E+00 | A2:  | -1.20E+00 | A3:  | 2.03E-01  |
|     | A4:  | -1.38E-02 | A5:  | -7.04E-04 | A6:  | 2.94E-05  |
|     | A7:  | 1.14E-05  | A8:  | 1.01E-06  | A9:  | -3.49E-08 |
|     | A10: | -1.97E-08 | A11: | -1.91E-09 | A12: | 2.85E-10  |
|     |      |           |      |           |      |           |
|     | S15  |           |      |           |      |           |
|     | K:   | 5.46E-02  | A2:  | -1.91E-03 | A3:  | 3.24E-04  |
|     | A4:  | -4.30E-05 | A5:  | 1.54E-06  | A6:  | 1.46E-07  |
|     | A7:  | -6.87E-09 | A8:  | -1.65E-10 | A10: | 9.94E-13  |
|     | A12: | -6.36E-16 |      |           |      |           |
|     |      |           |      |           |      |           |
|     | S16  |           |      |           |      |           |
|     | K:   | 3.38E+00  | A2:  | 4.76E-02  | A3:  | -1.06E-03 |
|     | A4:  | 1.11E-04  | A5:  | -3.22E-06 | A6:  | -8.76E-08 |
|     | A7:  | 8.02E-09  | A8:  | 9.11E-10  | A10: | -4.78E-12 |
| 4.2 | A12: | 9.59E-15  |      |           |      |           |
|     |      |           |      |           |      |           |
|     | S21  |           |      |           |      |           |
|     | K:   | -6.12E-01 | A2:  | 2.04E-02  | A3:  | -5.61E-03 |
|     | A4:  | -3.60E-05 | A5:  | 2.65E-05  | A6:  | 4.47E-07  |
|     | A7:  | -5.64E-08 | A8:  | -4.88E-09 | A10: | 2.12E-11  |
|     | A12: | -2.50E-14 |      |           |      |           |

FIG.36

| | |
|---|---:|
| T | 107 |
| T2 | 68 |
| TWD2 | 111 |
| TRL | 6.0 |
| SA1max | 8.0 |
| SA2max | 3.8 |
| ry1 | 60.4 |
| ry2 | 27.6 |
| T2/T | 0.63 |
| T2/TWD2 | 0.61 |
| T/TRL | 18.0 |
| SA1max/SA2max | 2.12 |
| |ry1-ry2|/ry2 | 1.19 |

| | |
|---|---|
| NA | 0.167 |
| Image modulating element(H×VSp) | 13.4 × 7.5 |
| Center position for image modulating element(Chp) | 5.5 |
| Image circle on first-image-surface side(imc) | 22.9 |
| Screen size(H×VSs) | 1771 × 996 |
| Center position for screen size(Chs) | 722 |

FIG.43

| | | Curvature radius | thickness | nd | νd | sa | memo |
|---|---|---|---|---|---|---|---|
| | S0 | ∞ | 8.3 | | | | |
| | S1 | ∞ | 8.5 | 1.517 | 64 | | |
| | S2 | ∞ | 44.0 | 1.841 | 25 | | |
| | S3 | ∞ | 4.0 | | | | |
| L11 S4 | 97.7 | 6.7 | 1.808 | 23 | | |
| | S5 | -44.9 | 0.3 | | | | |
| | S6 | 1661.3 | 8.7 | 1.729 | 55 | | |
| | S7 | -21.7 | 1.5 | 1.741 | 28 | | |
| | S8 | 39.7 | 4.6 | | | | |
| | S9 | 113.1 | 8.1 | 1.487 | 70 | | |
| | S10 | -15.7 | 1.2 | 1.847 | 24 | | |
| L1 | S11 | -36.4 | 0.3 | | | | |
| | S12 | 104.7 | 5.9 | 1.487 | 70 | | |
| | S13 | -24.9 | 2.6 | | | | |
| | S14 | -25.0 | 1.0 | 1.720 | 46 | | |
| | S15 | 205.4 | 2.4 | | | | |
| | S16 | -689.4 | 3.4 | 1.808 | 23 | | |
| | S17 | -29.7 | 86.9 | | | | |
| | S18 * | 20.4 | 6.5 | 1.509 | 57 | | |
| | S19 * | 1.3 | 50.8 | | | 20.6 | SA1max |
| Mr1 | S20 * | -35.3 | -45.8 | REFL | | | |
| Mr2 | S21 * | -51.9 | 53.3 | REFL | | | |
| L2 TR | S22 | 29.1 | 1.8 | 1.808 | 23 | | |
| | S23 | 20.3 | 2.1 | | | | |
| | S24 | 34.2 | 4.0 | 1.487 | 70 | | |
| | S25 | -17.4 | 73.8 | | | 6.6 | SA2max |
| Mr3 | S26 * | -36.7 | -431.4 | REFL | | | |
| | SI | ∞ | | | | | |

\* ·· Aspherical surface
\*\* ·· Free shaped surface
$ ·· Decenter and tilt surface

FIG.44

| S17 | | | | | |
|---|---|---|---|---|---|
| K: | -4.97E-01 | A2: | -9.44E-02 | A3: | -1.37E-03 |
| A4: | 7.97E-04 | A5: | -4.22E-05 | A6: | -2.55E-07 |
| A7: | 5.08E-08 | A8: | 9.95E-10 | A9: | -7.83E-11 |
| A10: | -8.35E-13 | A11: | 7.34E-14 | A12: | -6.84E-16 |

| S18 | | | | | |
|---|---|---|---|---|---|
| K: | -1.06E+00 | A2: | -4.35E-01 | A3: | 2.31E-02 |
| A4: | -6.53E-04 | A5: | 1.24E-05 | A6: | -1.89E-07 |
| A7: | -1.28E-08 | A8: | -1.77E-11 | A9: | 3.46E-11 |
| A10: | 7.61E-13 | A11: | -7.08E-14 | A12: | 7.35E-16 |

| S19 | | | | | |
|---|---|---|---|---|---|
| K: | 1.86E-01 | A2: | -1.64E-03 | A3: | 6.50E-06 |
| A4: | 9.60E-06 | A5: | -3.56E-07 | A6: | 4.97E-09 |
| A7: | -8.99E-11 | A8: | 1.07E-11 | A10: | -8.39E-15 |
| A12: | 5.55E-18 | | | | |

| S20 | | | | | |
|---|---|---|---|---|---|
| K: | 1.30E+00 | A2: | 2.37E-02 | A3: | 5.00E-04 |
| 20.6 A4: | -2.42E-05 | A5: | 6.39E-07 | A6: | 1.07E-09 |
| A7: | -5.90E-10 | A8: | 2.12E-11 | A10: | -1.14E-14 |
| A12: | 5.28E-18 | | | | |

| S25 | | | | | |
|---|---|---|---|---|---|
| K: | -1.12E+00 | A2: | 8.42E-03 | A3: | -4.84E-05 |
| 6.57 A4: | -1.17E-05 | A5: | -1.86E-08 | A6: | 6.98E-09 |
| A7: | -4.02E-11 | A8: | 1.96E-14 | A10: | -6.87E-16 |
| A12: | 1.68E-19 | | | | |

FIG.45

| | |
|---|---|
| T | 280 |
| T2 | 140 |
| TWD2 | 229 |
| TRL | 7.9 |
| SA1max | 20.6 |
| SA2max | 6.6 |
| ry1 | 61.7 |
| ry2 | 30.8 |
| | |
| T2/T | 0.50 |
| T2/TWD2 | 0.61 |
| T/TRL | 35.5 |
| SA1max/SA2max | 3.13 |
| |ry1-ry2|/ry2 | 1.00 |

| | |
|---|---|
| NA | 0.167 |
| Image modulating element(H×VSp) | 13.4 × 7.5 |
| Center position for image modulating element(Chp) | 5.5 |
| Image circle on first-image-surface side(imc) | 22.9 |
| Screen size(H×VSs) | 2214 × 1244 |
| Center position for screen size(Chs) | 902 |

FIG.52

| | | | Curvature radius | thickness | nd | νd | sa | memo |
|---|---|---|---|---|---|---|---|---|
| | | P | ∞ | 8.3 | | | | |
| | | s1 | ∞ | 8.5 | 1.517 | 64 | | |
| | | s2 | ∞ | 44.0 | 1.841 | 25 | | |
| | | s3 | ∞ | 4.0 | | | | |
| | L11 | s4 | 35.7 | 7.3 | 1.808 | 23 | | |
| | | s5 | -118.7 | 1.2 | | | | |
| | | s6 | 54.1 | 7.3 | 1.620 | 60 | | |
| | | s7 | -32.9 | 1.5 | 1.805 | 25 | | |
| | | s8 | 24.4 | 4.9 | | | | |
| L1 | | s9 | 63.4 | 6.6 | 1.487 | 70 | | |
| | | s10 | -17.8 | 1.2 | 1.805 | 25 | | |
| | | s11 | -28.0 | 16.3 | | | | |
| | | s12 | 133.7 | 4.4 | 1.808 | 23 | | |
| | | s13 | -109.5 | 57.7 | | | | |
| | | s14 * | 4.4 | 6.5 | 1.509 | 57 | | |
| | | s15 * | 4.0 | 48.6 | | | 17.5 | SA1max |
| | Mr1 | s16 * | -34.5 | -43.6 | refl | | | |
| | Mr2 | s17 * | -20.1 | 43.6 | refl | | | |
| | | s18 * | -34.5 | 4.0 | 1.509 | 57 | | |
| | | s19 * | -56.5 | 5.0 | | | | |
| L2 | | s20 | 38.2 | 1.2 | 1.847 | 24 | 9.0 | SA2max |
| | TR | s21 | 18.4 | 3.0 | | | | |
| | | s22 | 26.3 | 6.4 | 1.487 | 70 | | |
| | | s23 | -19.6 | 77.0 | | | | |
| | Mr3 | s24 * | -13.2 | -592.1 | refl | | | |
| | | S | ∞ | | | | | |

\* — Aspherical surface
\*\* — Free shaped surface
$ — Decenter and tilt surface

| K: | -1.41E+00 | A2: | -1.81E-01 | A3: | 2.98E-03 |
|---|---|---|---|---|---|
| A4: | 1.05E-03 | A5: | -8.54E-05 | A6: | 1.36E-06 |
| A7: | 2.87E-08 | A8: | 5.50E-09 | A9: | -2.17E-10 |
| A10: | -7.81E-12 | A11: | -1.10E-13 | A12: | 1.96E-14 |

S15

| K: | -3.19E+00 | A2: | -1.73E-01 | A3: | 2.88E-02 |
|---|---|---|---|---|---|
| A4: | -3.50E-03 | A5: | 2.58E-04 | A6: | -1.73E-05 |
| A7: | 2.50E-06 | A8: | -3.44E-07 | A9: | 2.77E-08 |
| A10: | -1.24E-09 | A11: | 2.88E-11 | A12: | -2.67E-13 |

S16 or S18

| K: | -1.87E-01 | A2: | -4.90E-03 | A3: | 5.26E-04 |
|---|---|---|---|---|---|
| A4: | -3.93E-05 | A5: | 1.48E-06 | A6: | 1.45E-09 |
| A7: | -1.37E-09 | A8: | 1.37E-11 | A10: | 2.64E-14 |
| A12: | -1.78E-17 | | | | |

S17

| K: | -8.31E-01 | A2: | 2.98E-02 | A3: | 1.47E-03 |
|---|---|---|---|---|---|
| A4: | -7.67E-05 | A5: | 1.43E-06 | A6: | 3.15E-08 |
| A7: | -1.18E-09 | A8: | 2.94E-12 | A10: | 3.74E-15 |
| A12: | -1.63E-19 | | | | |

S24

| K: | -9.00E-01 | A2: | -1.22E-03 | A3: | 3.73E-03 |
|---|---|---|---|---|---|
| A4: | -1.68E-04 | A5: | 1.18E-06 | A6: | 9.47E-08 |
| A7: | -1.08E-09 | A8: | -2.88E-11 | A10: | 1.29E-14 |
| A12: | -1.32E-18 | | | | |

FIG.54

| | |
|---|---|
| T | 260 |
| T2 | 145 |
| TWD2 | 234 |
| TRL | 10.6 |
| SA1max | 17.5 |
| SA2max | 9.0 |
| ry1 | 54.6 |
| ry2 | 28.4 |
| | |
| T2/T | 0.56 |
| T2/TWD2 | 0.62 |
| T/TRL | 24.6 |
| SA1max/SA2max | 1.94 |
| |ry1−ry2|/ry2 | 0.92 |

IMAGE DISPLAY DEVICE AND PROJECTION OPTICAL SYSTEM

TECHNICAL FIELD

The present technology relates to an image display device such as a projector, and a projection optical system.

BACKGROUND ART

Conventionally, a projector is widely known as a projection image display device that displays a projected image on a screen. Recently, there has been an increasing demand for a super-wide-angle front-projection projector that can perform a large-screen display even in a small projection space. The use of such a projector makes it possible to perform a large-screen projection in a limited space by performing an oblique projection at a wide angle with respect to a screen.

In the super-wide-angle projection projector disclosed in Patent Literature 1, it is possible to perform a screen shift by moving some of the optics included in a projection optical system, the screen shift moving an image projected onto a screen. The use of such a screen shift makes it possible to easily perform fine adjustment of, for example, an image position (for example, paragraphs [0023] and [0024] of the specification in Patent Literature 1).

Patent Literature 2 discloses an objective optical system for a semiconductor exposure device. The objective optical system includes two facing concave mirrors, and includes an optical system capable of imaging an intermediate image (for example, paragraph [0054] of the specification and FIG. 1 in Patent Literature 2).

CITATION LIST

Patent Literature

Patent Literature 1: Japanese Patent No. 5365155
Patent Literature 2: Japanese Patent Application Laid-open No. 2014-59579

DISCLOSURE OF INVENTION

Technical Problem

It is expected that a super-wide-angle projector will continue to be widely used, and thus there is a need for a technology for obtaining a smaller device with an improved performance.

In view of the circumstances described above, it is an object of the present technology to provide an image display device and a projection optical system that make it possible to deal with a super-wide-angle projection and to obtain a smaller device with an improved performance.

Solution to Problem

In order to achieve the object described above, an image display device according to an embodiment of the present technology includes a light source, an image generator, and a projection optical system.

The image generator modulates a light beam emitted by the light source and generates image light.

The projection optical system includes a first lens system, a first reflection optical system, a second lens system, and a second reflection optical system.

The first lens system has a positive refractive power as a whole, and refracts the generated image light.

The first reflection optical system includes two or more reflection surfaces, each reflection surface being a surface off which the image light refracted by the first lens system is reflected.

The second lens system has a positive refractive power as a whole, and refracts the image light reflected off the first reflection optical system.

The second reflection optical system includes a concave reflection surface off which the image light refracted by the second lens system is reflected to be directed to a projected-onto object onto which projection is performed.

In the image display device, the image light refracted by the first lens system is reflected off each of the two or more reflection surfaces of the first reflection optical system. This makes it possible to maintain a sufficient length of a light path of the image light without making the projection optical system larger. This results in being able to make the device smaller. Further, it becomes possible to project a precise image onto the projected-onto object through the second lens system and the second reflection surface, which results in an improved performance.

A first intermediate image of an image made up of the image light, may be formed in a first intermediate image-formation plane situated between the image generator and the first reflection optical system. In this case, a second intermediate image of the image made up of the image light, may be formed in a second intermediate image-formation plane situated between the first reflection optical system and the second lens system. Further, a third intermediate image of the image made up of the image light, may be formed in a third intermediate image-formation plane situated between the second lens system and the second reflection optical system.

A second intermediate image of the image made up of the image light, may be formed in a second intermediate image-formation plane situated between a first reflection surface and a second reflection surface that are included in the two or more reflection surfaces.

The second reflection optical system may form an image made up of the image light on a planar portion included in the projected-onto object.

A principal light ray of the image light may intersect a reference axis four times or more, the reference axis being obtained by extending an optical axis of a lens that is included in the first lens system and situated closest to the image generator.

the principal light ray of the image light may intersect the reference axis at a first point of intersection, a second point of intersection, a third point of intersection, and a fourth point of intersection, the first point of intersection being situated in the first lens system, the second point of intersection being situated between a first reflection surface and a second reflection surface that are included in the two or more reflection surfaces, the third point of intersection being situated between the first reflection optical system and the second reflection optical system, the fourth point of intersection being situated between the second reflection optical system and the projected-onto object.

The image light refracted by the first lens system may be reflected off the first reflection surface. In this case, the image light reflected off the first reflection surface may be reflected off the second reflection surface to be directed to the second lens system.

The first intermediate image-formation plane, the second intermediate image-formation plane, and the third intermediate image-formation plane do not have to be planes substantially orthogonal to the reference axis.

A length T from a first point to a second point, and a length T2 from a third point to the second point may be set to satisfy a relationship indicated by $$0.2 < T2/T < 0.8, \quad (1)$$

the first point corresponding to a position on the reference axis that is included in the first lens system and situated closest to a first side that is a side of the image generator, the second point corresponding to a position on the reference axis that is included in the concave reflection surface and situated closest to a second side that is a side opposite to the first side, the third point corresponding to a position on the reference axis that is included in the first lens system and situated closest to the second side.

A length TWD2 of a light path in the principal light ray of the image light may be set to satisfy a relationship indicated by $$0.2 < T2/TWD < 0.8, \quad (2)$$

the length TWD2 of a light path being a length of a light path from a lens surface to the concave reflection surface, the lens surface being included in the first lens system and situated closest to a second side that is a side opposite to a first side that is a side of the image generator.

A length TRL from a certain point to another point may be set to satisfy a relationship indicated by $$5 < T/TRL < 50, \quad (3)$$

the certain point corresponding to a position on the reference axis that is included in the second lens system and situated closest to a first side that is a side of the image generator, the other point corresponding to a position on the reference axis that is included in the second lens system and situated closest to a second side that is a side opposite to the first side.

An effective diameter SA1max and an effective diameter SA2max may be set to satisfy a relationship indicated by $$1.3 < SA1\ max/SA2\ max < 5, \quad (4)$$

the effective diameter SA1max being an effective diameter of an optic having a largest effective diameter in the first lens system, the effective diameter SA2max being an effective diameter of an optic having a largest effective diameter in the second lens system.

The two or more reflection surfaces may include a first reflection surface and a second reflection surface, the first reflection surface being a surface off which the image light refracted by the first lens system is reflected, the second reflection surface being a surface off which the image light reflected off the first reflection surface is reflected to be directed to the second lens system. In this case, an angle ry1 and an angle ry2 may be set to satisfy a relationship indicated by $$0.5 < |ry1 - ry2|/ry2 < 2.5, \quad (5)$$

the angle ry1 being an angle at which a certain light path in the principal light ray of the image light intersects the reference axis, the certain light path being a light path from the first reflection surface to the second reflection surface, the angle ry2 being an angle at which another light path in the principal light ray of the image light intersects the reference axis, the other light path being a light path from the second reflection surface to the second lens system.

The first lens system may be configured such that an optical axis of an optic included in the first lens system substantially coincides with the reference axis, the first optical system including the optic or a plurality of the optics.

In this case, the second lens system may be configured such that an optical axis of an optic included in the second lens system substantially coincides with the reference axis, the second optical system including the optic or a plurality of the optics.

The concave reflection surface may be configured such that a rotationally symmetric axis of the concave reflection surface substantially coincides with the reference axis. In this case, respective reflection surfaces of the two or more reflection surfaces may be concave reflection surfaces, and may be configured such that rotationally symmetric axes of the respective reflection surfaces substantially coincide with the reference axis.

At least one reflection surface from among the concave reflection surface and the two or more reflection surfaces may be a free-shape surface that does not have a rotationally symmetric axis.

At least one of the two or more reflection surfaces may be a reflection region of an optical member that includes a principal surface including the reflection region and a transmission region, the reflection region being a region off which the image light is reflected, the transmission region being a region through which the image light is transmitted.

A light path of a principal light ray of the image light may be formed in a medium having a refractive index between 1 and 2 inclusive, the light path being a light path from the first reflection surface to the second reflection surface.

A projection optical system according to an embodiment of the present technology is a projection optical system that projects image light generated by modulating a light beam emitted by a light source, and includes a first lens system, a first reflection optical system, a second lens system, and a second reflection optical system.

Advantageous Effects of Invention

As described above, the present technology makes it possible to deal with a super-wide-angle projection and to obtain a smaller device with an improved performance. Note that the effect described here is not necessarily limitative and may be any effect described in the present disclosure.

BRIEF DESCRIPTION OF DRAWINGS

FIG. 6 is a table in which an example of parameters related to image projection is given.

FIG. 7 illustrates lens data of the image display device.

FIG. 8 is a table in which an example of aspheric coefficients of optics included in the projection optical system, is given.

FIG. 9 is a table in which values of parameters used in conditional expressions (1) to (5) are given.

FIG. 10 schematically illustrates an example of an image projected by the projection optical system.

FIG. 15 is a table in which an example of parameters related to image projection is given.

FIG. 16 illustrates lens data of an image display device.

FIG. 17 is a table in which an example of aspheric coefficients; free-shape surface coefficients; components of decentering in X, Y, and Z directions; and components of rotation about an X axis, rotation about a Y axis, and rotation about a Z axis of optics included in the projection optical system, is given.

FIG. 18 is a table in which an example of aspheric coefficients; free-shape surface coefficients; components of decentering in the X, Y, and Z directions; and components of a rotation about an axis in the X direction, a rotation about an axis in the Y direction, and a rotation about an axis in the Z direction of optics included in the projection optical system, is given.

FIG. 19 is a table in which values of parameters used in the conditional expressions (1) to (5) are given.

FIG. 20 schematically illustrates an example of an image projected by the projection optical system.

FIG. 25 is a table in which an example of parameters related to image projection is given.

FIG. 26 illustrates lens data of an image display device.

FIG. 27 is a table in which an example of aspheric coefficients of optics included in the projection optical system, is given.

FIG. 28 is a table in which values of parameters used in the conditional expressions (1) to (5) are given.

FIG. 29 schematically illustrates an example of an image projected by the projection optical system.

FIG. 34 is a table in which an example of parameters related to image projection is given.

FIG. 35 illustrates lens data of an image display device.

FIG. 36 is a table in which an example of aspheric coefficients of optics included in the projection optical system, is given.

FIG. 43 is a table in which an example of parameters related to image projection is given.

FIG. 44 illustrates lens data of an image display device.

FIG. 45 is a table in which an example of aspheric coefficients of optics included in the projection optical system, is given.

FIG. 52 is a table in which an example of parameters related to image projection is given.

FIG. 53 illustrates lens data of an image display device.

FIG. 54 is a table in which an example of aspheric coefficients of optics included in the projection optical system, is given.

MODE(S) FOR CARRYING OUT THE INVENTION

Embodiments according to the present technology will now be described below with reference to the drawings.

[Outline of Projection Image Display Device]

An outline of a projection image display device is simply described using a liquid crystal projector as an example. The liquid crystal projector spatially modulates light irradiated by a light source so as to generate an optical image (image light) corresponding to a video signal. For example, a liquid crystal display element that is an image modulating element is used to modulate light. For example, a 3CCD liquid crystal projector is used that includes liquid crystal display elements in the form of a panel (liquid crystal panels) that respectively correspond to R, G, and B.

The optical image is enlarged to be projected by a projection optical system, and displayed on a screen. Here, descriptions will be made on the assumption that the projection optical system deals with a super-wide-angle projection in which, for example, half the angle of view is about 70°. Of course, the angle is not limited to this.

The super-wide-angle liquid crystal projector can perform a large-screen display even in a small projection space. In other words, even if a distance between the liquid crystal projector and a screen is short, an enlarged projection is possible. This provides the following advantages.

Since the liquid crystal projector can be arranged close to the screen, it is possible to sufficiently reduce the possibility that light from the liquid crystal projector enters the eye of a man directly. This results in a high degree of safety.

The shadow of, for example, a man does not appear on a display (the screen), which results in an efficient presentation.

There is an increased flexibility in selecting an installation position, and this makes it possible to easily install it, for example, in a narrow installation space or on a ceiling having many obstacles.

Compared to the installation on a ceiling, maintenance such as a routing of cabling becomes easier by it being installed on a wall to be used.

It is possible to increase the flexibility in performing settings at, for example, a room for discussions, a classroom, or a meeting room.

Figure 1:
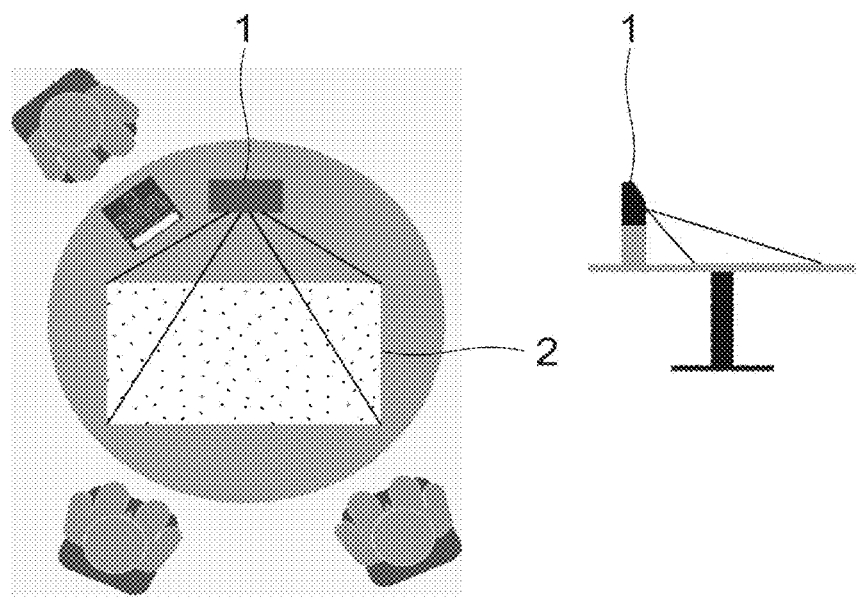
FIG. 1 is a schematic diagram for explaining other advantages of a super-wide-angle liquid crystal projector.

FIG. 1 is a schematic diagram for explaining other advantages of a super-wide-angle liquid crystal projector. As illustrated in FIG. 1, it is possible to project an enlarged image 2 onto a table by installing a super-wide-angle liquid crystal projector 1 on the table. Such a usage is also possible, and makes it possible to use a space efficiently.

Recently, with a widespread use of, for example, an interactive white board in school or workplace, there has been an increased demand for a super-wide-angle liquid crystal projector. Further, a similar liquid crystal projector is also used in the field of, for example, digital signage. Note that a technology such as a liquid crystal display (LCD) or a plasma display panel (PDP) can also be used for the interactive white board. Compared to using those technologies, the use of a super-wide-angle liquid crystal projector makes it possible to provide a large-screen display while reducing costs. Note that the super-wide-angle liquid crystal projector is also called, for example, a short focus projector or an ultra-short focus projector.

First Embodiment

[Image Display Device]

Figure 2:
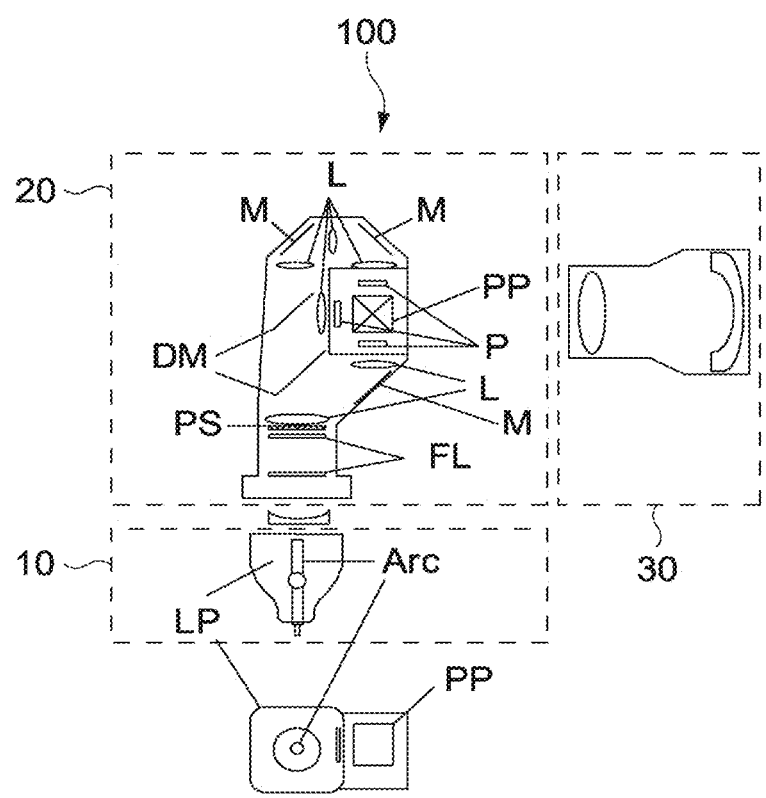
FIG. 2 schematically illustrates an example of a configuration of a projection image display device according to a first embodiment.

FIG. 2 schematically illustrates an example of a configuration of a projection image display device according to a first embodiment of the present technology. An image display device 100 includes a light source 10, an illumination optical system 20, and a projection optical system 30.

The light source 10 is arranged to emit a light beam to the illumination optical system 20. For example, a high-pressure mercury lamp is used as the light source 10. Further, a solid-state light source such as a light emitting diode (LED) or a laser diode (LD) may be used.

The illumination optical system 20 uniformly irradiates the light beam emitted from the light source 10 onto a surface of an image modulating element (a liquid crystal panel P) that is a first image surface. In the illumination optical system 20, the light beam from the light source 10 passes through two fly eye lenses FL, a polarization conversion element PS, and a condenser lens L in this order, and is converted into a uniform light beam by being uniformly polarized.

The light beam that has passed through the condenser lens L is separated into pieces of light of respective color components of R, G, and B by a dichroic mirror DM off which only light of a specified wavelength band is reflected. The pieces of light of the respective color components of R, G, and B enter the respective liquid crystal panels P (the respective image modulating elements) through, for example, a fully reflective mirror M or the lens L, the liquid crystal panels P being provided correspondingly to the respective colors of R, G, and B. Then, a light modulation depending on a video signal is performed by each of the liquid crystal panels P. The modulated pieces of light of the respective color components are combined by a dichroic prism PP, and image light is generated. Then, the generated image light is emitted to the projection optical system 30.

The optic or the like included in the illumination optical system 20 is not limited, and an optic other than the optic described above may be used. Instead of the transmissive liquid crystal panel P, for example, a reflective liquid crystal panel or a digital micromirror device (DMD) may be used as the image modulating element. Further, instead of the dichroic prism PP, for example, a polarization beam splitter (PBS), a color combining prism that combines video signals of the respective colors of R, G, and B, or a total internal reflection (TIR) prism may be used. In the present embodiment, the illumination optical system 20 corresponds to an image generator.

The projection optical system 30 adjusts the image light emitted from the illumination optical system 20, and enlarges and projects the image light onto a screen that is a second image surface. In other words, image information regarding the first image surface (the liquid crystal panel P) is adjusted and enlarged to be projected onto the second image surface (the screen) by the projection optical system 30.

In the present embodiment, the screen corresponds to a projected-onto object onto which projection is performed, and a certain portion of the screen corresponds to a planar portion of the projected-onto object, the certain portion being a portion onto which an image is projected. Further, the projected-onto object is not limited, and the present technology is applicable to displaying an image on any projected-onto object such as the table illustrated in FIG. 1 or a wall of, for example, a building.

Figure 3:
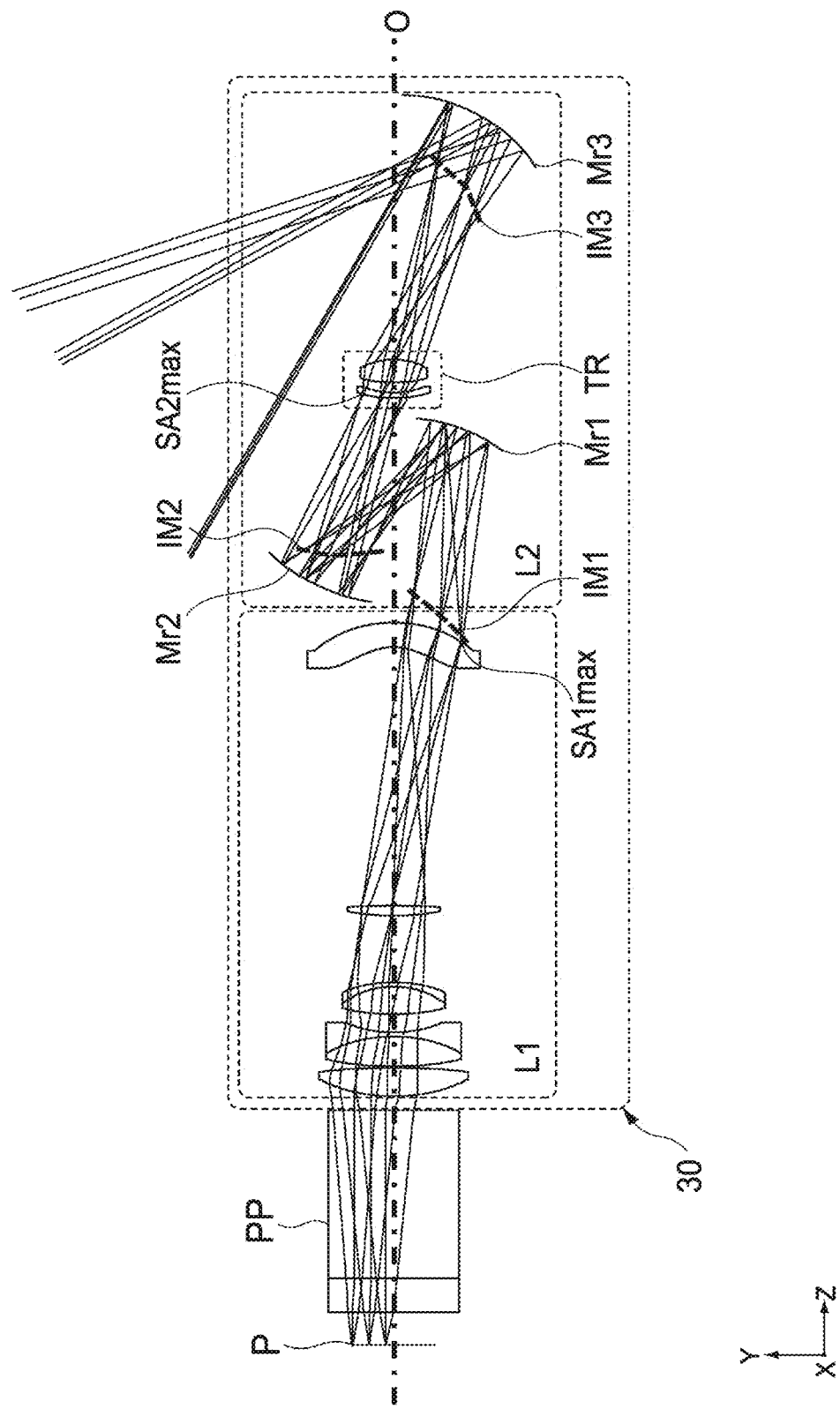
FIG. 3 is a light-path diagram schematically illustrating an example of a configuration of a projection optical system according to the first embodiment.
Figure 4:
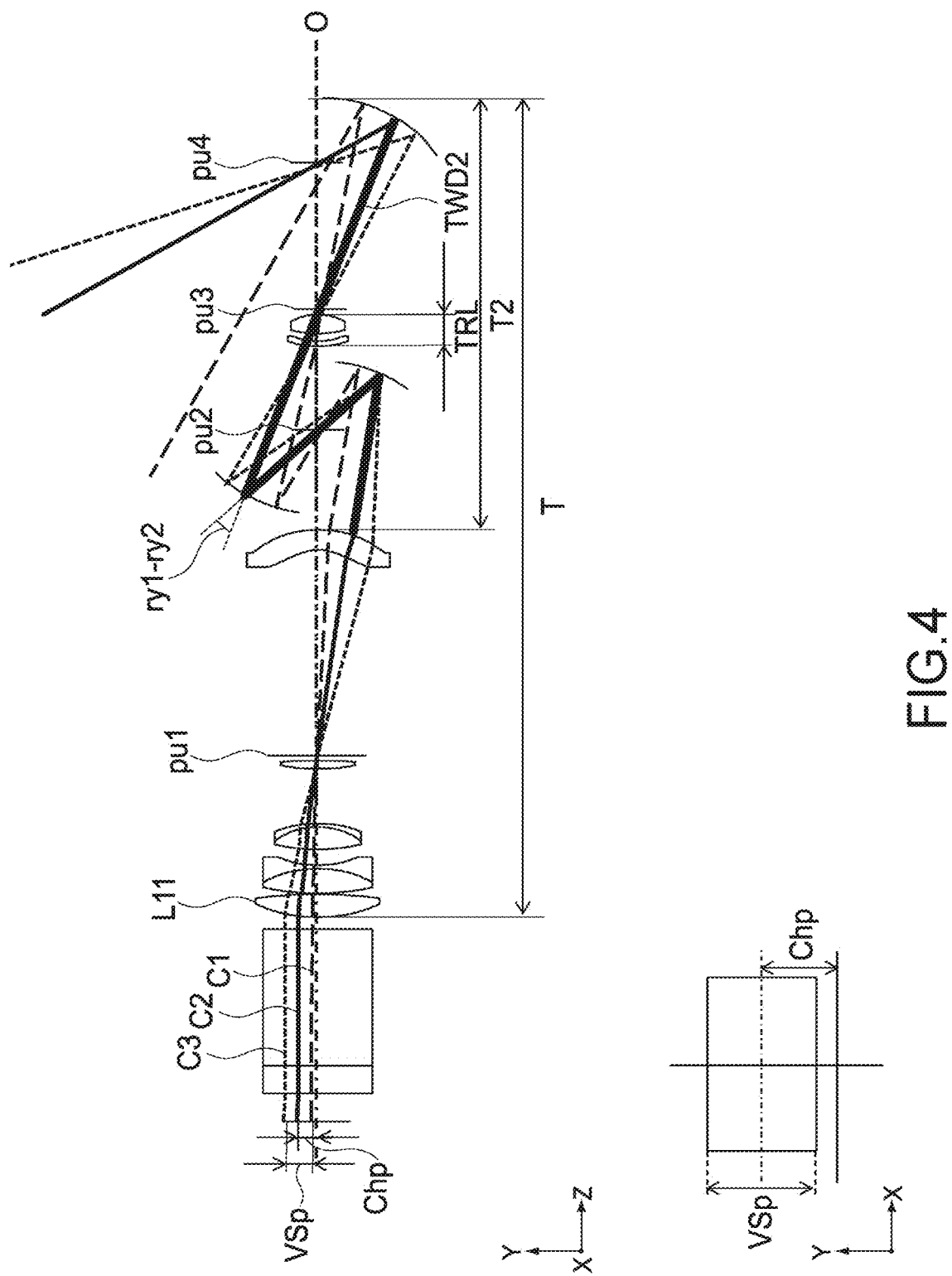
FIG. 4 is a light-path diagram schematically illustrating the example of the configuration of the projection optical system according to the first embodiment.
Figure 5:
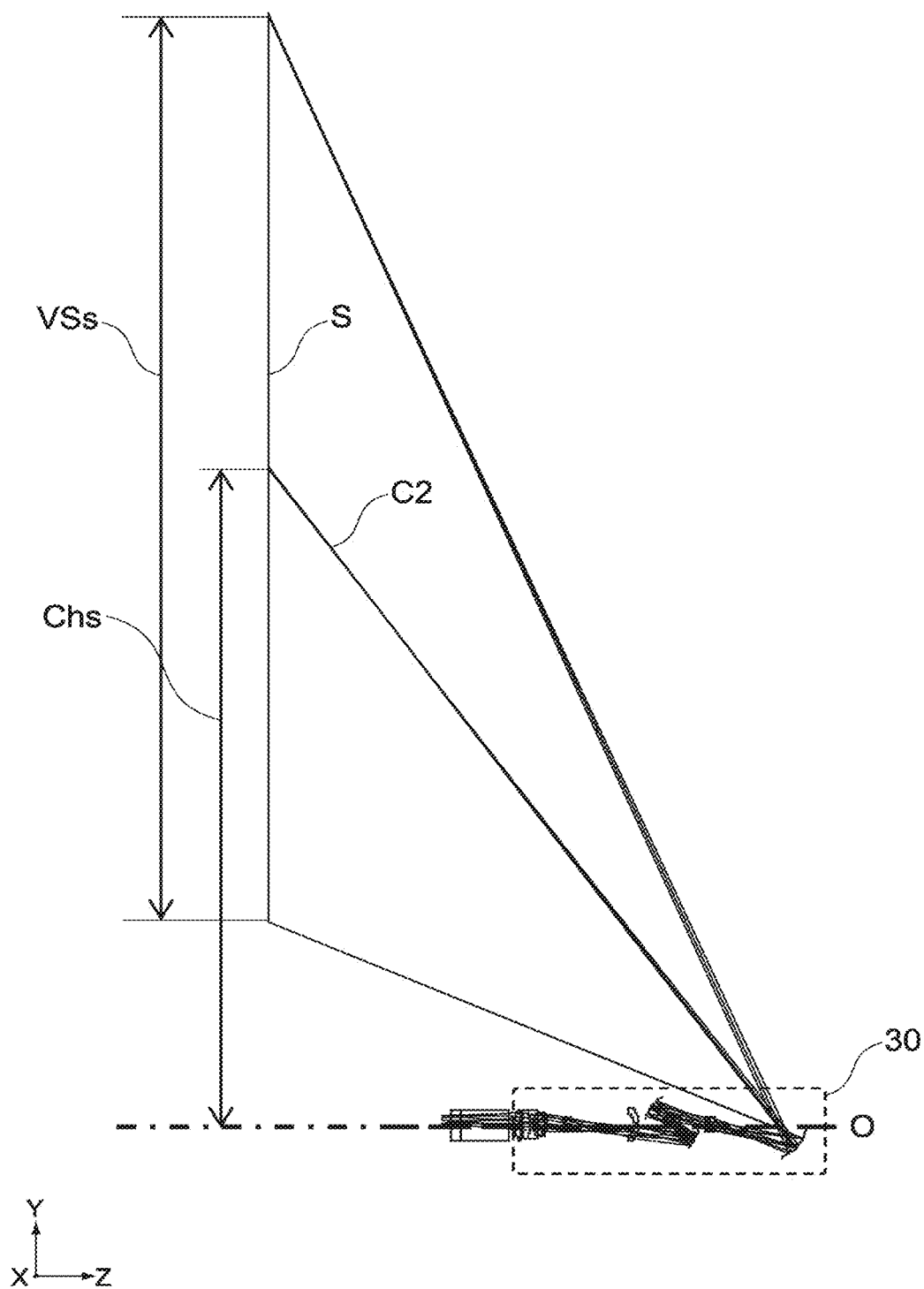
FIG. 5 is a light-path diagram schematically illustrating the example of the configuration of the projection optical system according to the first embodiment.

FIGS. 3 to 5 are light-path diagrams schematically illustrating an example of a configuration of the projection optical system according to the first embodiment. Here, the liquid crystal panel P and the dichroic prism PP of the illumination optical system 20 are schematically illustrated.

In the following descriptions, the emission direction in which image light is emitted from the dichroic prism PP to the projection optical system, is referred to as a Z direction. Further, the lateral direction of the first image surface (the liquid crystal panel P) is referred to as an X direction, and the longitudinal direction of the first image surface is referred to as a Y direction. The X direction and the Y direction respectively correspond to the lateral direction and the longitudinal direction of an image enlarged to be projected onto the second image surface (the screen).

Further, for convenience, a description may be made with the Z direction in a figure being referred to as a side-to-side direction and with the Y direction in the figure being referred to as an up-and-down direction on the assumption that the projection optical system is viewed from the side of the projection optical system. Of course, the direction in which image light travels is not limited to the directions, and is determined according to, for example, the orientation or the pose of the image display device 100.

The projection optical system 30 includes a first optical system L1 and a second optical system L2. The first optical system L1 has a positive refractive power as a whole, and refracts image light generated by the illumination optical system 20.

As illustrated in FIG. 3, the first optical system L1 is configured such that an optical axis of an optic included in the first optical system L1 substantially coincides with a reference axis in common that extends in the Y direction, the first optical system L1 including the optic or a plurality of the optics (the reference axis is hereinafter referred to as an optical axis O). Note that the optical axis of an optic is typically an axis that passes through the center of an optical surface of the optic such as a lens surface or a reflection surface. For example, when the optical surface of an optic has a rotationally symmetric axis, the rotationally symmetric axis corresponds to an optical axis of the optic.

In the present embodiment, the optical axis O is an axis obtained by extending an optical axis (a rotationally symmetric axis) of a lens L11 that is included in the first optical system L1 and situated closest to the illumination optical system 20. In other words, optics other than the lens L11 are arranged on the axis obtained by extending the optical axis of the lens L11. Note that image light is emitted in parallel with the optical axis O from a position to which the optical axis O is offset in a vertical direction (the up-and-down direction). In the present embodiment, the first optical system L1 corresponds to a first lens system.

The second optical system L2 includes a first reflection surface Mr1, a second reflection surface Mr2, a second lens system TR, and a concave reflection surface Mr3. The first reflection surface Mr1 is arranged below the optical axis O, and image light refracted by the first optical system L1 is reflected off the first reflection surface Mr1. Specifically, image light entering from the left is reflected off the first reflection surface Mr1 to be directed to the upper left.

The first reflection surface Mn1 is a concave reflection surface. Specifically, the first reflection surface Mr1 is a rotationally symmetric aspherical surface that is configured such that the rotationally symmetric axis coincides with the optical axis O, and an available region in first reflection surface Mr1 only has a reflective portion, the available region being a region that image light enters. In other words, the available region is not arranged in an entire rotationally symmetric aspherical surface, but is arranged only in a necessary portion of the rotationally symmetric aspherical surface. This makes it possible to make the device smaller.

The second reflection surface Mr2 is arranged above the optical axis O, and the image light refracted by the first optical system L1 is reflected off the second reflection surface Mr2 to be directed to the second lens system TR. Specifically, image light entering from the lower right is reflected off second reflection surface Mr2 to be directed to the right.

The second reflection surface Mr2 is a concave reflection surface. Specifically, the second reflection surface Mr2 is a rotationally symmetric aspherical surface that is configured such that the rotationally symmetric axis coincides with the optical axis O, and an available region in second reflection surface Mr2 only has a reflective portion, the available region being a region that image light enters. In other words, the available region is not arranged in an entire rotationally symmetric aspherical surface, but is arranged only in a necessary portion of the rotationally symmetric aspherical surface. This makes it possible to make the device smaller.

In the present embodiment, the first and second reflection surfaces Mn1 and Mr2 constitute a first reflection optical system. Further, the first and second reflection surfaces Mr1 and Mr2 are reflection surfaces included in two or more reflection surfaces.

The second lens system TR has a positive refractive index as a whole, and refracts the image light reflected off the first reflection optical system, that is, the image light reflected off the second reflection surface Mr2. As illustrated in FIG. 3, the second lens system TR is configured such that an optical axis of an optic included in the second lens system TR substantially coincides with the optical axis O, the second lens system TR including the optic or a plurality of the optics.

The image light refracted by the second lens system TR is reflected off the concave reflection surface Mr3 to be directed to the screen. The concave reflection surface Mr3 is a rotationally symmetric aspherical surface that is configured such that the rotationally symmetric axis coincides with the optical axis O, and an available region in the concave reflection surface Mr3 only has a reflective portion, the available region being a region that image light enters. In other words, the available region is not arranged in an entire rotationally symmetric aspherical surface, but is arranged only in a necessary portion of the rotationally symmetric aspherical surface. This makes it possible to make the device smaller.

In the present embodiment, the concave reflection surface Mr3 constitutes a second reflection optical system.

As illustrated in FIG. 3, in the present embodiment, the first optical system L1 and the second optical system L2 are configured on the optical axis O in common. In other words, the first optical system L1, the first and second reflection surfaces Mr1 and Mr2, the second lens system TR, and the concave reflection surface Mr3 are configured such that the axis obtained by extending the optical axis (the rotationally symmetric axis) of the lens L11 situated closest to the illumination optical system 20, substantially coincides with the respective optical axes (the respective rotationally symmetric axes) of the first optical system L1, the first and second reflection surfaces Mr1 and Mr2, the second lens system TR, and the concave reflection surface Mr3. This makes it possible to reduce the size in the Y direction, and thus to make the device smaller.

A light path of image light is described with reference to FIGS. 3 to 5. The description is made on the assumption that, from among image light emitted from the dichroic prism PP to the projection optical system 30, a light ray emitted from the center of the liquid crystal panel P is a principal light ray C2 of the image light, as illustrated in FIG. 4.

Image light emitted, in parallel with the optical axis O, to the projection optical system 30 from a position to which the optical axis O is offset upwards, intersects the optical axis O in the first optical system L1, and travels below the optical axis O. Specifically, the principal light ray C2 of the image light intersects the optical axis O at a first point of intersection pu1 in the first optical system L1.

The image light emitted from the first optical system L1 is reflected off the first reflection surface Mr1 to be directed to the upper left, and intersects the optical axis O again. Specifically, the principal light ray C2 of the image light intersects the optical axis O at a second point of intersection put situated between the first reflection surface Mn1 and the second reflection surface Mr2.

The image light reflected to be directed to the upper left is reflected off the second reflection surface Mr2 to be directed to the second lens system TR. Then, the image light intersects the optical axis O again and travels to the lower right. Specifically, the principal light ray C2 of the image light intersects the optical axis O at a third point of intersection pu3 situated between the first reflection optical system and the second reflection optical system, that is, between the second reflection surface Mr2 and the concave reflection surface Mr3.

In the present embodiment, the third point of intersection pu3 is situated on the right side of the second lens system TR. In other words, the image light reflected off the second reflection surface Mr2 intersects the optical axis O after being transmitted through the second lens system TR.

The image light traveling to the lower right is reflected off the concave reflection surface Mr3, intersects the optical axis O again, and travels toward the screen. Specifically, the principal light ray C2 of the image light intersects the optical axis O at a fourth point of intersection pu4 situated between the second reflection optical system and a projected-onto object onto which projection is performed, that is, between the concave reflection surface Mr3 and the screen.

As described above, in the present embodiment, a light path of image light is formed such that the principal light ray C2 intersects the optical axis O four times. This makes it possible to form, near the optical axis O, a light path of image light up to the concave reflection surface Mr3. This results in being able to reduce the size of the device in the X direction, and thus to make the device smaller.

Further, image light is reflected off both the first and second reflection surfaces Mr1 and Mr2. This makes it possible to maintain a sufficient length of a light path of the image light. This results in being able to reduce the size of the device in the X direction, and thus to make the device smaller.

Further, in the projection optical system 30 according to the present embodiment, a first intermediate image is formed in a first intermediate image-formation plane IM1 situated between the dichroic prism PP included in the illumination optical system 20 and the first reflection optical system, that is, between the dichroic prism PP and the first reflection surface Mr1, as illustrated in FIG. 3. Here, the intermediate image is an intermediate image of an image made up of image light.

Furthermore, a second intermediate image is formed in a second intermediate image-formation plane IM2 situated between the first reflection surface Mn1 and the second reflection surface Mr2. Moreover, a third intermediate image is formed in a third intermediate image-formation plane IM3 situated between the second lens system TR and the second reflection optical system, that is, between the second lens system TR and the concave reflection surface Mr3.

Then, an image is formed on the screen by the concave reflection surface Mr3. This makes it possible to project image light at a super-wide angle. For example, even if a distance between a projector and a screen is short, it is possible to perform a large-screen display.

In order to form a precise image on the planar screen using the concave reflection surface Mr3, it is important to optically properly correct an image generated by the illumination optical system 20 and to guide the image to the concave reflection surface Mr3. In the present embodiment, it is possible to optically correct an image with a high degree of precision since it is possible to maintain a sufficient length of a light path of image light using the first and second reflection surfaces Mr1 and Mr2. In other words, it becomes possible to generate a proper intermediate image, and thus, it is possible to easily form a precise image on the screen.

Further, since the sufficient length of the light path is maintained, it becomes possible to reduce an optical load necessary to generate a proper intermediate image, and to suppress power from the respective optics included in the projection optical system 30. This results in being able to make the respective optics smaller, and thus to make the entire device smaller.

Furthermore, since three intermediate images that are the first to third intermediate images are formed in the projection optical system 30, it becomes possible to generate optimal intermediate images with a high degree of precision. This results in being able to display a precise image on the screen using the concave reflection surface Mr3. As described above, the use of the projection optical system 30 according to the present embodiment makes it possible to improve the performance of the device.

Note that, as illustrated in FIG. 3, the three respective intermediate image-formation planes that are the first to third intermediate image-formation planes IM1 to IM3 are not planes substantially orthogonal to the optical axis O. The formation of an intermediate image in a non-planar image-formation plane makes it possible to optimize the intermediate image, and this results in improving the accuracy in forming an image on the screen using the concave reflection surface Mr3.

Here, the inventors have found five conditions (1) to (5) for obtaining a smaller device with an improved performance with respect to the projection optical system 30. The conditions are described with reference to FIG. 4.

(Condition 1)

It is assumed that a side on the optical axis O that includes the dichroic prism PP (on the left in FIG. 4) is a first side, and the opposite side (on the right in FIG. 4) is a second side.

It is assumed that a length between a first point and a second point is T, the first point corresponding to a position on the optical axis O that is included in the first optical system L1 and situated closest to the first side, the second point corresponding to a position on the optical axis O that is included in the concave reflection surface Mr3 and situated closest to the second side. The length T corresponds to an entire length of the projection optical system 30 in the X direction.

It is assumed that a length from a third point to the second point is T2, the third point corresponding to a position on the optical axis O that is included in the first lens system L1 and situated closest to the second side. The length T2 corresponds to an entire length of the second optical system L2 in the X direction.

The length T and the length T2 described above are set to satisfy the following relationship.

$$0.2 < T2/T < 0.8 \quad (1)$$

Note that, when the position included in the first optical system L1 and situated closest to the first side does not intersect the optical axis O, a perpendicular is drawn from the position situated closest to the first side to the optical axis O, and a point of intersection of the perpendicular with the optical axis O is the first point. Likewise, when the position included in the concave reflection surface Mr3 and situated closest to the second side does not intersect the optical axis O, a perpendicular is drawn from the position situated closest to the second side to the optical axis O, and a point of intersection of the perpendicular with the optical axis O is the second point. This is matter in common regarding the phrase of "a point corresponding to a position that is situated closest to a side".

The conditional expression (1) limits a proper entire length of a lens group of the second optical system L2. If T2/T falls below a lower limit defined in the conditional expression (1), it is difficult to generate a proper intermediate image since the entire length of the second optical system L2 is too short, which results in difficulty in maintaining a high performance. If T2/T exceeds an upper limit defined in the conditional expression (1), this results in making the second optical system L2 larger, and thus it is difficult to make the device smaller.

(Condition 2)

A length TWD2 of a light path in the principal light ray C2 of image light is set to satisfy the following relationship, the length TWD2 of a light path being a length of a light path from a lens surface to the concave reflection surface Mr3, the lens surface being included in the first optical system L1 and situated closest to the second side. The length TWD2 of the light path is a length of an optical path between a position in an optic at which light is emitted from the optic, and the concave reflection surface Mr3, the optic being an optic that is included in the first optical system L1 and situated closest to the output side of the first optical system L1.

$$0.2 < T2/TWD < 0.8 \qquad (2)$$

The conditional expression (2) properly limits reflection distances from the first and second reflection surfaces Mr1 and Mr2 included in the second optical system L2. If T2/TWD falls below a lower limit defined in the conditional expression (2), the reflection distances become long, which results in making the entire second optical system L2 larger. If T2/TWD exceeds an upper limit defined in the conditional expression (2), it is difficult to generate a proper intermediate image since the reflection distances become short, which results in difficulty in maintaining a high performance.

(Condition 3)

A length TRL between a certain point and another point is set to satisfy the following relationship, the certain point corresponding to a position on the optical axis O that is included in the second lens system TR and situated closest to the first side, the other point corresponding to a position on the optical axis O that is included in the second lens system TR and situated closest to the second side. The length TRL corresponds to an entire length of the second lens system TR in the X direction.

$$5 < T/TRL < 50 \qquad (3)$$

The conditional expression (3) limits a proper size of the second lens system TR. If T/TRL falls below a lower limit defined in the conditional expression (3), the second lens system TR becomes larger, which results in making the entire projection optical system 30 larger. If T/TRL exceeds an upper limit defined in the conditional expression (3), it is difficult to generate a proper intermediate image since the second lens system TR becomes too small, which results in difficulty in maintaining a high performance.

(Condition 4)

It is assumed that SA1max represents an effective diameter of an optic having a largest effective diameter in the first lens system L1. In other words, SA1max represents an effective diameter of an optic, from among the optics included in the first lens system L1, that has an available region of a largest effective diameter, the available region being a region that image light enters.

It is assumed that SA2max represents an effective diameter of an optic having a largest effective diameter in the second lens system TR. In other words, SA2max represents an effective diameter of an optic, from among the optics included in the second lens system TR, that has an available region of a largest effective diameter, the available region being a region that the image light enters.

The effective diameter SA1max and the effective diameter SA2max described above are set to satisfy the following relationship.

$$1.3 < SA1\,\mathrm{max}/SA2\,\mathrm{max} < 5 \qquad (4)$$

The conditional expression (4) limits proper sizes of the first optical system L1 and the second optical system L2. When SA1max/SA2max falls below a lower limit defined in the conditional expression (4), an outer diameter of the second lens system TR becomes large, which results in making the entire projection optical system 30 larger. If SA1max/SA2max exceeds an upper limit defined in the conditional expression (4), it is difficult to generate a proper intermediate image since the second lens system TR becomes too small, which results in difficulty in maintaining a high performance.

(Condition 5) It is assumed that ry1 represents an angle at which a light path in the principal light ray C2 of the image light intersects the optical axis O, the light path being a light path from the first reflection surface Mr1 to the second reflection surface Mr2.

It is assumed that ry2 represents an angle at which a light path in the principal light ray C2 of the image light intersects the optical axis O, the light path being a light path between the second reflection surface Mr2 and the second lens system TR.

The angles ry1 and ry2 described above are set to satisfy the following relationship.

$$0.5 < |ry1 - ry2|/ry2 < 2.5 \qquad (5)$$

The conditional expression (5) properly limits angles of incidence of a light ray on the first reflection surface Mr1 and the second reflection surface Mr2, and concave shapes of the first reflection surface Mn1 and the second reflection surface Mr2. When |ry1−ry2| falls below a lower limit defined in the conditional expression (5), the light ray reflected off the first reflection surface Mr1 and the light ray reflected off the second reflection surface Mr2 easily interfere with each other. In other words, there is a good possibility that a portion of light reflected off the second reflection surface Mr2 will enter the first reflection surface Mr1. When |ry1−ry2| exceeds an upper limit defined in the conditional expression (5), the entire length of the projection optical system 30 becomes larger since a light ray reflected off the second reflection surface Mr2 intersects the optical axis O at too small an angle.

The lower limit and the upper limit defined in each of the conditional expressions (1) to (5) are not limited to the values described above. For example, the lower limit and the upper limit in each of the conditional expressions that are used to indicate a proper range can also be changed as appropriate, according to the configuration of, for example, the illumination optical system 20 or the projection optical system 30. For example, any values included in each of the ranges described above may be selected to be a lower limit and an upper limit, and an optimal range may be set again using the selected values. For example, the following ranges can be set with respect to the conditional expression (5).

$$0.5 < |ry1 - ry2|/ry2 < 2.0$$

$$0.5 < |ry1 - ry2|/ry2 < 1.5$$

$$0.5 < |ry1 - ry2|/ry2 < 1.2$$

The projection optical system 30 having the configuration described above is simply described using specific examples of values.

FIG. 6 is a table in which an example of parameters related to image projection is given. The numerical aperture NA of the projection optical system 30 on a side of the first image surface is 0.167. The lateral length and the longitudinal length (H×VSp) of the image modulating element (the liquid crystal panel P) are 13.4 mm and 7.5 mm, respectively. The center position (Chp) of the image modulating element is situated 5.5 mm above the optical axis O.

The image circle (imc) on the side of the first image surface is φ22.9 mm. The lateral length and the longitudinal length (H×VSs) of the screen are 1771 mm and 996 mm, respectively. The center position (Chs) of the image modulating element is situated 722 mm above the optical axis O.

FIG. 7 illustrates lens data of the image display device. Data regarding optics (lens surfaces) s1 to s22 that are arranged from the side of the first image surface (P) to a side of the second image surface (S), is given in FIG. 7. The radius of curvature (mm), the thickness d (mm), the refractive index nd with respect to a d line (587.56 nm) and the Abbe number vd with respect to the d line are given as data of the respective optics (the respective lens surfaces).

Further, the effective diameter SA1max of an optic having a largest effective diameter in the first lens system L1, and the effective diameter SA2max of an optic having a largest effective diameter in the second lens system TR are given in FIG. 7.

Note that an optic having an aspherical surface conforms to the following formula.

$$Z = \frac{ch^2}{1 + \{1 - (1-K)c^2h^2\}^{1/2}} + \sum_{i=1} A i h^i \qquad \text{[Formula 1]}$$

FIG. 8 is a table in which an example of aspheric coefficients of the optics included in the projection optical system, is given. Aspheric coefficients of each of the optics s14 to s17 and s22 are given in FIG. 8, the optics s14 to s17 and s22 each having an aspherical surface and being marked with an asterisk (*). The aspheric coefficients given in the figure as an example conform to the formula described above (Formula 1).

FIG. 9 is a table in which values of parameters used in the conditional expressions (1) to (5) described above in the present embodiment, are given.

T2/T 0.53
T2/TWD 0.59
T/TRL 26.8
SA1max/SA2max 2.48
|ry1−ry2|/ry2 0.87

The result described above is obtained, and it is understood that the conditional expressions (1) to (5) are satisfied.

Further, 1.0, which is a value obtained using (Chs/VSs)/(Chp/VSp), is also given in FIG. 9.

FIG. 10 schematically illustrates an example of an image projected by the projection optical system. FIG. 10 illustrates a projected image 40 with bold lines, in which points 1, 2, and 3 respectively correspond to a position at which an image of the light ray C1 illustrated in FIG. 4 is formed, a position at which an image of the light ray C2 illustrated in FIG. 4 is formed, and a position at which an image of the light ray C3 illustrated in FIG. 4 is formed. In other words, an image of the principal light ray C2 emitted from the center of the liquid crystal panel P is formed at a center portion of an image projected onto the screen. As illustrated in FIG. 10, a generally rectangular planar image is projected, from which it is understood that a high performance is achieved.

Figure 11:
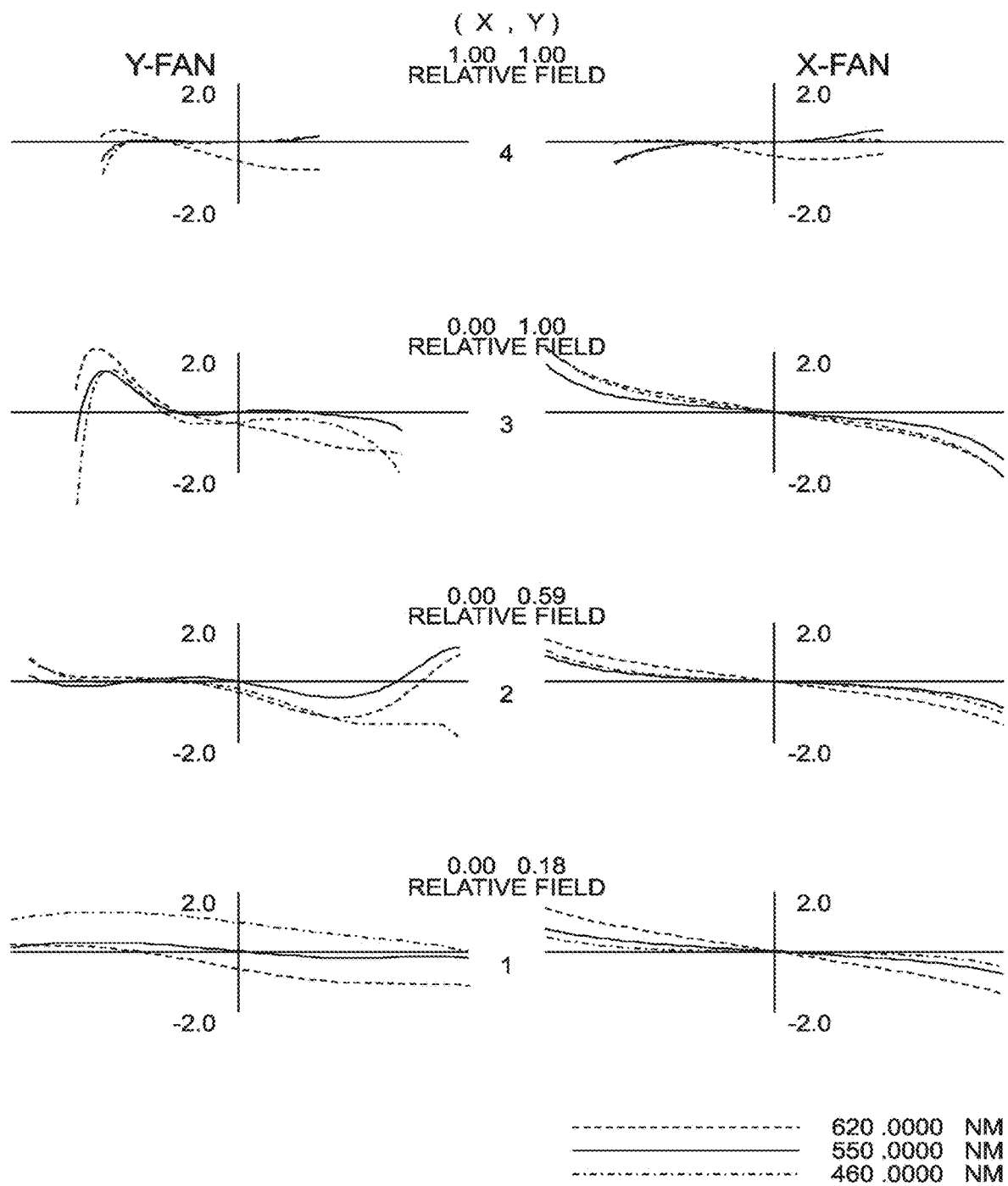
FIG. 11 is a set of graphs illustrating examples of a transverse aberration related to the projected image.

FIG. 11 is a set of graphs illustrating examples of a transverse aberration related to the projected image. FIG. 11 illustrates an aberration in a cross section in the lateral direction (the X direction) and an aberration in a cross section in the longitudinal direction (the Y direction) at each of the points 1 to 4 illustrated in FIG. 10. With respect to the wavelengths of 620 nm, 550 nm, and 460 nm respectively depicted with a dotted line, a solid line, and a dot-dash line, deviations on the image surface (indicated on the vertical axis) are within about 2 mm, from which it is understood that it is possible to project a precise image.

As described above, in the image display device 100 according to the present embodiment, image light refracted by the first optical system L1 is reflected off both the first and second reflection surfaces Mn1 and Mr2 in the first reflection optical system. This makes it possible to maintain a sufficient length of a light path of the image light without making the projection optical system 30 larger. This results in being able to make the device smaller. Further, it becomes possible to project a precise image onto the screen through the second lens system TR and the concave reflection surface Mr3, which results in an improved performance.

When an optical system is configured that includes a large concave reflection surface arranged closest to a screen side, in order to provide a super-wide-angle-projection projector, a chromatic aberration is less likely to occur and thus a wide-angle projection is relatively easily performed, compared to an optical system that only includes a refractive system (a lens system).

Here, the case in which one intermediate image is formed in a light path up to a concave reflection surface using a lens system, is discussed. In this case, due to the characteristics of a concave reflection surface of a curved surface, and due to the fact that the second image surface that serves as a screen is a planar surface substantially orthogonal to an optical axis of the refractive system, there is a need for an intermediate image that has an image surface largely curved in a direction of the first image surface and in which the tangential plane is curved more largely than the sagittal plane.

Thus, in terms of achievement of an improved performance, there is a need to perform arrangement such that an intermediate image-formation plane is formed into the form of the concave reflection surface. This results in a configuration indicated below that places a burden on the refractive system.

The concave reflection surface is an aspherical surface, and the number of aspheric coefficients is increased.

An entire optical system including the concave reflection surface has a specified size or more.

The number of lenses in the refractive system is increased and an aspherical lens is added as necessary.

The adoption of such a configuration makes it possible to form an image on a screen in a planar manner. However, this results in making the concave reflection surface and the refractive system larger, and thus it is difficult to reduce the size and costs.

With respect to such a problem, one more relay optical system may be provided in the refractive system so as to arrange one more intermediate image-formation plane having a curved image surface. Consequently, a more appropriate correction is performed with respect to the curvature of field remaining due to an imperfect correction performed using one intermediate image. Thus, it becomes possible to perform image formation on a smaller concave reflection surface when the image formation is performed with the same performance.

On the other hand, since the number of relay optical systems having a plurality of refractive systems is increased, it is difficult to reduce the number of lenses, and this results in being less effective in cost reduction. Further, since a plurality of relay optical systems is arranged in an optical-axis direction, it is possible to make the device smaller in a radial direction, but it is difficult to make an entire length of the entire optical system shorter while maintaining an improved performance.

Several convex mirrors and several concave mirrors may be arranged between a concave reflection surface situated closest to a screen side and the first image surface, so as to perform correction with respect to the curvature of field. However, since a convex mirror includes a function that causes a light ray to diverge, a large reflection surface is inevitably necessary as a next reflection surface to capture the divergent light ray. Further, since the light ray travels in a direction away from the optical axis due to the light ray being diverged, the optical system itself becomes large in a height direction.

In the present embodiment, since the light path is reflected off the first and second reflection surfaces Mr1 and Mr2, it is possible to generate a proper intermediate image and increase the number of intermediate image-formation planes, without making an entire length of the device longer. This results in being able to obtain a smaller device with an improved performance while dealing with a super-wide-angle projection.

Note that Patent Literature 2 described above discloses, as an objective optical system for a semiconductor exposure device, an optical system that includes two facing concave mirrors and is capable of imaging an intermediate image. The objective optical system has the following configuration from a reduced-scale side to an enlarged-scale side. An intermediate image-formation plane is arranged posterior to a refractive system situated on the reduced-scale side. Next, the two concave reflection surfaces are arranged to face each other, and then an intermediate image-formation plane is arranged again. Light is transmitted through a refractive system on the enlarged-scale side, and an image is formed on the enlarged-scale side.

Patent Literature 2 does not disclose or suggest at all applying such an optical system to a super-wide-angle-projection projector. Further, if such an optical system is applied, a lens that is situated close to the concave mirror situated closer to the enlarged-scale side, is away from a pupil surface arranged in the refractive system on the enlarged-scale side, and the entire length of a lens group is long due to there being a large number of lenses. The reason is that a light ray entering the refractive system on the enlarged-scale side from the concave mirror situated closer to the refractive system on the enlarged-scale side, intersects an optical axis at a small angle, and this results in the refractive system on the enlarged-scale side having a large lens diameter. In other words, the optical system will not be sufficient for size reduction, and it will also be difficult to reduce costs since the number of lenses is not decreased.

Second Embodiment

A projection image display device according to a second embodiment of the present technology is described. In the following descriptions, descriptions of a configuration and an operation similar to those of the image display device 100 of the embodiment described above are omitted or simplified.

Figure 12:
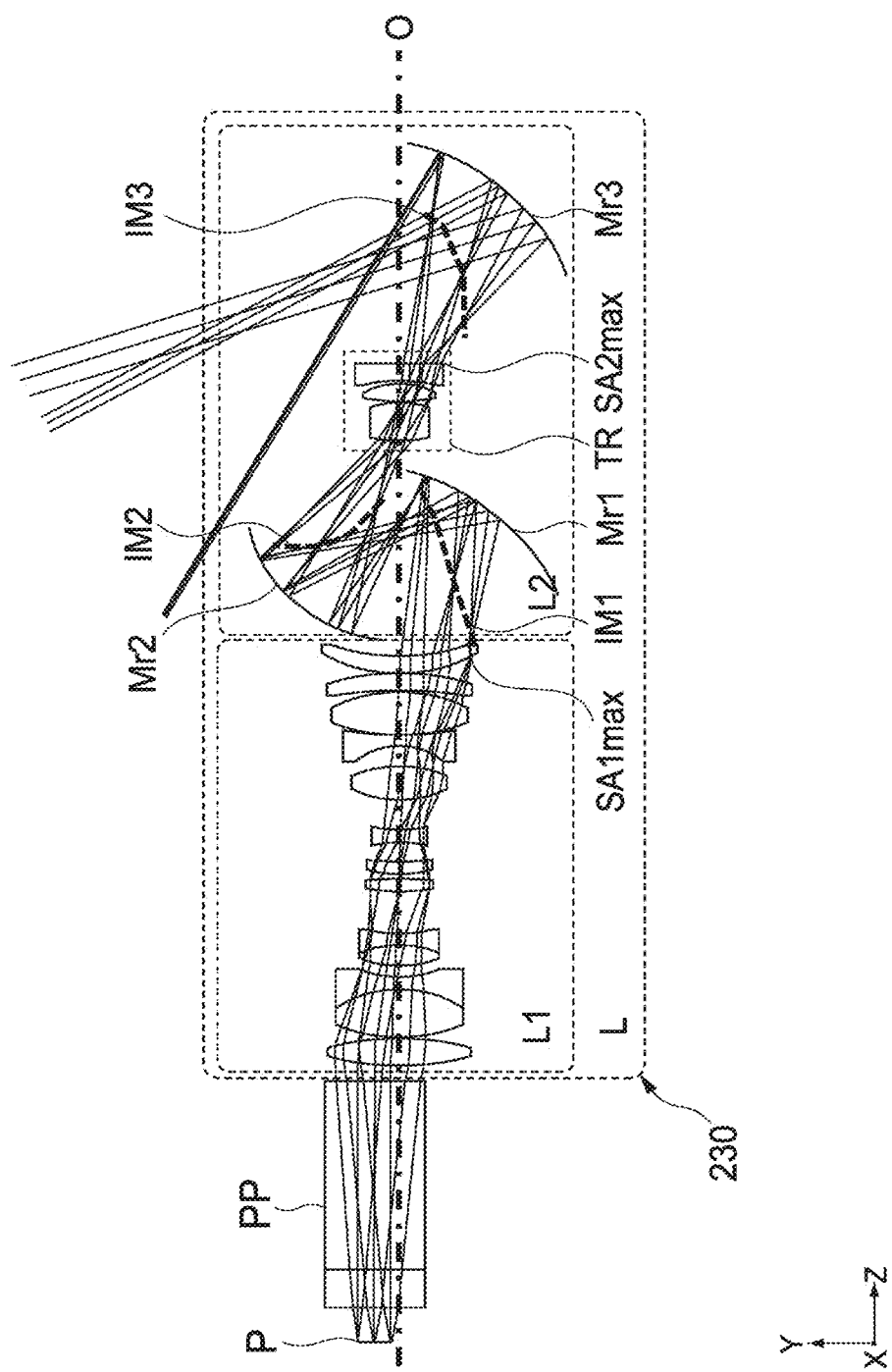
FIG. 12 is a light-path diagram schematically illustrating an example of a configuration of a projection optical system according to a second embodiment.
Figure 13:
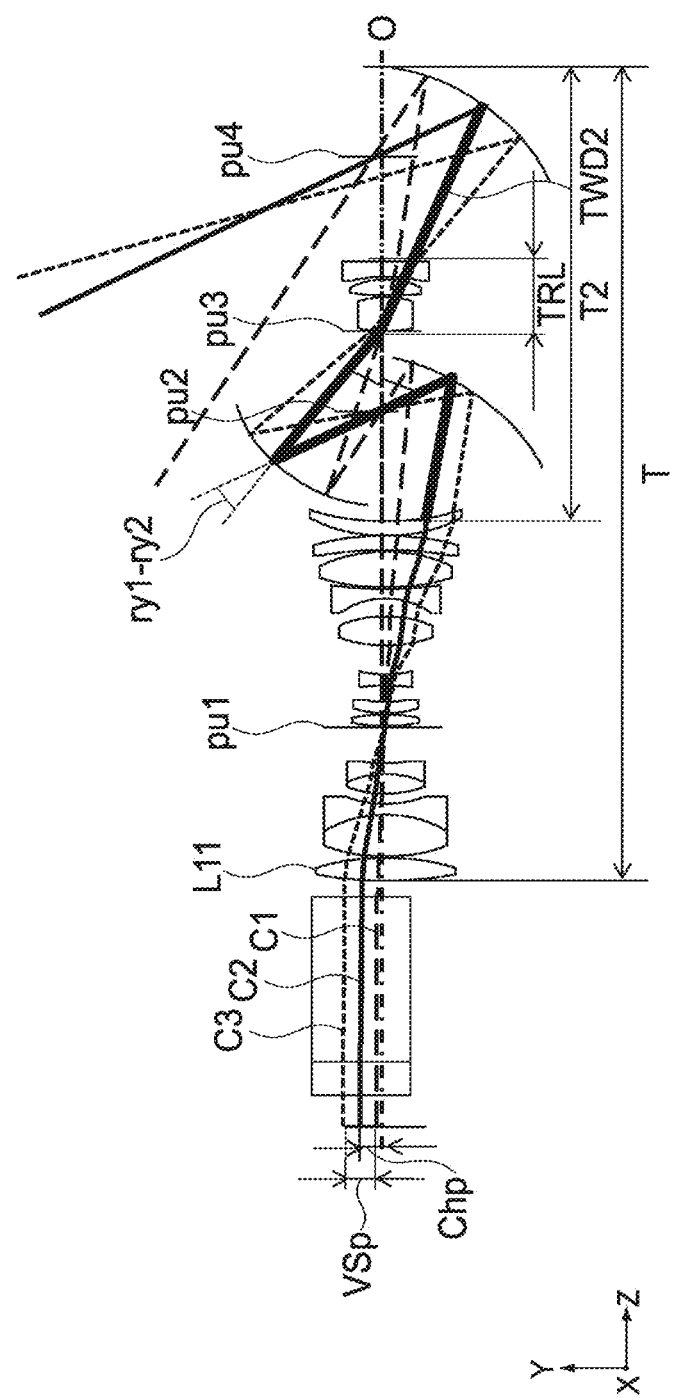
FIG. 13 is a light-path diagram schematically illustrating the example of the configuration of the projection optical system according to the second embodiment.
Figure 14:
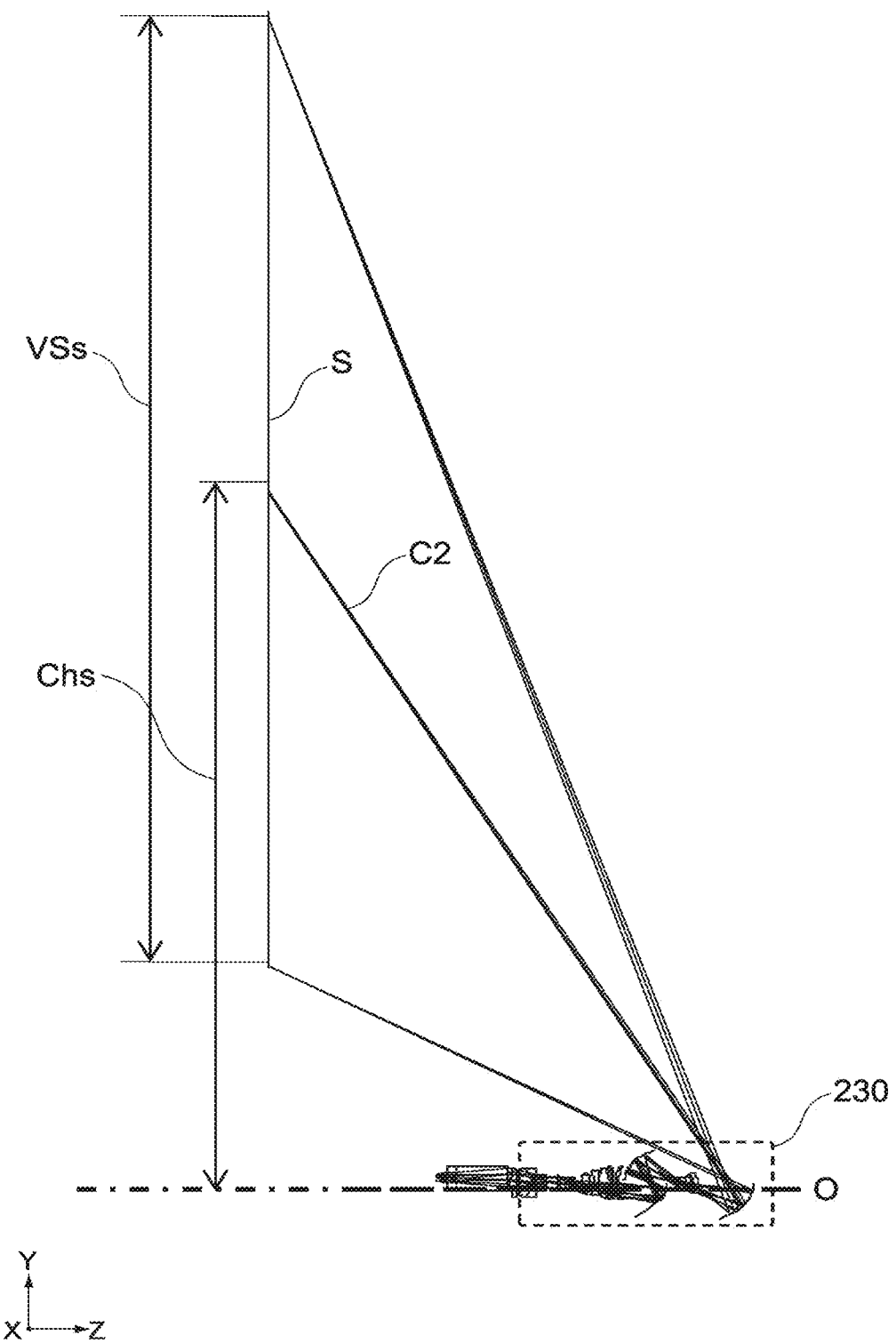
FIG. 14 is a light-path diagram schematically illustrating the example of the configuration of the projection optical system according to the second embodiment.

FIGS. 12 to 14 are light-path diagrams schematically illustrating an example of a configuration of a projection optical system according to the second embodiment.

FIG. 15 is a table in which an example of parameters related to image projection is given.

FIG. 16 illustrates lens data of the image display device.

FIGS. 17 and 18 are tables in which an example of aspheric coefficients; free-shape surface coefficients; components of decentering in the X, Y, and Z directions; and components of rotation about an X axis, rotation about a Y axis, and rotation about a Z axis of optics included in the projection optical system, is given.

In the present embodiment, the first reflection surface Mr1, the second reflection surface Mr2, and the concave reflection surface Mr3 are free-shape surfaces each not having a rotationally symmetric axis. Further, the first reflection surface Mr1, the second reflection surface Mr2, and the concave reflection surface Mr3 are decentered and tilted with respect to the optical axis O.

Note that an optic having a free-shape surface conforms to the following formula.

$$Z = \frac{c(x^2+y^2)}{1+\{1-(1-K)c^2(x^2+y^2)\}^{1/2}} + \sum_{i=1}\sum (Cj(m,n) \times x^m \times y^n) \quad \text{[Formula 2]}$$

The free-shape surface coefficients given in FIGS. 17 and 18 as an example conform to the formula described above (Formula 2). Further, with respect to decentering of a surface, XDE, YDE, and ZDE given in FIGS. 17 and 18 respectively represent a component in the X direction (mm), a component in the Y direction (mm), and a component in the Z direction (mm). With respect to a rotation of a surface, ADE, BDE, and CDE respectively represent a component in a θx direction (a component of a rotation about the X axis; degree), a component in a θy direction (a component of a rotation about the Y axis; degree), and a component in a θz direction (a component of a rotation about the Z axis; degree).

Further, DAR indicates that there is no change in coordinate (X,Y,Z) with respect to a surface that is situated posterior to the surface marked with DAR. In other words, if the surface marked with DAR is decentered, this is just a single decentering performed with respect to the surface marked with DAR, and a surface situated posterior to the decentered surface does not depend on a new coordinate obtained by the decentering being performed.

Also in a projection optical system 230 according to the present embodiment, a principal light ray C2 of image light intersects the optical axis O four times at first to fourth points of intersection pu1 to pu4. Further, three intermediate images of first to third intermediate images are respectively formed in first to third intermediate image-formation planes. Note that, in the present embodiment, the second intermediate image is formed in the second intermediate image-formation plane situated between the first reflection optical system and the second lens system TR, that is, between the second reflection surface Mr2 and the second lens system TR.

When the second intermediate image is formed between the first and second reflection surfaces Mr1 and Mr2 as in the first embodiment, it is possible to use an optical power of the second reflection surface Mr2 to form the second intermediate image. This results in bringing the advantage of making the second lens system TR smaller. On the other hand, when an optical power of the second reflection surface Mr2 is used to form the second intermediate image as in the present embodiment, this brings the advantage in reducing an optical load imposed on the first optical system L1 and the first reflection surface Mr1.

FIG. 19 is a table in which values of parameters used in the conditional expressions (1) to (5) described above in the present embodiment, are given.

T2/T 0.56
T2/TWD 0.60
T/TRL 11.4
SA1max/SA2max 1.54
|ry1−ry2|/ry2 0.75

The result described above is obtained, and it is understood that the conditional expressions (1) to (5) are satisfied.

Figure 21:
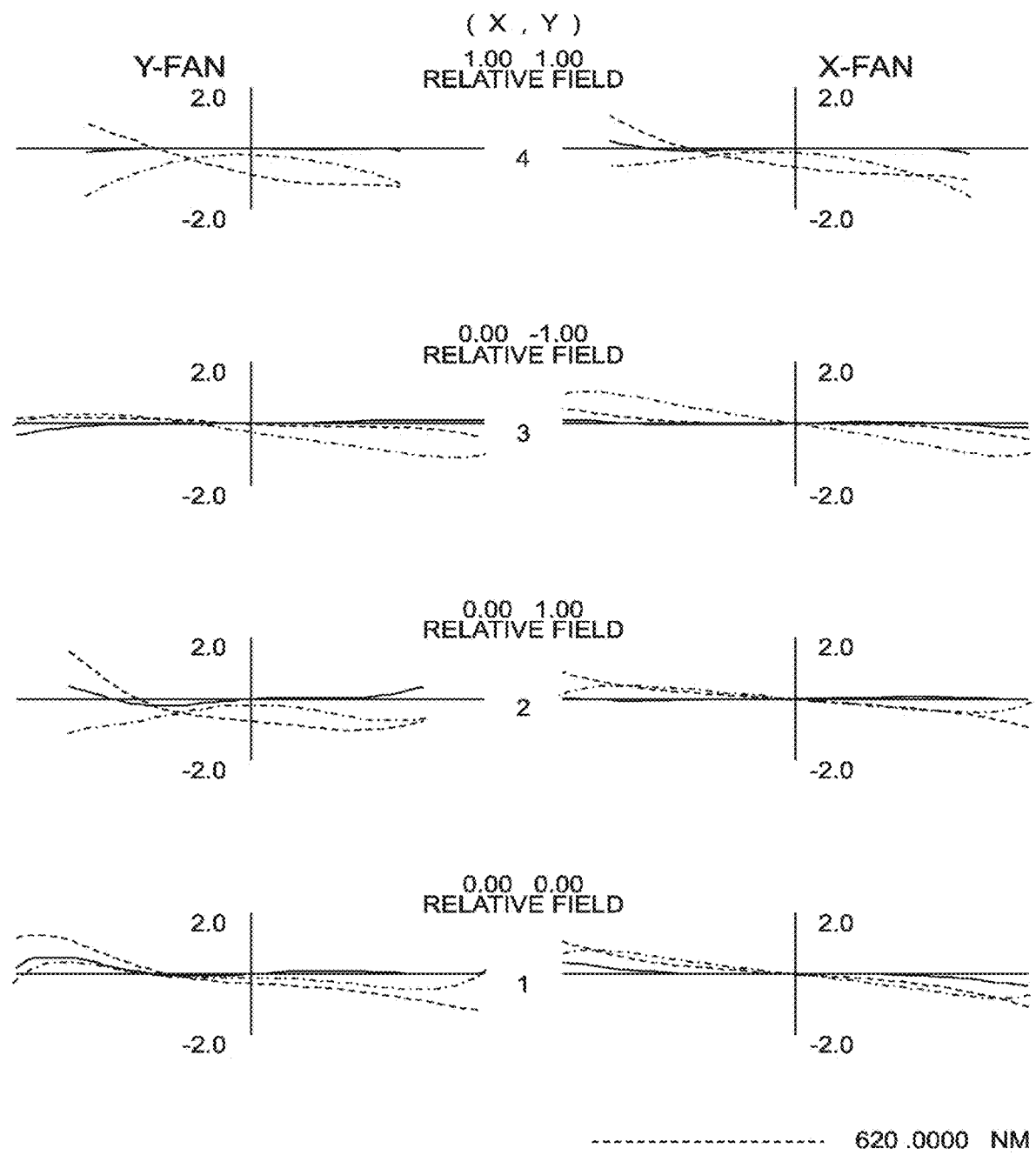
FIG. 21 is a set of graphs illustrating examples of a transverse aberration related to the projected image.

FIG. 20 schematically illustrates an example of an image projected by the projection optical system. FIG. 21 is a set of graphs illustrating examples of a transverse aberration related to the projected image. As illustrated in FIG. 20, a generally rectangular planar image is projected, from which it is understood that a high performance is achieved. Further, as illustrated in FIG. 21, with respect to the wavelengths of 620 nm, 550 nm, and 460 nm, deviations on the image surface (indicated on the vertical axis) are within about 2 mm, from which it is understood that it is possible to project a precise image.

As described above, also when the first reflection surface Mr1, the second reflection surface Mr2, and the concave reflection surface Mr3 are free-shape surfaces, and are decentered and tilted, it is possible to obtain a smaller device with an improved performance, as in the case of the first embodiment. Note that, when at least one of the first reflection surface Mr1, the second reflection surface Mr2, or the concave reflection surface Mr3 is a free-shape surface, and is decentered and tilted, or when any two of the first reflection surface Mr1, the second reflection surface Mr2, and the concave reflection surface Mr3 are free-shape surfaces, and are decentered and tilted, it is also possible to obtain a projection optical system that provides a similar effect.

Third Embodiment

Figure 22:
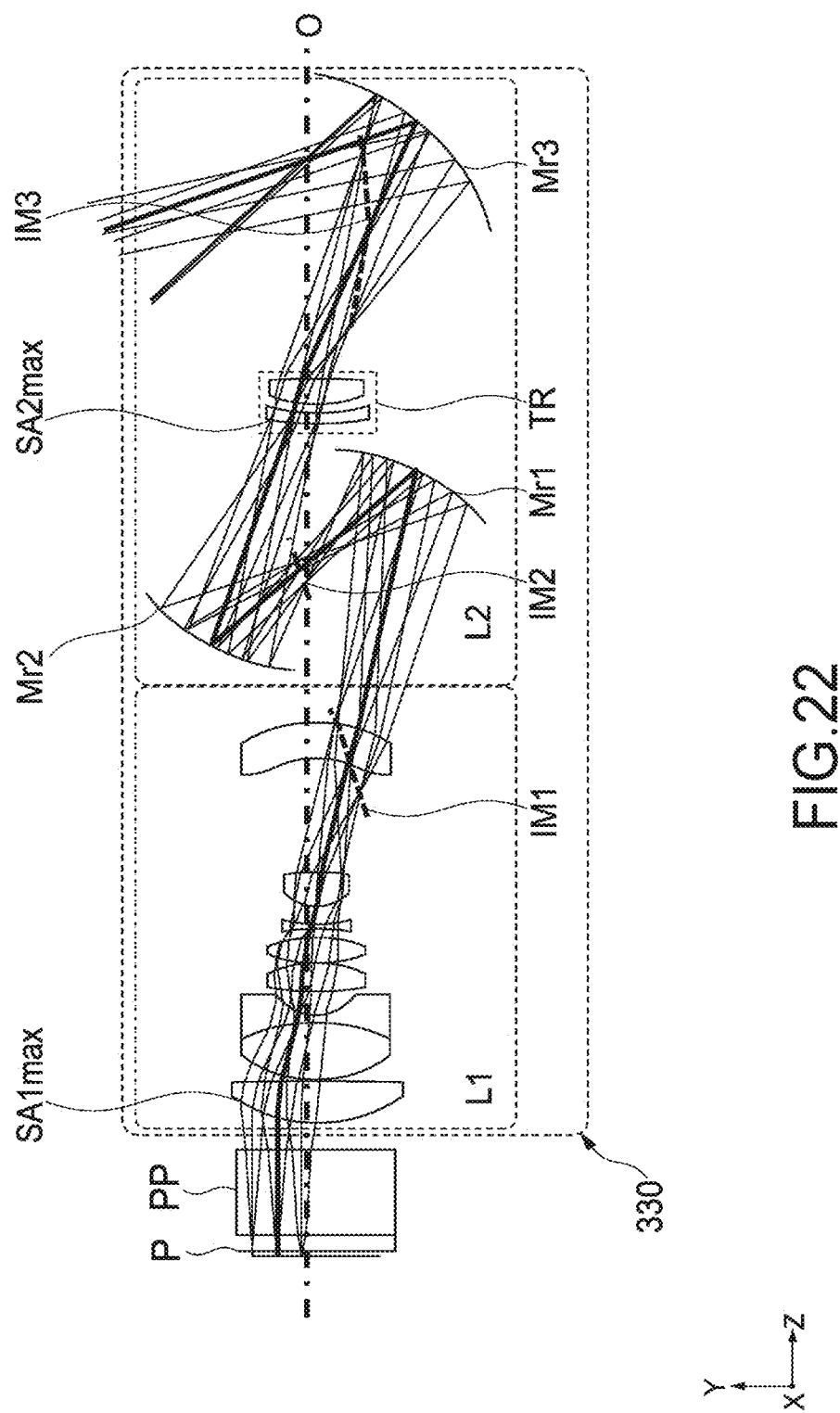
FIG. 22 is a light-path diagram schematically illustrating an example of a configuration of a projection optical system according to a third embodiment.
Figure 23:
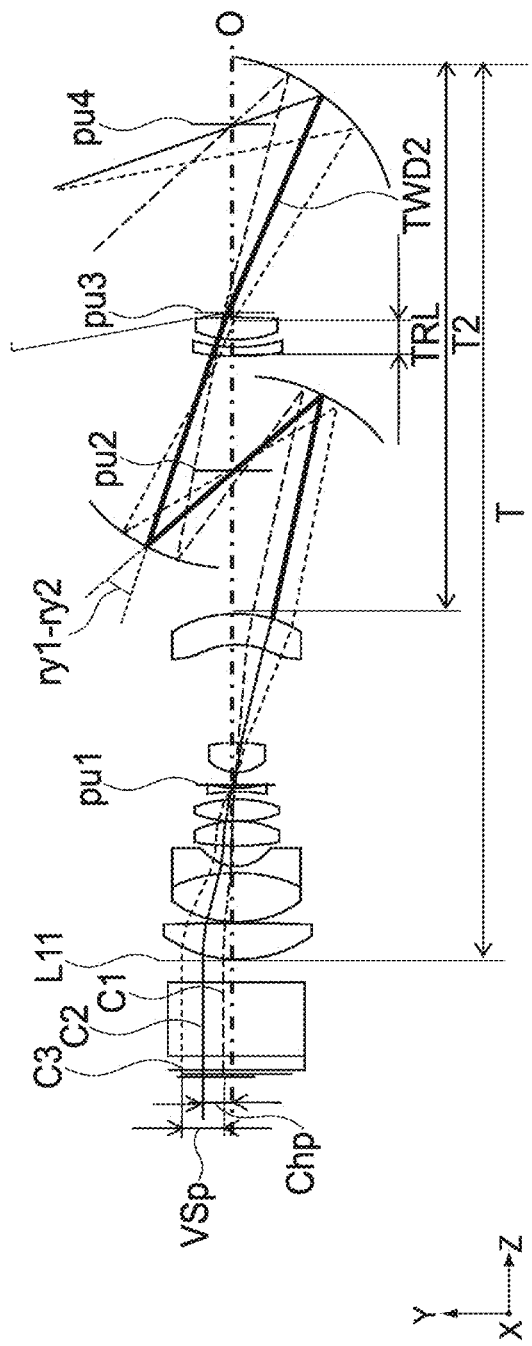
FIG. 23 is a light-path diagram schematically illustrating the example of the configuration of the projection optical system according to the third embodiment.
Figure 24:
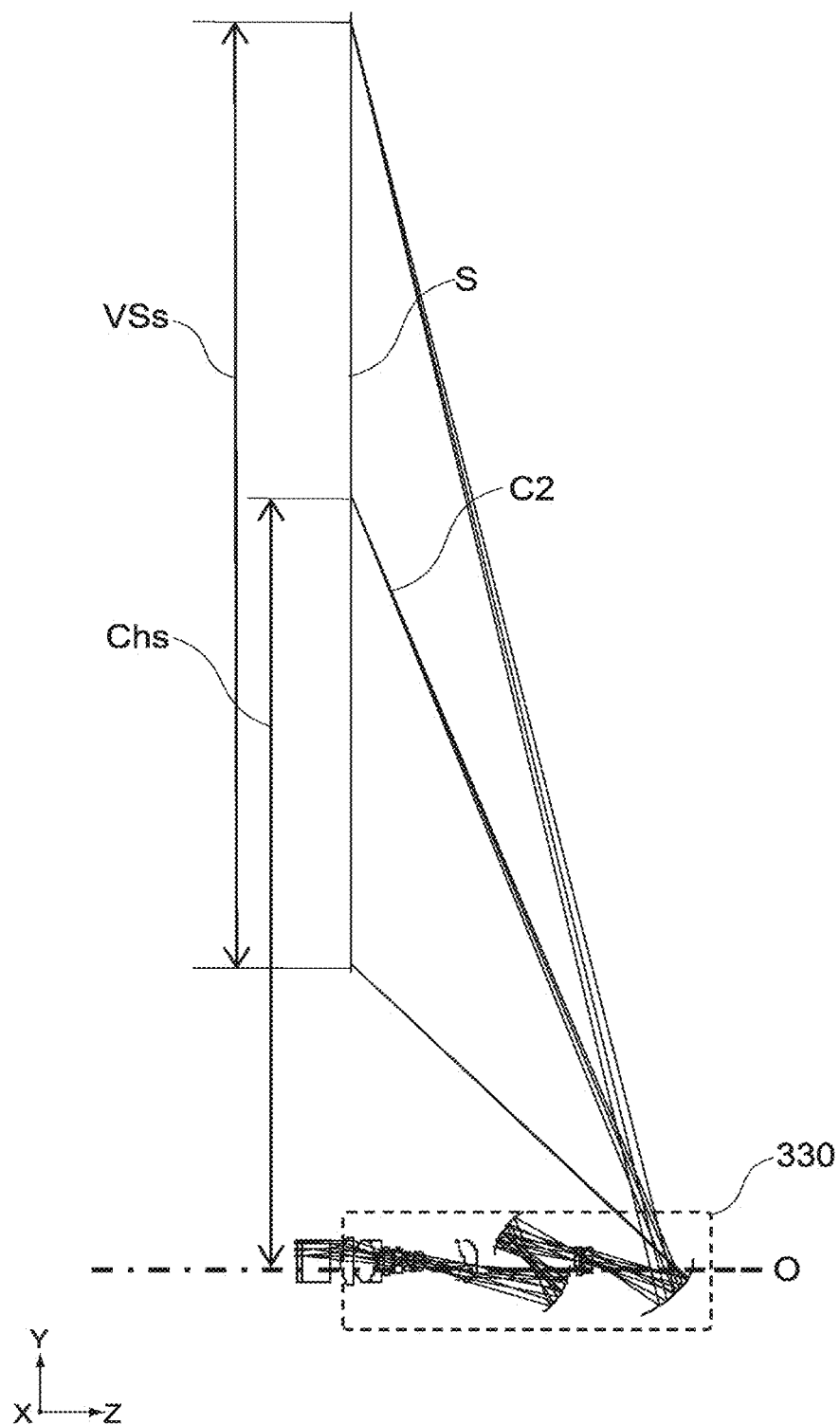
FIG. 24 is a light-path diagram schematically illustrating the example of the configuration of the projection optical system according to the third embodiment.

FIGS. 22 to 24 are light-path diagrams schematically illustrating an example of a configuration of a projection optical system according to a third embodiment.

FIG. 25 is a table in which an example of parameters related to image projection is given.

FIG. 26 illustrates lens data of an image display device.

FIG. 27 is a table in which an example of aspheric coefficients of optics included in the projection optical system, is given.

Also in a projection optical system 330 according to the present embodiment, a principal light ray C2 of image light intersects the optical axis O four times at first to fourth points of intersection pu1 to pu4. Further, three intermediate images of first to third intermediate images are respectively formed in first to third intermediate image-formation planes. Note that, in the present embodiment, the second intermediate image is formed in the second intermediate image-formation plane IM2 situated between the first reflection surface Mr1 and the second reflection surface Mr2.

FIG. 28 is a table in which values of parameters used in the conditional expressions (1) to (5) described above in the present embodiment, are given.

T2/T 0.62
T2/TWD 0.58
T/TRL 20.7
SA1max/SA2max 1.92
|ry1−ry2|/ry2 1.17

The result described above is obtained, and it is understood that the conditional expressions (1) to (5) are satisfied.

Figure 30:
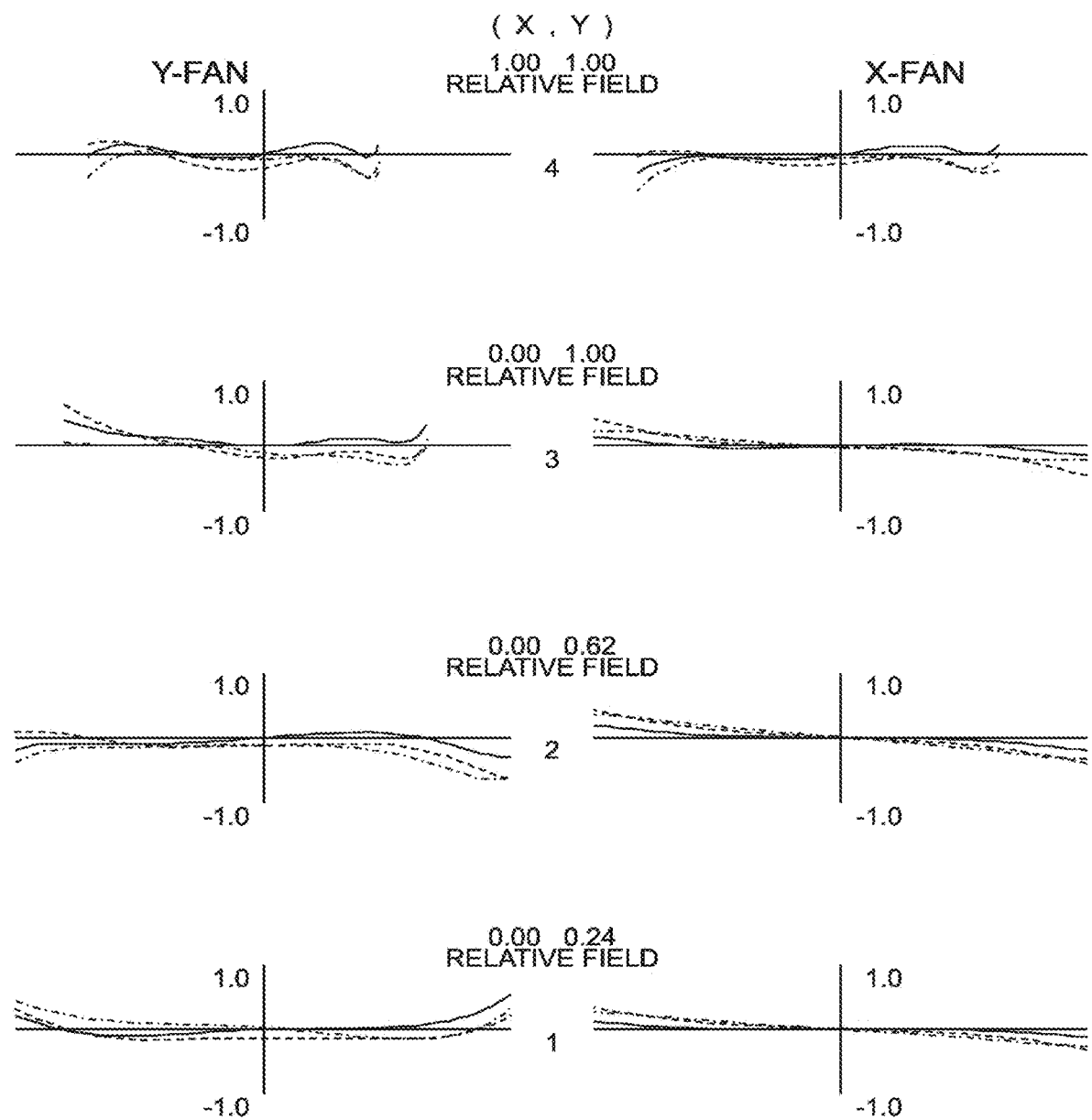
FIG. 30 is a set of graphs illustrating examples of a transverse aberration related to the projected image.

FIG. 29 schematically illustrates an example of an image projected by the projection optical system. FIG. 30 is a set of graphs illustrating examples of a transverse aberration related to the projected image. As illustrated in FIG. 29, a generally rectangular planar image is projected, from which it is understood that a high performance is achieved. Further, as illustrated in FIG. 30, with respect to the wavelengths of 620 nm, 550 nm, and 460 nm, deviations on the image surface (indicated on the vertical axis) are within about 1 mm, from which it is understood that it is possible to project a precise image. In other words, the configuration of the present embodiment also makes it possible to obtain a smaller device with an improved performance, as in the case of the embodiments described above.

Fourth Embodiment

Figure 31:
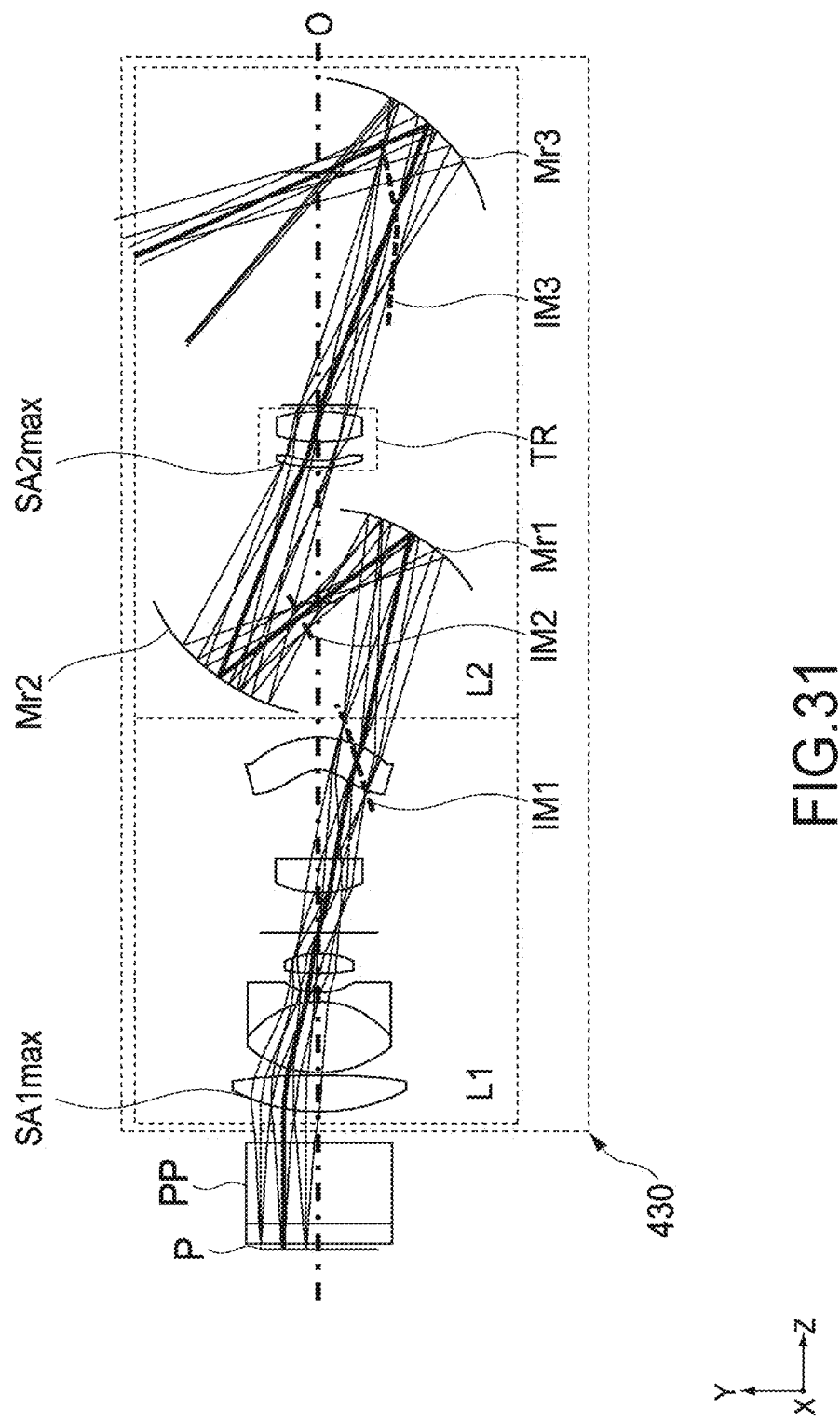
FIG. 31 is a light-path diagram schematically illustrating an example of a configuration of a projection optical system according to a fourth embodiment.
Figure 32:
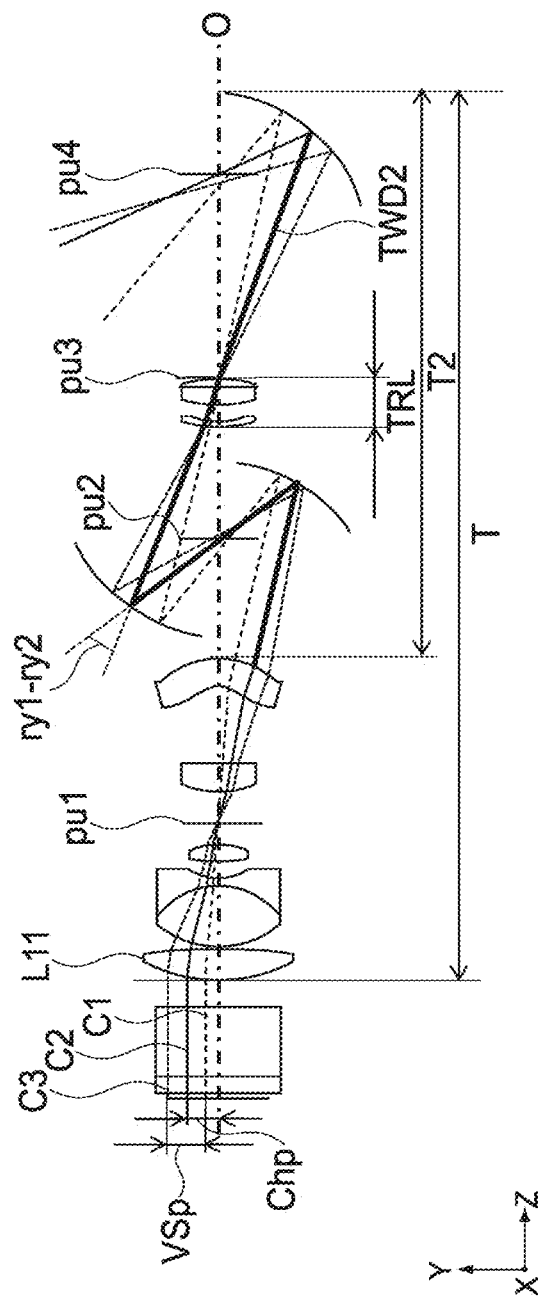
FIG. 32 is a light-path diagram schematically illustrating the example of the configuration of the projection optical system according to the fourth embodiment.
Figure 33:
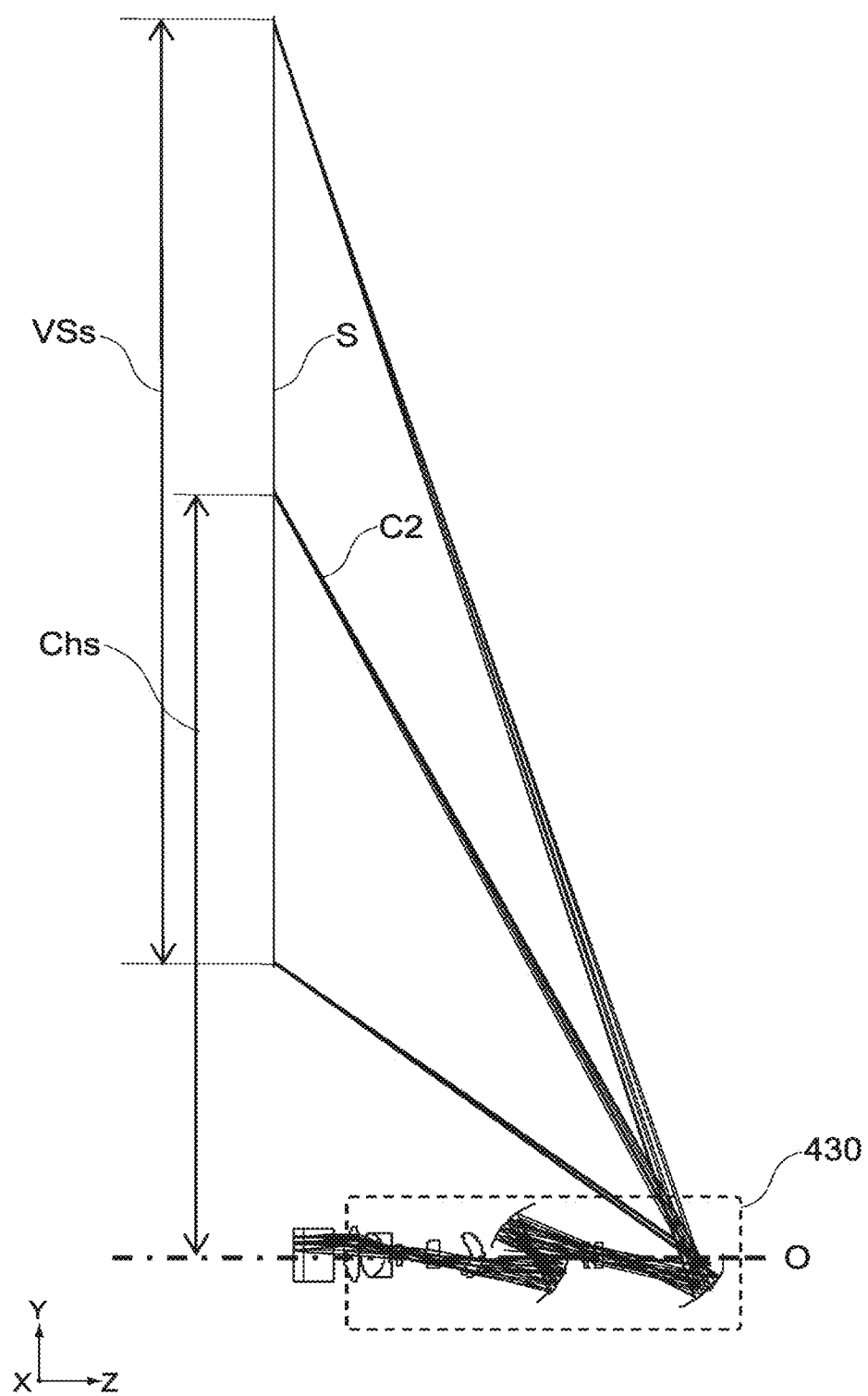
FIG. 33 a light-path diagram schematically illustrating the example of the configuration of the projection optical system according to the fourth embodiment.

FIGS. 31 to 33 are light-path diagrams schematically illustrating an example of a configuration of a projection optical system according to a fourth embodiment.

FIG. 34 is a table in which an example of parameters related to image projection is given.

FIG. 35 illustrates lens data of an image display device.

FIG. 36 is a table in which an example of aspheric coefficients of optics included in the projection optical system, is given.

Also in a projection optical system 430 according to the present embodiment, a principal light ray C2 of image light intersects the optical axis O four times at first to fourth points of intersection pu1 to pu4. Further, three intermediate images of first to third intermediate images are respectively formed in first to third intermediate image-formation planes. Note that, in the present embodiment, the second intermediate image is formed in the second intermediate image-formation plane IM2 situated between the first reflection surface Mr1 and the second reflection surface Mr2.

Figures 37, 38:
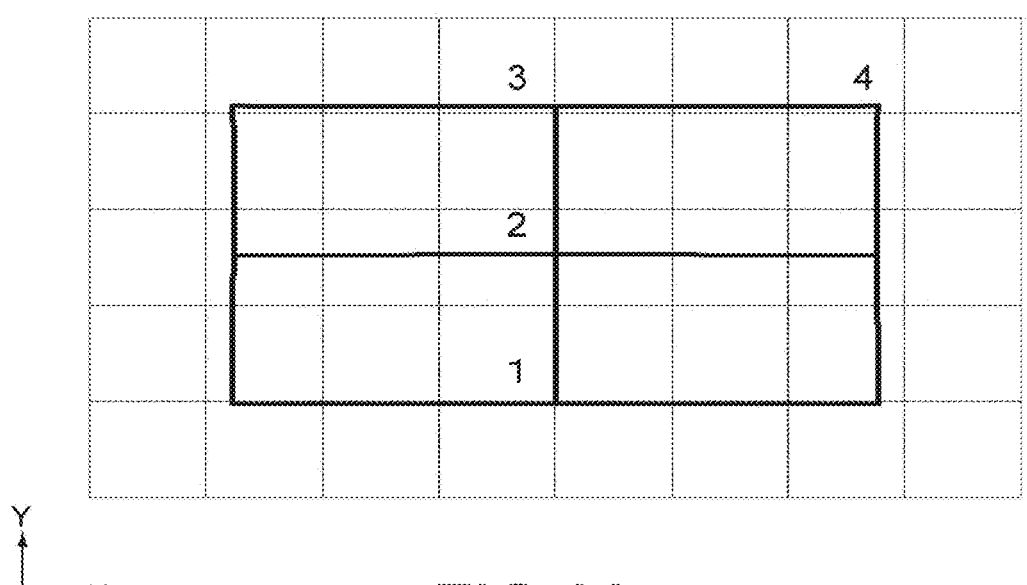
FIG. 37 is a table in which values of parameters used in the conditional expressions (1) to (5) are given.
FIG. 38 schematically illustrates an example of an image projected by the projection optical system.

FIG. 37 is a table in which values of parameters used in the conditional expressions (1) to (5) described above in the present embodiment, are given.

T2/T 0.63
T2/TWD 0.61
T/TRL 18.0
SA1max/SA2max 2.12
|ry1−ry2|/ry2 1.19

The result described above is obtained, and it is understood that the conditional expressions (1) to (5) are satisfied.

Figure 39:
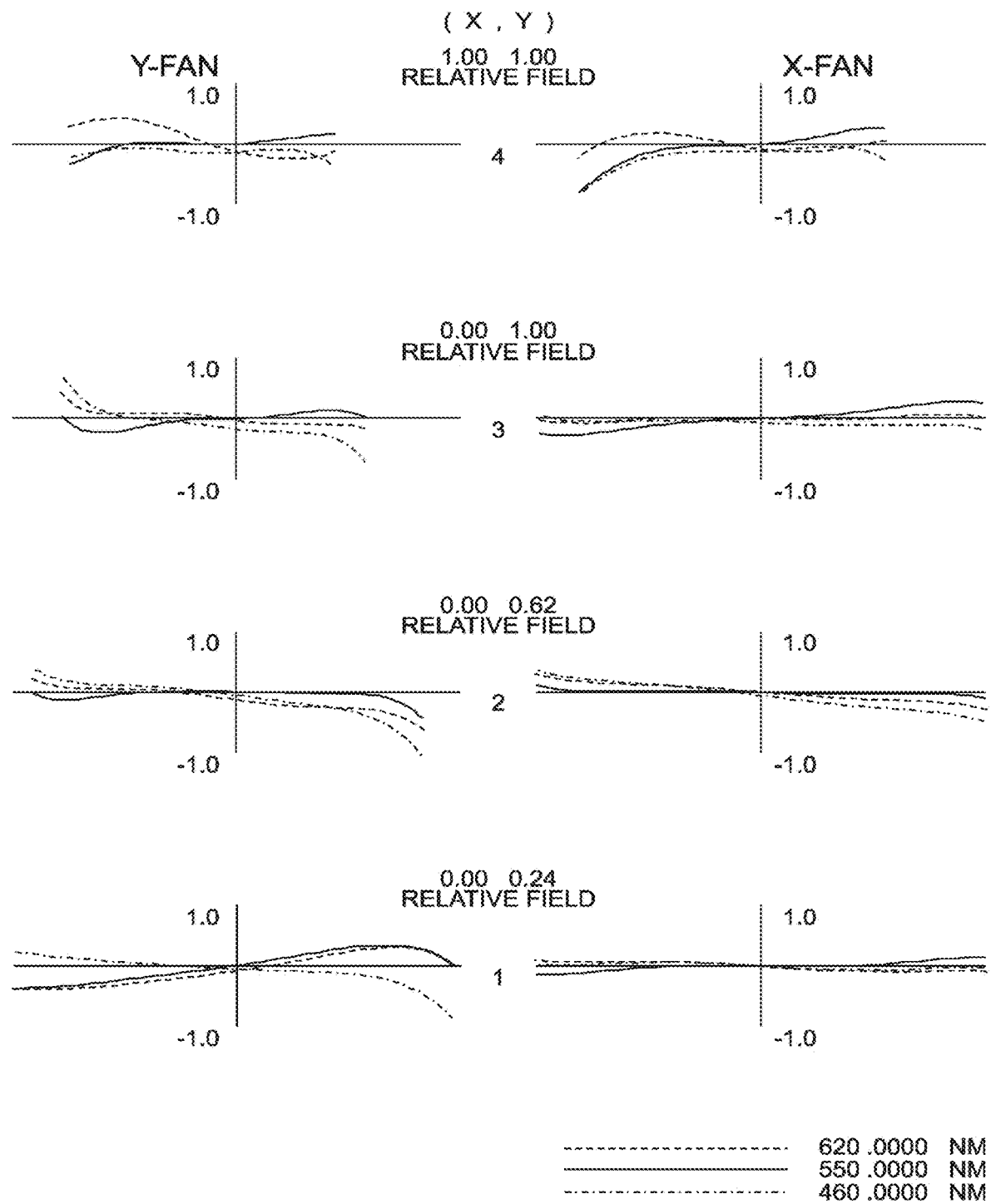
FIG. 39 is a set of graphs illustrating examples of a transverse aberration related to the projected image.

FIG. 38 schematically illustrates an example of an image projected by the projection optical system. FIG. 39 is a set of graphs illustrating examples of a transverse aberration related to the projected image. As illustrated in FIG. 38, a generally rectangular planar image is projected, from which it is understood that a high performance is achieved. Further, as illustrated in FIG. 39, with respect to the wavelengths of 620 nm, 550 nm, and 460 nm, deviations on the image surface (indicated on the vertical axis) are within about 1 mm, from which it is understood that it is possible to project a precise image. In other words, the configuration of the present embodiment also makes it possible to obtain a smaller device with an improved performance, as in the case of the embodiments described above.

Fifth Embodiment

Figure 40:
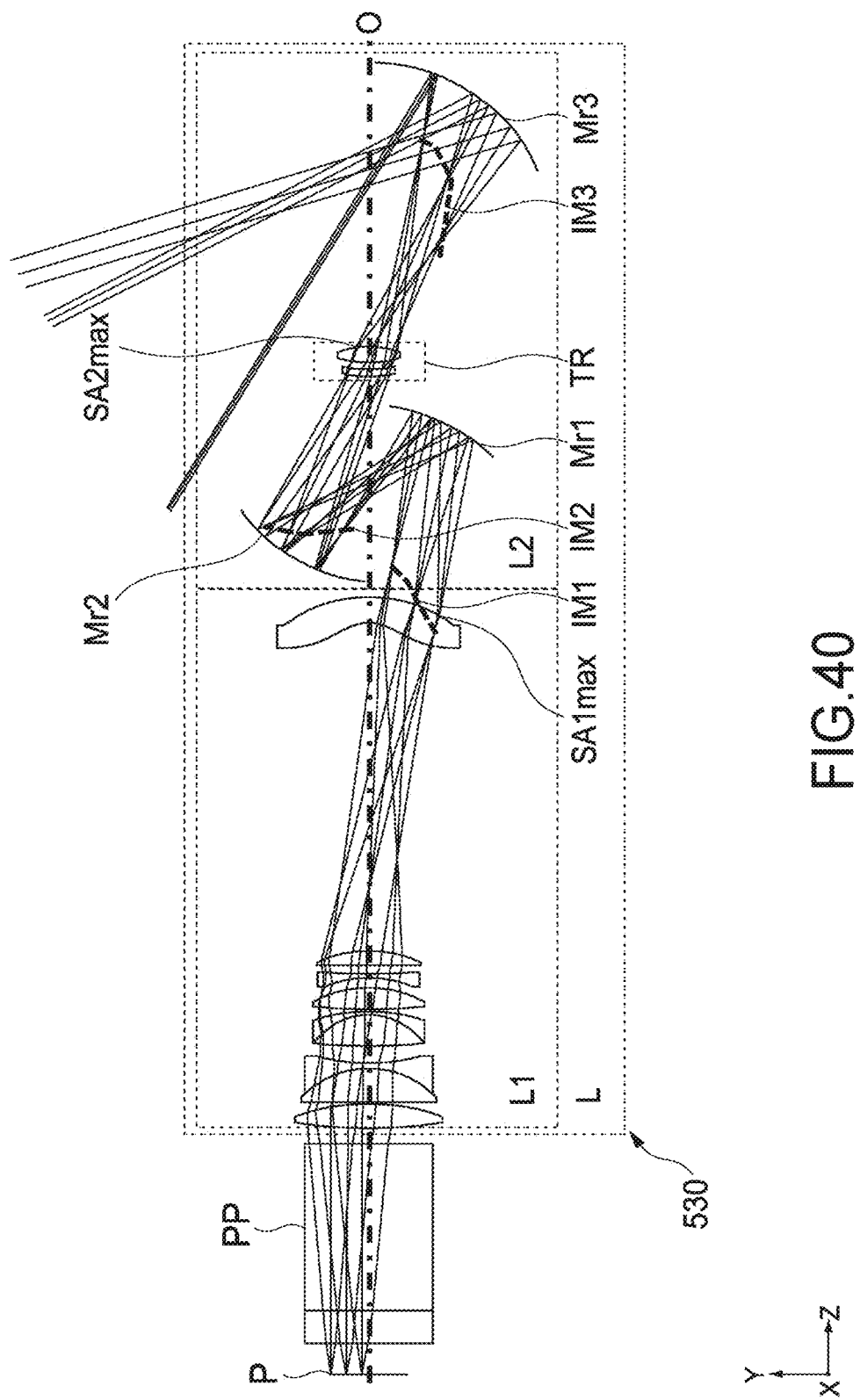
FIG. 40 is a light-path diagram schematically illustrating an example of a configuration of a projection optical system according to a fifth embodiment.
Figure 41:
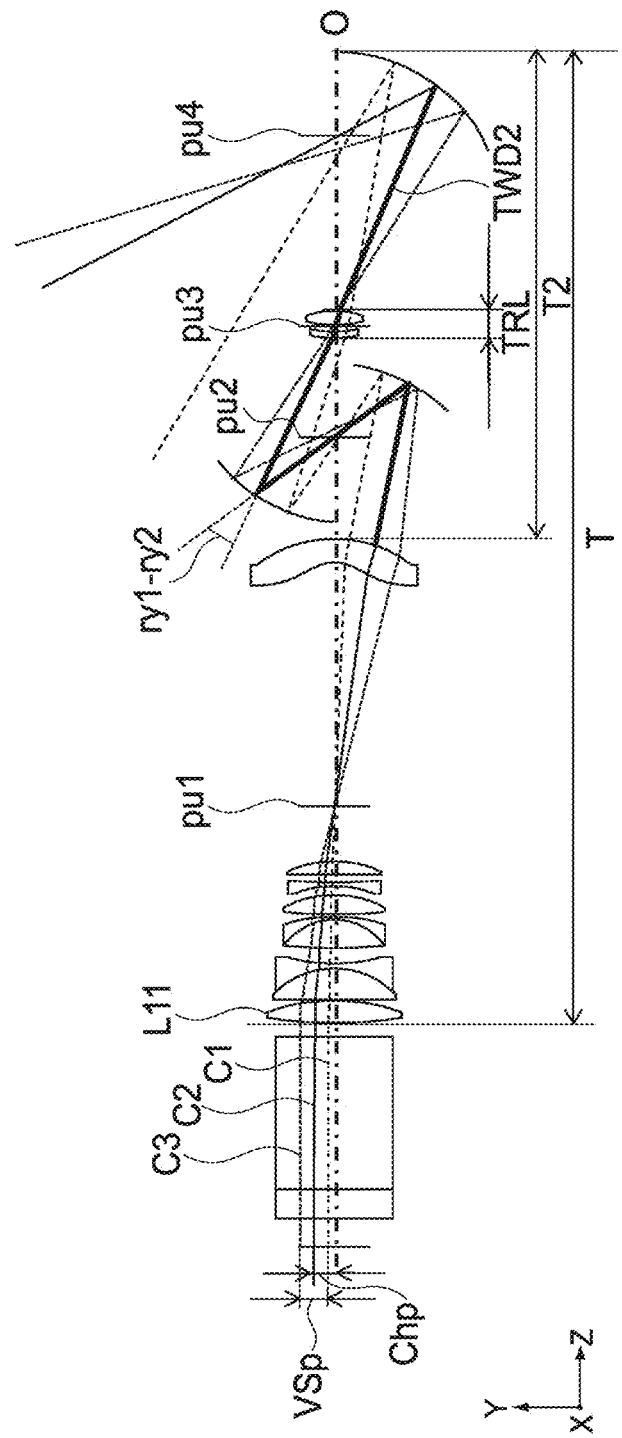
FIG. 41 is a light-path diagram schematically illustrating the example of the configuration of the projection optical system according to the fifth embodiment.
Figure 42:
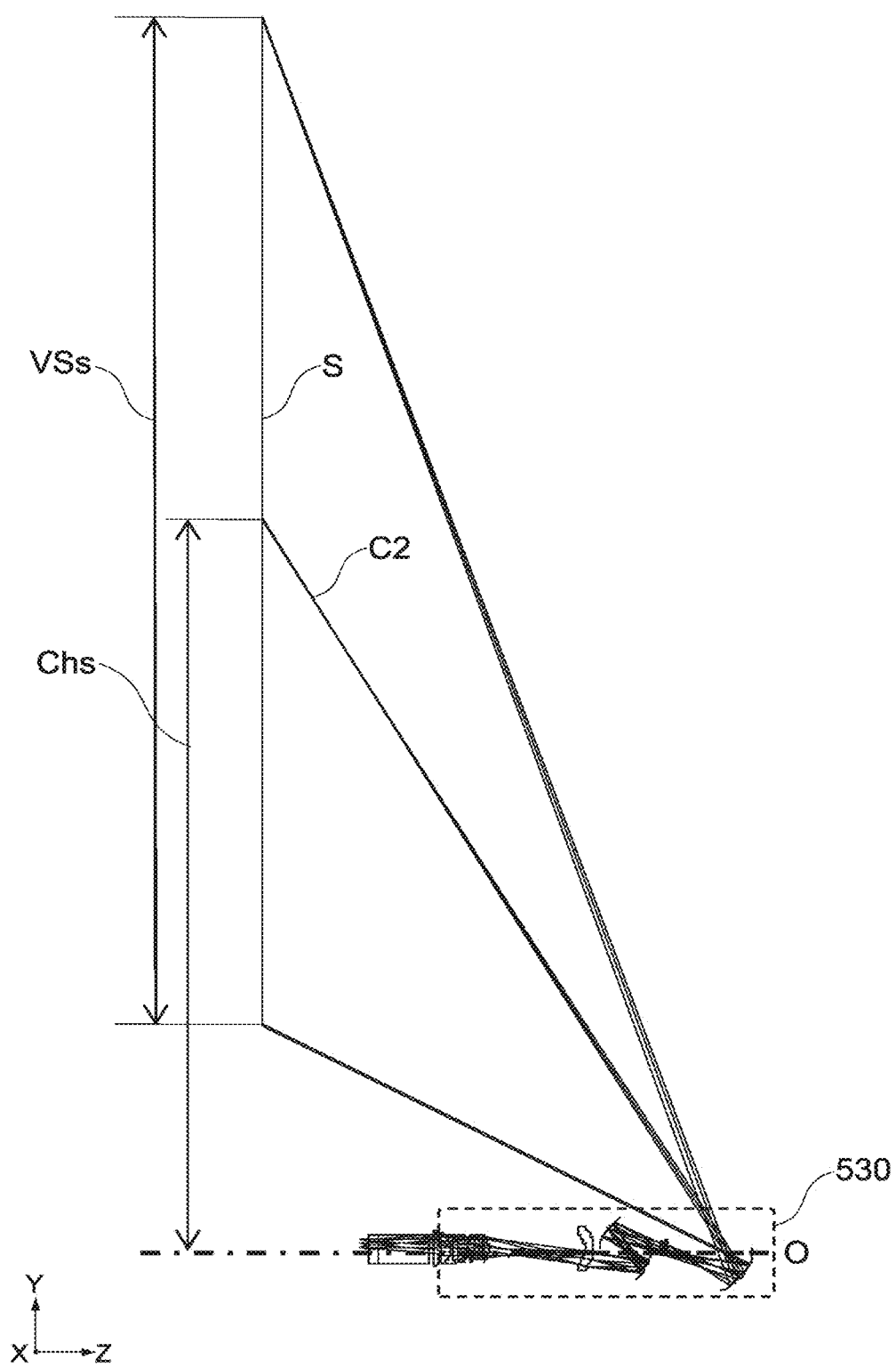
FIG. 42 is a light-path diagram schematically illustrating the example of the configuration of the projection optical system according to the fifth embodiment.

FIGS. 40 to 42 are light-path diagrams schematically illustrating an example of a configuration of a projection optical system according to a fifth embodiment.

FIG. 43 is a table in which an example of parameters related to image projection is given.

FIG. 44 illustrates lens data of an image display device.

FIG. 45 is a table in which an example of aspheric coefficients of optics included in the projection optical system, is given.

Also in a projection optical system 530 according to the present embodiment, a principal light ray C2 of image light intersects the optical axis O four times at first to fourth points of intersection pu1 to pu4. Further, three intermediate images of first to third intermediate images are respectively formed in first to third intermediate image-formation planes. Note that, in the present embodiment, the second intermediate image is formed in the second intermediate image-formation plane IM2 situated between the first reflection surface Mr1 and the second reflection surface Mr2.

Figures 46, 47:
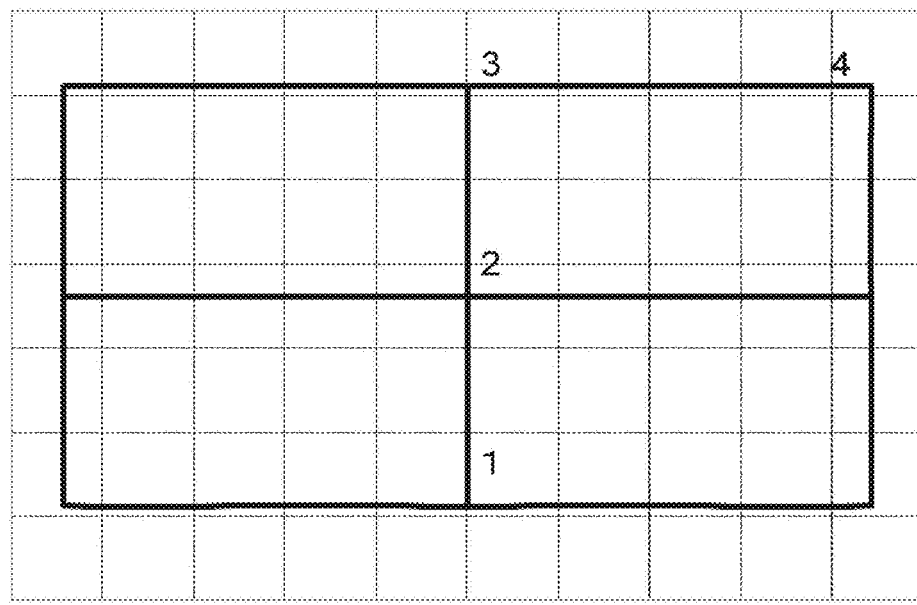
FIG. 46 is a table in which values of parameters used in the conditional expressions (1) to (5) are given.
FIG. 47 schematically illustrates an example of an image projected by the projection optical system.

FIG. 46 is a table in which values of parameters used in the conditional expressions (1) to (5) described above in the present embodiment, are given.

T2/T 0.50
T2/TWD 0.61
T/TRL 35.5
SA1max/SA2max 3.13
|ry1−ry2|/ry2 1.00

The result described above is obtained, and it is understood that the conditional expressions (1) to (5) are satisfied.

Figure 48:
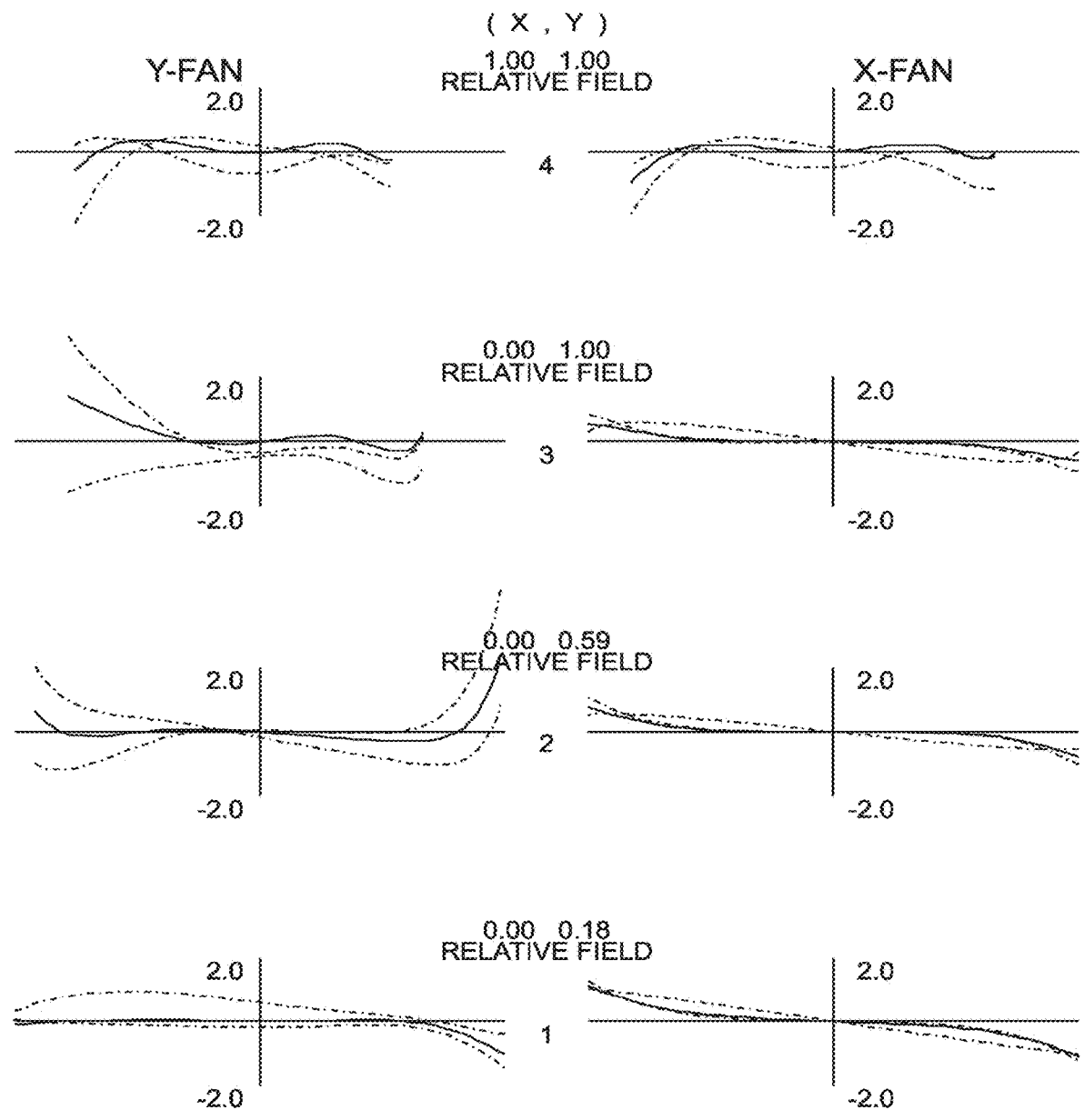
FIG. 48 is a set of graphs illustrating examples of a transverse aberration related to the projected image.

FIG. 47 schematically illustrates an example of an image projected by the projection optical system. FIG. 48 is a set of graphs illustrating examples of a transverse aberration related to the projected image. As illustrated in FIG. 47, a generally rectangular planar image is projected, from which it is understood that a high performance is achieved. Further, as illustrated in FIG. 48, with respect to the wavelengths of 620 nm, 550 nm, and 460 nm, deviations on the image surface (indicated on the vertical axis) are within about 2 mm, from which it is understood that it is possible to project a precise image. In other words, the configuration of the present embodiment also makes it possible to obtain a smaller device with an improved performance, as in the case of the embodiments described above.

Sixth Embodiment

Figure 49:
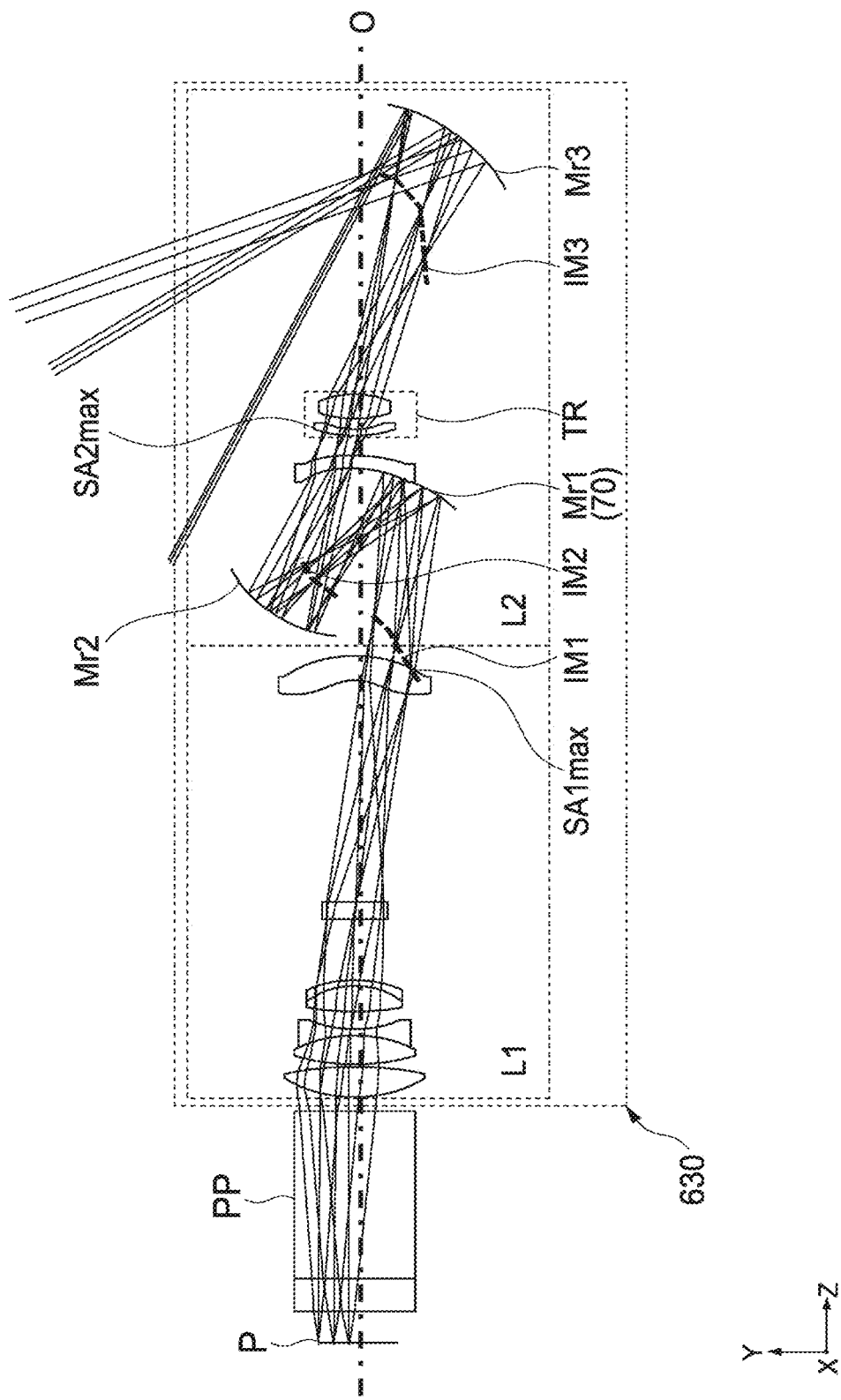
FIG. 49 is a light-path diagram schematically illustrating an example of a configuration of a projection optical system according to a sixth embodiment.
Figure 50:
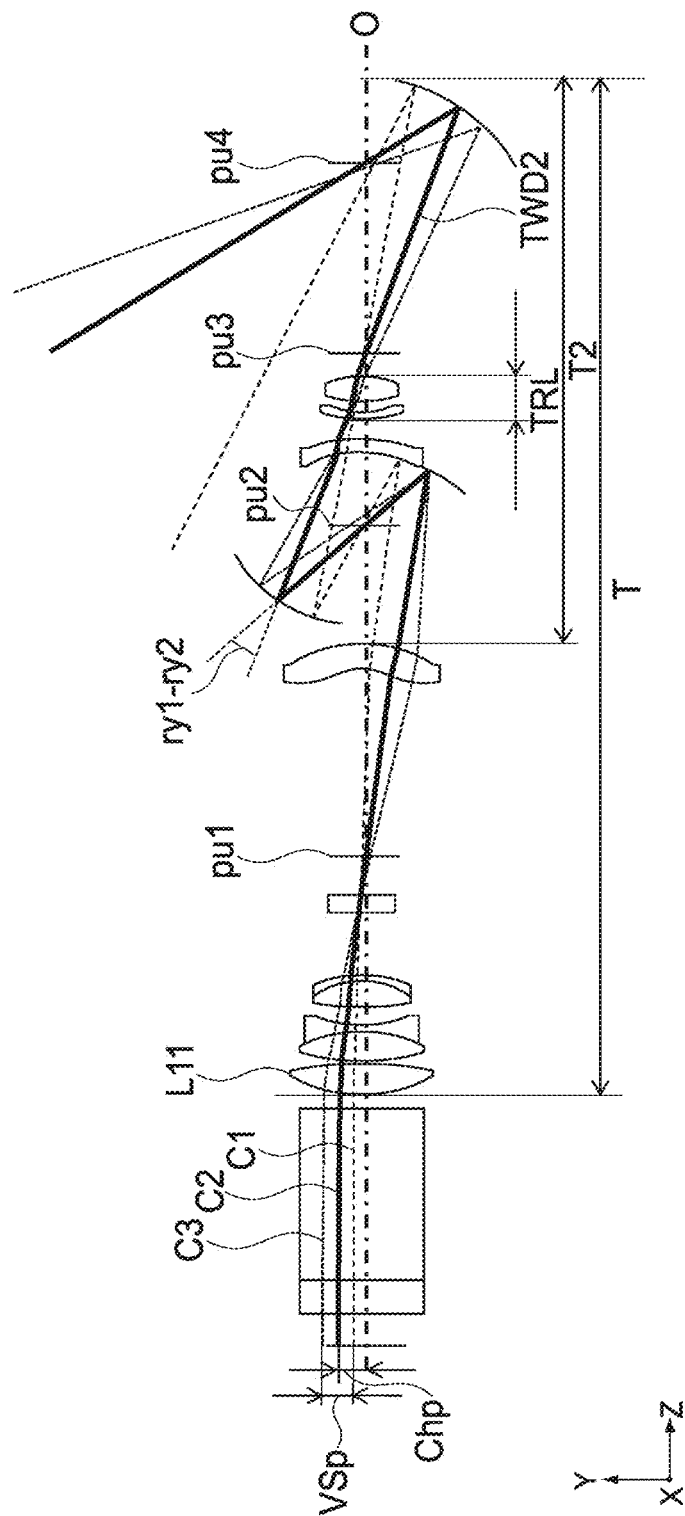
FIG. 50 is a light-path diagram schematically illustrating the example of the configuration of the projection optical system according to the sixth embodiment.
Figure 51:
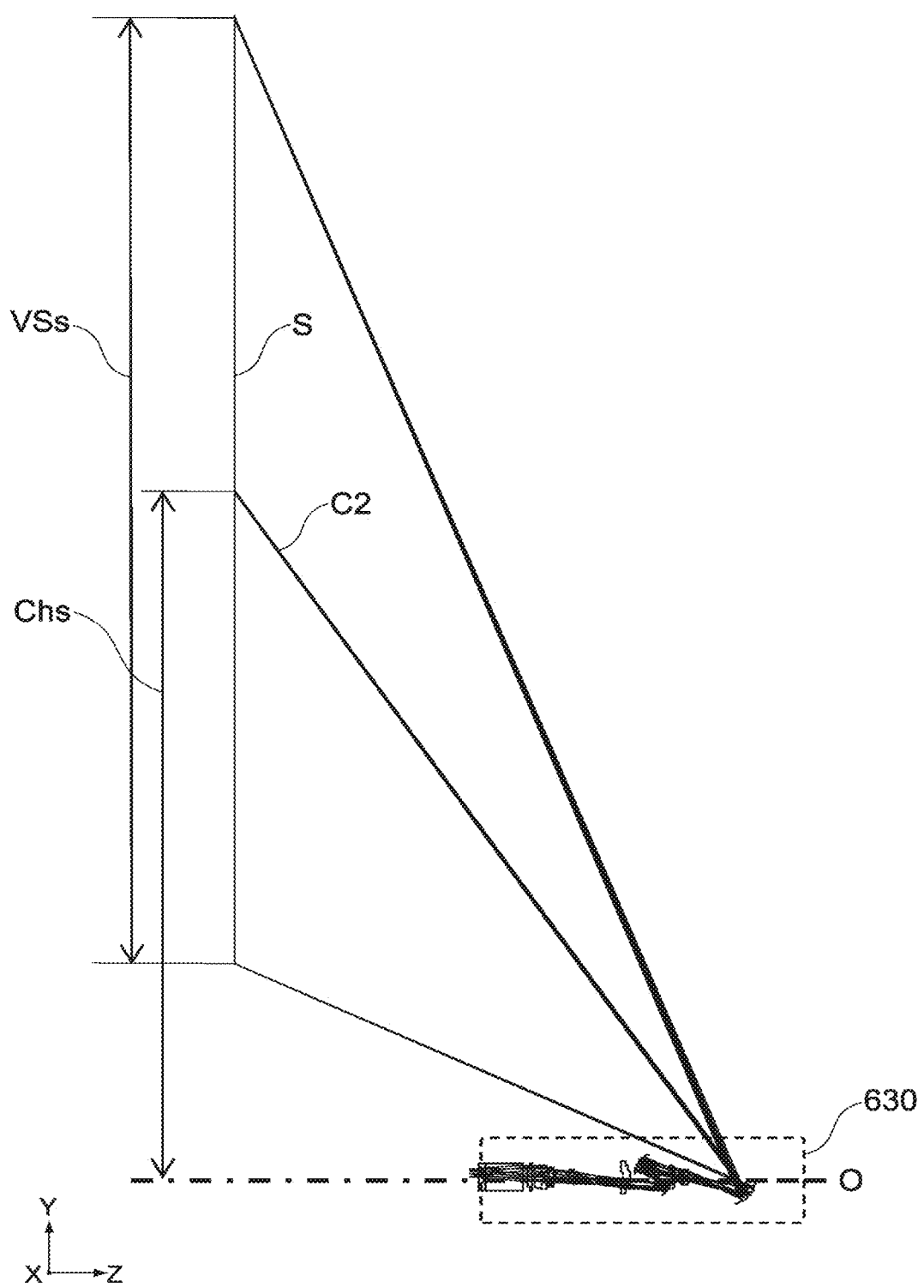
FIG. 51 is a light-path diagram schematically illustrating the example of the configuration of the projection optical system according to the sixth embodiment.

FIGS. 49 to 51 are light-path diagrams schematically illustrating an example of a configuration of a projection optical system according to a sixth embodiment.

FIG. 52 is a table in which an example of parameters related to image projection is given.

FIG. 53 illustrates lens data of an image display device.

FIG. 54 is a table in which an example of aspheric coefficients of optics included in the projection optical system, is given.

Figures 55, 56:
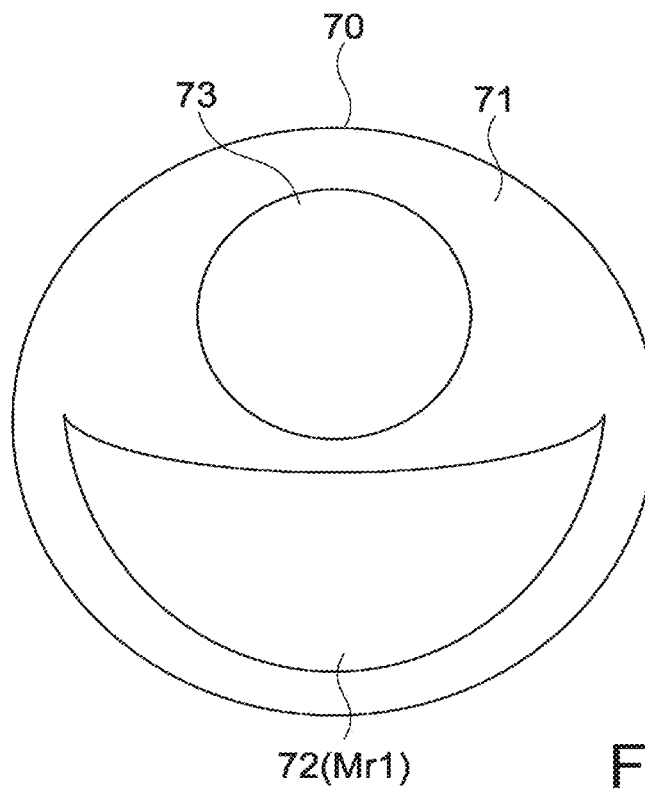
FIG. 55 schematically illustrates an example of a configuration of an optical member on which a first reflection surface is formed.
FIG. 56 is a table in which values of parameters used in the conditional expressions (1) to (5) are given.

FIG. 55 schematically illustrates an example of a configuration of an optical member on which the first reflection surface Mn1 is formed. An optical member 70 is made of light transmissive material such as transparent acrylic or glass, and includes a principal surface 71 that is a rotationally symmetric aspherical surface. As illustrated in FIG. 55, a reflection region 72 off which image light is reflected, and a transmission region 73 through which image light is transmitted are formed on the principal surface 71. For example, it is possible to set a desired region to be the reflection region 72 by forming a reflection film made of, for example, aluminum in the desired region. Further, it is possible to sufficiently suppress, for example, a loss of light intensity by forming an antireflective film in the transmission region 73.

In the present embodiment, the reflection region 72 of the optical member 70 is the first reflection surface Mr1. Further, the transmission region 73 of the optical member 70 is a light path of image light reflected off the second reflection surface Mr2. Thus, the form of the principal surface 71 of the optical member 70 is designed as appropriate such that a desired first reflection surface Mr1 is obtained.

For example, when, for example, a concave mirror is arranged as the first reflection surface Mr1, it is often the case that a certain space is necessary between the light path of the light image reflected off the second reflection surface Mr2, and the first reflection surface Mr1, considering, for example, a variation in assembling accuracy and ensuring of space for a mechanism that includes the concave mirror. In other words, a certain margin may be necessary between a lowermost end of beams of image light and an uppermost end of the concave mirror.

In the optical member 70 according to the present embodiment, the reflection region 72 that is the first reflection surface Mr1, and the transmission region 73 that forms a light path of image light are integrated. This makes it possible to make the space between the first reflection surface Mr1 and the light path of the image light small, and thus to bring both the first reflection surface Mn1 and the light path of the image light close to the optical axis O. This results in being able to reduce the size in the Y direction, and to make the device smaller.

Not only the first reflection surface Mn1 but also the second reflection surface Mr2 may be formed on the optical member 70 illustrated in FIG. 55. In other words, the second reflection surface Mr2 may be the reflection region 72 of the optical member 70 that includes the principal surface 71 including the reflection region 72 and the transmission region 73. This makes it possible to make the device smaller. Of course, only the second reflection surface Mr2 may be formed on the optical member 70 illustrated in FIG. 55.

Also in a projection optical system 630 according to the present embodiment, a principal light ray C2 of image light intersects the optical axis O four times at first to fourth points of intersection pu1 to pu4. Further, three intermediate images of first to third intermediate images are respectively formed in first to third intermediate image-formation planes. Note that, in the present embodiment, the second intermediate image is formed in the second intermediate image-formation plane IM2 situated between the first reflection surface Mr1 and the second reflection surface Mr2.

FIG. 56 is a table in which values of parameters used in the conditional expressions (1) to (5) described above in the present embodiment, are given.

T2/T 0.56
T2/TWD 0.62
T/TRL 24.6
SA1max/SA2max 1.94
|ry1−ry2|/ry2 0.92

The result described above is obtained, and it is understood that the conditional expressions (1) to (5) are satisfied.

Figure 57:
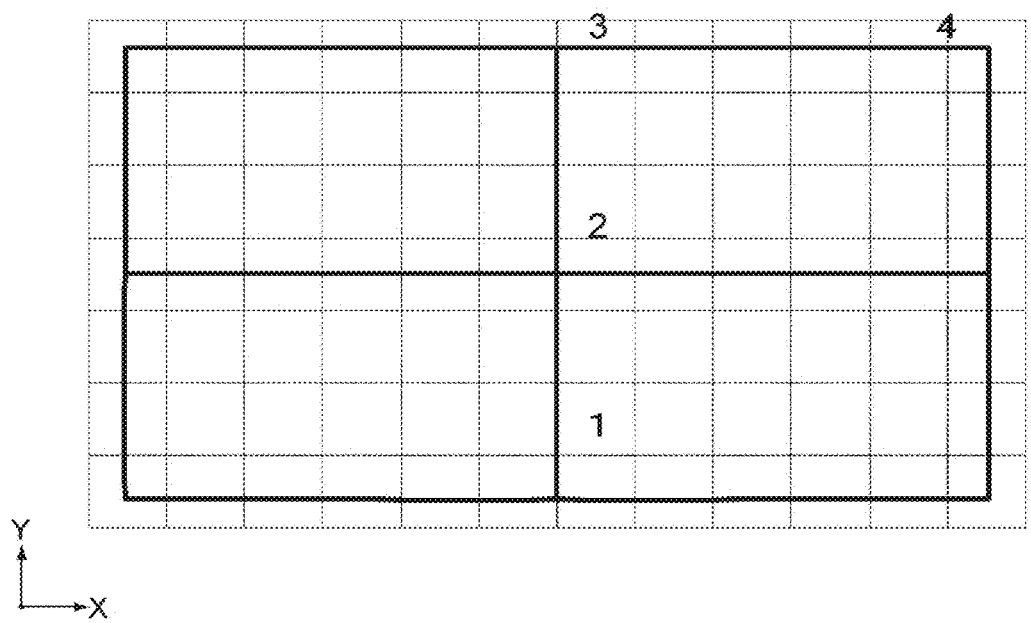
FIG. 57 schematically illustrates an example of an image projected by the projection optical system.
Figure 58:
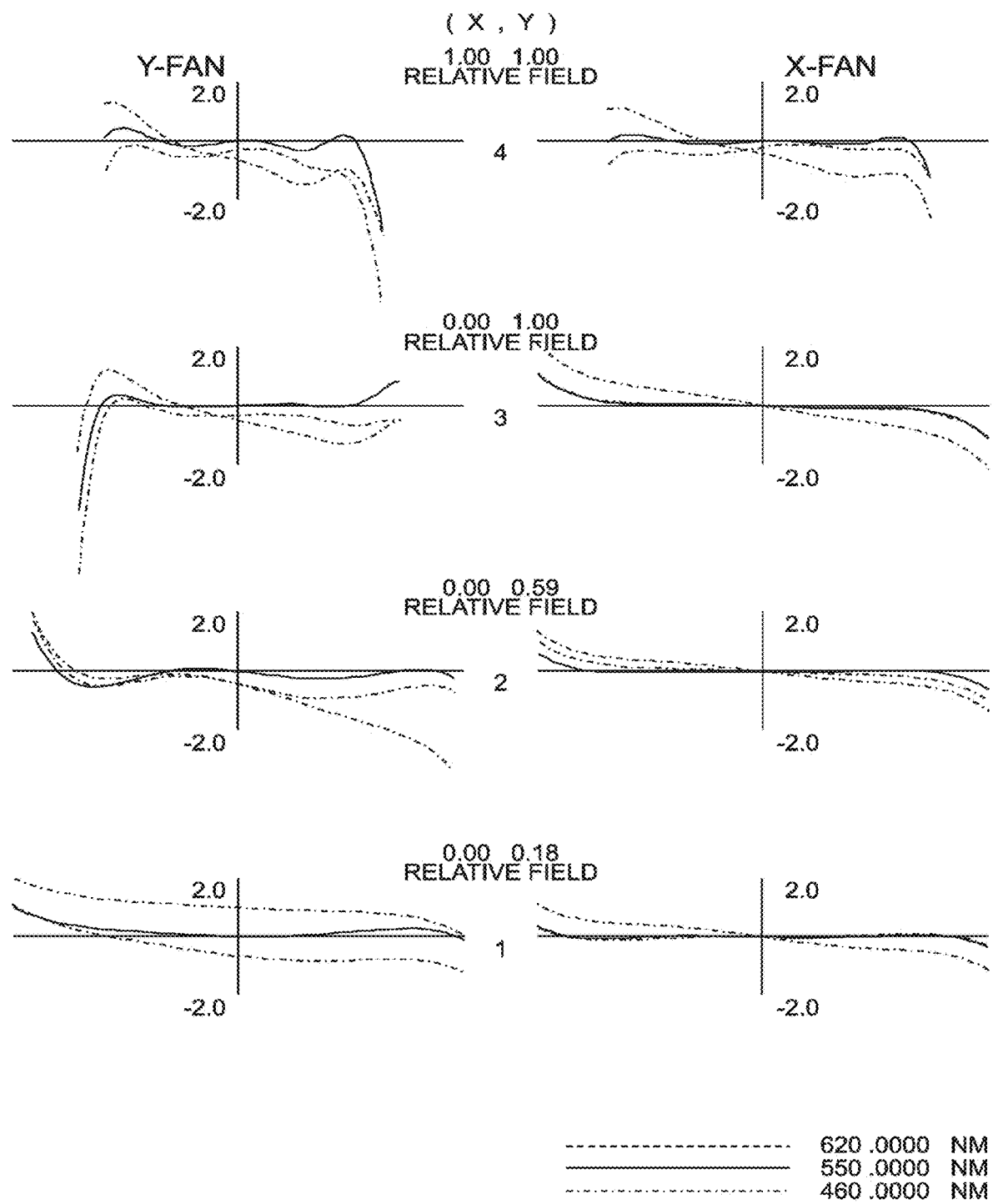
FIG. 58 is a set of graphs illustrating examples of a transverse aberration related to the projected image.

FIG. 57 schematically illustrates an example of an image projected by the projection optical system. FIG. 58 is a set of graphs illustrating examples of a transverse aberration related to the projected image. As illustrated in FIG. 57, a generally rectangular planar image is projected, from which it is understood that a high performance is achieved. Further, as illustrated in FIG. 58, with respect to the wavelengths of 620 nm, 550 nm, and 460 nm, deviations on the image surface (indicated on the vertical axis) are within about 2 mm, from which it is understood that it is possible to project a precise image. In other words, the configuration of the present embodiment also makes it possible to obtain a smaller device with an improved performance, as in the case of the embodiments described above.

Other Embodiments

The present technology is not limited to the embodiments described above, and may achieve other various embodiments.

Figure 59:
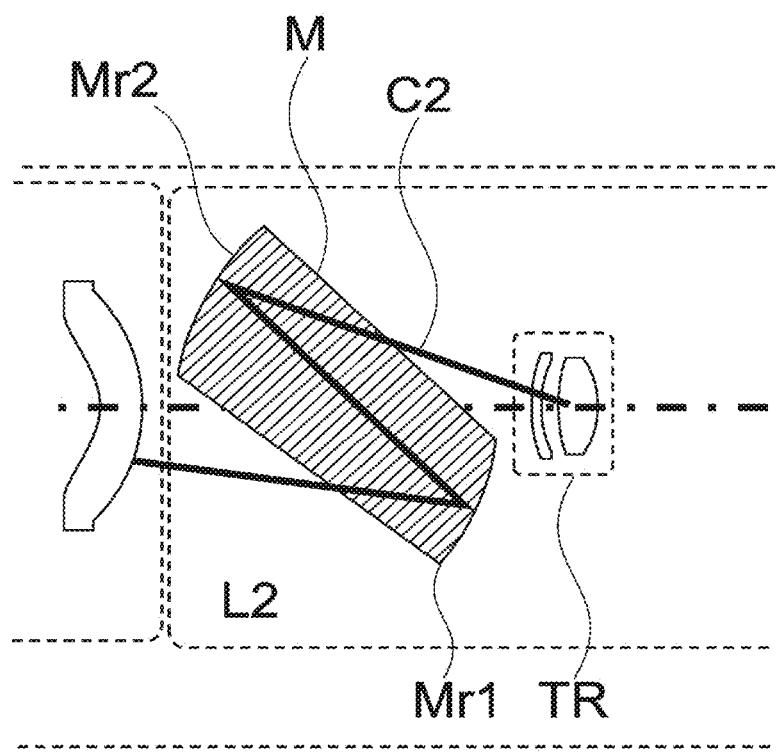
FIG. 59 schematically illustrates another example of a configuration of the first reflection surface and a second reflection surface.

FIG. 59 schematically illustrates another example of a configuration of the first and second reflection surfaces. For example, a light path in a principal light ray C2 of image light from the first reflection surface Mr1 to the second reflection surface Mr2 may be formed in a medium M having a refractive index between 1 and 2 inclusive. In other words, a space between the first and second reflection surfaces Mr1 and Mr2 may be filled with the medium M having a refractive index between 1 and 2 inclusive. This makes it possible to make an optical light path long. This results in being able to reduce an optical load necessary to generate a proper intermediate image, and to suppress power from the respective optics included in the projection optical system.

Note that, by using, for example, a prism that is made of the medium M having a refractive index between 1 and 2 inclusive, and in which the first and second reflection surfaces Mr1 and Mr2 are formed, it is possible to easily form a light path in the medium M. Of course, any other configurations may be used.

Planar reflection surfaces may be used as the first and second reflection surfaces Mr1 and Mr2. In this case, image light is not refracted by the surfaces, but is reflected off the surfaces, so a sufficient length of a light path is maintained. This results in being able to obtain a smaller device with an improved performance.

The number of times that a principal light ray C2 of image light intersects the optical axis O is not limited to four. For example, also when a principal light ray C2 of image light intersects the optical axis O four times or more, it is possible to obtain a smaller device with an improved performance.

The number of intermediate images is also not limited, and two intermediate images may be generated, or three or more intermediate images may be generated. In any case, a sufficient length of a light path is maintained due to the first and second reflection surfaces Mr1 and Mr2, which results in being able to obtain a smaller device with an improved performance.

At least two of the features of the present technology described above can also be combined. In other words, various features described in the respective embodiments may be optionally combined regardless of the embodiments. Further, the various effects described above are not limitative but are merely illustrative, and other effects may be provided.

Note that the present technology may also take the following configurations.

(1) An image display device including:
 a light source;
 an image generator that modulates a light beam emitted by the light source and generates image light; and
 a projection optical system that includes
  a first lens system that has a positive refractive power as a whole, and refracts the generated image light,
  a first reflection optical system that includes two or more reflection surfaces, each reflection surface being a surface off which the image light refracted by the first lens system is reflected,
  a second lens system that has a positive refractive power as a whole, and refracts the image light reflected off the first reflection optical system, and
  a second reflection optical system that includes a concave reflection surface off which the image light refracted by the second lens system is reflected to be directed to a projected-onto object onto which projection is performed.

(2) The image display device according to (1), in which
 a first intermediate image of an image made up of the image light, is formed in a first intermediate image-formation plane situated between the image generator and the first reflection optical system,
 a second intermediate image of the image made up of the image light, is formed in a second intermediate image-formation plane situated between the first reflection optical system and the second lens system, and
 a third intermediate image of the image made up of the image light, is formed in a third intermediate image-formation plane situated between the second lens system and the second reflection optical system.

(3) The image display device according to (1), in which
 a first intermediate image of an image made up of the image light, is formed in a first intermediate image-formation plane situated between the image generator and the first reflection optical system,
 a second intermediate image of the image made up of the image light, is formed in a second intermediate image-formation plane situated between a first reflection surface and a second reflection surface that are included in the two or more reflection surfaces, and
 a third intermediate image of the image made up of the image light, is formed in a third intermediate image-formation plane situated between the second lens system and the second reflection optical system.

(4) The image display device according to any one of (1) to (3), in which
 the second reflection optical system forms an image made up of the image light on a planar portion included in the projected-onto object.

(5) The image display device any one of (1) to (4), in which
 a principal light ray of the image light intersects a reference axis four times or more, the reference axis being obtained by extending an optical axis of a lens that is included in the first lens system and situated closest to the image generator.

(6) The image display device according to (5), in which
the principal light ray of the image light intersects the reference axis at a first point of intersection, a second point of intersection, a third point of intersection, and a fourth point of intersection, the first point of intersection being situated in the first lens system, the second point of intersection being situated between a first reflection surface and a second reflection surface that are included in the two or more reflection surfaces, the third point of intersection being situated between the first reflection optical system and the second reflection optical system, the fourth point of intersection being situated between the second reflection optical system and the projected-onto object.

(7) The image display device according to (3) or (6), in which
the image light refracted by the first lens system is reflected off the first reflection surface, and
the image light reflected off the first reflection surface is reflected off the second reflection surface to be directed to the second lens system.

(8) The image display device according to (2) or (3), in which
the first intermediate image-formation plane, the second intermediate image-formation plane, and the third intermediate image-formation plane are not planes substantially orthogonal to the reference axis.

(9) The image display device according to (5) or (6), in which
a length T from a first point to a second point, and a length T2 from a third point to the second point are set to satisfy a relationship indicated by $$0.2 < T2/T < 0.8, \qquad (1)$$

the first point corresponding to a position on the reference axis that is included in the first lens system and situated closest to a first side that is a side of the image generator, the second point corresponding to a position on the reference axis that is included in the concave reflection surface and situated closest to a second side that is a side opposite to the first side, the third point corresponding to a position on the reference axis that is included in the first lens system and situated closest to the second side.

(10) The image display device according to any one of (5), (6), and (9), in which
a length TWD2 of a light path in the principal light ray of the image light is set to satisfy a relationship indicated by $$0.2 < T2/TWD < 0.8, \qquad (2)$$

the length TWD2 of a light path being a length of a light path from a lens surface to the concave reflection surface, the lens surface being included in the first lens system and situated closest to a second side that is a side opposite to a first side that is a side of the image generator.

(11) The image display device according to any one of (5), (6), (9), and (10), in which
a length TRL from a certain point to another point is set to satisfy a relationship indicated by $$5 < T/TRL < 50, \qquad (3)$$

the certain point corresponding to a position on the reference axis that is included in the second lens system and situated closest to a first side that is a side of the image generator, the other point corresponding to a position on the reference axis that is included in the second lens system and situated closest to a second side that is a side opposite to the first side.

(12) The image display device according to any one of (5), (6), and (9) to (11), in which
an effective diameter SA1max and an effective diameter SA2max are set to satisfy a relationship indicated by $$1.3 < SA1\,max/SA2\,max < 5, \qquad (4)$$

the effective diameter SA1max being an effective diameter of an optic having a largest effective diameter in the first lens system, the effective diameter SA2max being an effective diameter of an optic having a largest effective diameter in the second lens system.

(13) The image display device according to any one of (5), (6), and (9) to (12), in which
the two or more reflection surfaces include a first reflection surface and a second reflection surface, the first reflection surface being a surface off which the image light refracted by the first lens system is reflected, the second reflection surface being a surface off which the image light reflected off the first reflection surface is reflected to be directed to the second lens system, and an angle ry1 and an angle ry2 are set to satisfy a relationship indicated by $$0.5 < |ry1 - ry2|/ry2 < 2.5, \qquad (5)$$

the angle ry1 being an angle at which a certain light path in the principal light ray of the image light intersects the reference axis, the certain light path being a light path from the first reflection surface to the second reflection surface, the angle ry2 being an angle at which another light path in the principal light ray of the image light intersects the reference axis, the other light path being a light path from the second reflection surface to the second lens system.

(14) The image display device according to any one of (5), (6), and (9) to (13), in which
the first lens system is configured such that an optical axis of an optic included in the first lens system substantially coincides with the reference axis, the first optical system including the optic or a plurality of the optics, and
the second lens system is configured such that an optical axis of an optic included in the second lens system substantially coincides with the reference axis, the second optical system including the optic or a plurality of the optics.

(15) The image display device according to any one of (5), (6), and (9) to (14), in which
the concave reflection surface is configured such that a rotationally symmetric axis of the concave reflection surface substantially coincides with the reference axis, and
respective reflection surfaces of the two or more reflection surfaces are concave reflection surfaces, and are configured such that rotationally symmetric axes of the respective reflection surfaces substantially coincide with the reference axis.

(16) The image display device according to any one of (5), (6), and (9) to (15), in which
at least one reflection surface from among the concave reflection surface and the two or more reflection surfaces is a free-shape surface that does not have a rotationally symmetric axis.

(17) The image display device according to any one of (1) to (16), in which
at least one of the two or more reflection surfaces is a reflection region of an optical member that includes a principal surface including the reflection region and a transmission region, the reflection region being a region off which the image light is reflected, the transmission region being a region through which the image light is transmitted.

(18) The image display device according to any one of (1) to (17), in which
the two or more reflection surfaces include a first reflection surface and a second reflection surface, the first reflection surface being a surface off which the image light refracted by the first lens system is reflected, the second reflection surface being a surface off which the image light reflected off the first reflection surface is reflected to be directed to the second lens system, and
a light path of a principal light ray of the image light is formed in a medium having a refractive index between 1 and 2 inclusive, the light path being a light path from the first reflection surface to the second reflection surface.

(19) A projection optical system that projects image light generated by modulating a light beam emitted by a light source, the projection optical system including:
a first lens system that has a positive refractive power as a whole, and refracts the generated image light;
a first reflection optical system that includes two or more reflection surfaces, each reflection surface being a surface off which the image light refracted by the first lens system is reflected;
a second lens system that has a positive refractive power as a whole, and refracts the image light reflected off the first reflection optical system; and
a second reflection optical system that includes a concave reflection surface off which the image light refracted by the second lens system is reflected to be directed to a projected-onto object onto which projection is performed.

REFERENCE SIGNS LIST

C2 principal light ray
IM1 first intermediate image-formation plane
IM2 second intermediate image-formation plane
IM3 third intermediate image-formation plane
L1 first optical system
L2 second optical system
Mr1 first reflection surface
Mr2 second reflection surface
Mr3 concave reflection surface
pu1 first point of intersection
pu2 second point of intersection
pu3 third point of intersection
pu4 fourth point of intersection
1 liquid crystal projector
20 illumination optical system
30, 230, 330, 430, 530, 630 projection optical system
40 projected image
70 optical member
70 optic
71 principal surface
72 reflection region
73 transmission region
100 image display device

The invention claimed is:

1. An image display device comprising:
a light source;
an image generator that modulates a light beam emitted by the light source and generates image light; and
a projection optical system that includes
a first lens system that has a positive refractive power as a whole, and refracts the generated image light,
a first reflection optical system that includes two or more reflection surfaces, each reflection surface being a surface off which the image light refracted by the first lens system is reflected and configured to cause the image light refracted by the first lens system to intersect a reference axis obtained by extending an optical axis of the first lens system,
a second lens system that has a positive refractive power as a whole, and refracts the image light reflected off the first reflection optical system, and
a second reflection optical system that includes a concave reflection surface off which the image light refracted by the second lens system is reflected to be directed to a projected-onto object onto which projection is performed.

2. The image display device according to claim 1, wherein
a first intermediate image of an image made up of the image light, is formed in a first intermediate image-formation plane situated between the image generator and the first reflection optical system,
a second intermediate image of the image made up of the image light, is formed in a second intermediate image-formation plane situated between the first reflection optical system and the second lens system, and
a third intermediate image of the image made up of the image light, is formed in a third intermediate image-formation plane situated between the second lens system and the second reflection optical system.

3. The image display device according to claim 1, wherein
a first intermediate image of an image made up of the image light, is formed in a first intermediate image-formation plane situated between the image generator and the first reflection optical system,
a second intermediate image of the image made up of the image light, is formed in a second intermediate image-formation plane situated between a first reflection surface and a second reflection surface that are included in the two or more reflection surfaces, and
a third intermediate image of the image made up of the image light, is formed in a third intermediate image-formation plane situated between the second lens system and the second reflection optical system.

4. The image display device according to claim 1, wherein
the second reflection optical system forms an image made up of the image light on a planar portion included in the projected-onto object.

5. The image display device according to claim 1, wherein
a principal light ray of the image light intersects the reference axis four times or more, the reference axis being obtained by extending the optical axis of a lens that is included in the first lens system and situated closest to the image generator.

6. The image display device according to claim 5, wherein
the principal light ray of the image light intersects the reference axis at a first point of intersection, a second point of intersection, a third point of intersection, and a fourth point of intersection, the first point of intersection being situated in the first lens system, the second point of intersection being situated between a first reflection surface and a second reflection surface that are included in the two or more reflection surfaces, the third point of intersection being situated between the first reflection optical system and the second reflection optical system, the fourth point of intersection being situated between the second reflection optical system and the projected-onto object.

7. The image display device according to claim 3, wherein
the image light refracted by the first lens system is reflected off the first reflection surface, and the image light reflected off the first reflection surface is reflected off the second reflection surface to be directed to the second lens system.

8. The image display device according to claim 2, wherein the first intermediate image-formation plane, the second intermediate image-formation plane, and the third intermediate image-formation plane are not planes substantially orthogonal to the reference axis.

9. The image display device according to claim 5, wherein a length T from a first point to a second point, and a length T2 from a third point to the second point are set to satisfy a relationship indicated by $$0.2<T2/T<0.8, \qquad (1)$$

the first point corresponding to a position on the reference axis that is included in the first lens system and situated closest to a first side that is a side of the image generator, the second point corresponding to a position on the reference axis that is included in the concave reflection surface and situated closest to a second side that is a side opposite to the first side, the third point corresponding to a position on the reference axis that is included in the first lens system and situated closest to the second side.

10. The image display device according to claim 5, wherein a length TWD2 of a light path in the principal light ray of the image light is set to satisfy a relationship indicated by $$0.2<T2/TWD<0.8, \qquad (2)$$

the length TWD2 of a light path being a length of a light path from a lens surface to the concave reflection surface, the lens surface being included in the first lens system and situated closest to a second side that is a side opposite to a first side that is a side of the image generator.

11. The image display device according to claim 5, wherein a length TRL from a certain point to another point is set to satisfy a relationship indicated by $$5<T/TRL<50, \qquad (3)$$

the certain point corresponding to a position on the reference axis that is included in the second lens system and situated closest to a first side that is a side of the image generator, the other point corresponding to a position on the reference axis that is included in the second lens system and situated closest to a second side that is a side opposite to the first side.

12. The image display device according to claim 5, wherein an effective diameter SA1max and an effective diameter SA2max are set to satisfy a relationship indicated by $$1.3<SA1\ max/SA2\ max<5, \qquad (4)$$

the effective diameter SA1max being an effective diameter of an optic having a largest effective diameter in the first lens system, the effective diameter SA2max being an effective diameter of an optic having a largest effective diameter in the second lens system.

13. The image display device according to claim 5, wherein the two or more reflection surfaces include a first reflection surface and a second reflection surface, the first reflection surface being a surface off which the image light refracted by the first lens system is reflected, the second reflection surface being a surface off which the image light reflected off the first reflection surface is reflected to be directed to the second lens system, and an angle ry1 and an angle ry2 are set to satisfy a relationship indicated by $$0.5<|ry1-ry2|/ry2<2.5, \qquad (5)$$

the angle ry1 being an angle at which a certain light path in the principal light ray of the image light intersects the reference axis, the certain light path being a light path from the first reflection surface to the second reflection surface, the angle ry2 being an angle at which another light path in the principal light ray of the image light intersects the reference axis, the other light path being a light path from the second reflection surface to the second lens system.

14. The image display device according to claim 5, wherein
the first lens system is configured such that an optical axis of an optic included in the first lens system substantially coincides with the reference axis, the first lens system including the optic or a plurality of the optics, and
the second lens system is configured such that an optical axis of an optic included in the second lens system substantially coincides with the reference axis, the second lens system including the optic or a plurality of the optics.

15. The image display device according to claim 5, wherein
the concave reflection surface is configured such that a rotationally symmetric axis of the concave reflection surface substantially coincides with the reference axis, and
respective reflection surfaces of the two or more reflection surfaces are concave reflection surfaces, and are configured such that rotationally symmetric axes of the respective reflection surfaces substantially coincide with the reference axis.

16. The image display device according to claim 5, wherein
at least one reflection surface from among the concave reflection surface and the two or more reflection surfaces is a free-shape surface that does not have a rotationally symmetric axis.

17. The image display device according to claim 1, wherein
at least one of the two or more reflection surfaces is a reflection region of an optical member that includes a principal surface including the reflection region and a transmission region, the reflection region being a region off which the image light is reflected, the transmission region being a region through which the image light is transmitted.

18. The image display device according to claim 1, wherein
the two or more reflection surfaces include a first reflection surface and a second reflection surface, the first reflection surface being a surface off which the image light refracted by the first lens system is reflected, the second reflection surface being a surface off which the image light reflected off the first reflection surface is reflected to be directed to the second lens system, and
a light path of a principal light ray of the image light is formed in a medium having a refractive index between 1 and 2 inclusive, the light path being a light path from the first reflection surface to the second reflection surface.

19. A projection optical system that projects image light generated by modulating a light beam emitted by a light source, the projection optical system comprising:
a first lens system that has a positive refractive power as a whole, and refracts the generated image light;
a first reflection optical system that includes two or more reflection surfaces, each reflection surface being a surface off which the image light refracted by the first lens system is reflected and configured to cause the image light refracted by the first lens system to intersect a reference axis obtained by extending an optical axis of the first lens system;
a second lens system that has a positive refractive power as a whole, and refracts the image light reflected off the first reflection optical system; and
a second reflection optical system that includes a concave reflection surface off which the image light refracted by the second lens system is reflected to be directed to a projected-onto object onto which projection is performed.

20. The image display device according to claim 1, wherein
the concave reflection surface is configured to cause the image light refracted by the second lens system to intersect the reference axis.

\* \* \* \* \*